US012512881B2

(12) United States Patent
Chun et al.

(10) Patent No.: US 12,512,881 B2
(45) Date of Patent: Dec. 30, 2025

(54) 2X LTF SEQUENCE FOR 320 MHz

(71) Applicant: LG Electronics Inc., Seoul (KR)

(72) Inventors: Jinyoung Chun, Seoul (KR); Jinsoo Choi, Seoul (KR); Dongguk Lim, Seoul (KR); Eunsung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 410 days.

(21) Appl. No.: 18/016,072

(22) PCT Filed: Feb. 24, 2021

(86) PCT No.: PCT/KR2021/002295

§ 371 (c)(1),
(2) Date: Jan. 13, 2023

(87) PCT Pub. No.: WO2022/014812

PCT Pub. Date: Jan. 20, 2022

(65) Prior Publication Data

US 2023/0370126 A1 Nov. 16, 2023

(30) Foreign Application Priority Data

| | | | |
|---|---|---|---|
| Jul. 15, 2020 | (KR) | ........................ | 10-2020-0087639 |
| Jul. 16, 2020 | (KR) | ........................ | 10-2020-0088331 |
| Jul. 31, 2020 | (KR) | ........................ | 10-2020-0096144 |
| Aug. 7, 2020 | (KR) | ........................ | 10-2020-0099380 |
| Sep. 4, 2020 | (KR) | ........................ | 10-2020-0112861 |

(51) Int. Cl.

| | |
|---|---|
| ***H04B 7/0452*** | (2017.01) |
| ***H04L 27/26*** | (2006.01) |
| *H04W 84/12* | (2009.01) |

(52) U.S. Cl.
CPC ....... *H04B 7/0452* (2013.01); *H04L 27/2602* (2013.01); *H04W 84/12* (2013.01)

(58) Field of Classification Search
CPC .............. H04B 7/0452; H04L 27/2602; H04L 27/2613; H04L 5/00; H04W 72/04; H04W 84/12
See application file for complete search history.

(56) References Cited

U.S. PATENT DOCUMENTS 12,267,262 B2 * 4/2025 Chun .................... H04L 5/0044
2019/0268805 A1 8/2019 Lee et al.

FOREIGN PATENT DOCUMENTS

WO WO 2020/022707 1/2020
WO WO 2020/096349 5/2020

OTHER PUBLICATIONS

Chun et al. "EHT-LTF sequences considering the new tone plan," IEEE 802.11-20/0825r1, Jun. 2020, 14 pages.
Moon et al., "LTF Sequence Designs," IEEE 802.11-15/1303r0, Nov. 2015, 25 pages.

* cited by examiner

*Primary Examiner* — Asad M Nawaz
*Assistant Examiner* — Natali Pascual Peguero
(74) *Attorney, Agent, or Firm* — Fish & Richardson P.C.

(57) ABSTRACT

A physical protocol data unit (PPDU) to be used for 320 MHz transmission in a wireless local area network system, and the long training field (LTF) of the PPDU is defined through an LTF sequence. The LTF sequence relates to a 2x LTF sequence and is defined as follows: {first sequence, zero sequence, second sequence, zero sequence, third sequence, zero sequence, forth sequence}.

11 Claims, 22 Drawing Sheets

(a)

(b)

2X LTF SEQUENCE FOR 320 MHz

CROSS-REFERENCE TO RELATED APPLICATIONS

This application is the National Stage filing under 35 U.S.C. 371 of International Application No. PCT/KR2021/002295, filed on Feb. 24, 2021, which claims the benefit of Korean Patent Application No. 10-2020-0087639 filed on Jul. 15, 2020, Korean Patent Application No. 10-2020-0088331 filed on Jul. 16, 2020, Korean Patent Application No. 10-2020-0096144 filed on Jul. 31, 2020, Korean Patent Application No. 10-2020-0099380 filed on Aug. 7, 2020, and Korean Patent Application No. 10-2020-0112861 filed on Sep. 4, 2020, the contents of which are all hereby incorporated by reference herein in their entirety.

TECHNICAL FIELD

The present specification relates to a 2x LTF sequence for 320 MHz band transmission in a wireless local area network (WLAN) system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In a wireless local area network (WLAN) system according to various embodiments, a transmitting station (STA) may generate a physical protocol data unit (PPDU). The transmitting STA may transmit the PPDU through a 320 MHz band. The PPDU may include a Long Training Field (LTF) signal. The LTF signal may be generated based on the LTF sequence for the 320 MHz band. The LTF sequence may be defined as follows.

{1st sequence, zero-sequence, 2nd sequence, zero-sequence, 3rd sequence, zero-sequence, 4th sequence}, 1st sequence={5th sequence, 9th sequence, −7th sequence, 10th sequence, 6th sequence, 11th sequence, 8th sequence}, 2nd sequence={5th sequence, −9th sequence, 7th sequence, −10th sequence, 6th sequence, −11th sequence, −8th sequence}, 3rd sequence={−5th sequence, 9th sequence, −7th sequence, 10th sequence, 6th sequence, 11th sequence, −8th sequence}, 4th sequence={−5th sequence, −9th sequence, 7th sequence, −10th sequence, 6th sequence, −11th sequence, 8th sequence}, 5th sequence={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1 , 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0}, 6th sequence={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}, 7th sequence={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}, 8th sequence={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}, 9th sequence={+1, 0, −1, 0, −1}, 10th sequence={0, −1, 0, +1, 0, +1, 0, +1, 0, 0, 0, 0, 0, 0, 0, +1, 0, −1, 0, −1, 0, +1, 0}, 11th sequence={+1, 0, −1, 0, +1}.

According to an example of the present specification, an LTF signal for a 320 MHz band may be transmitted and received.

DETAILED DESCRIPTION

Figure 1:
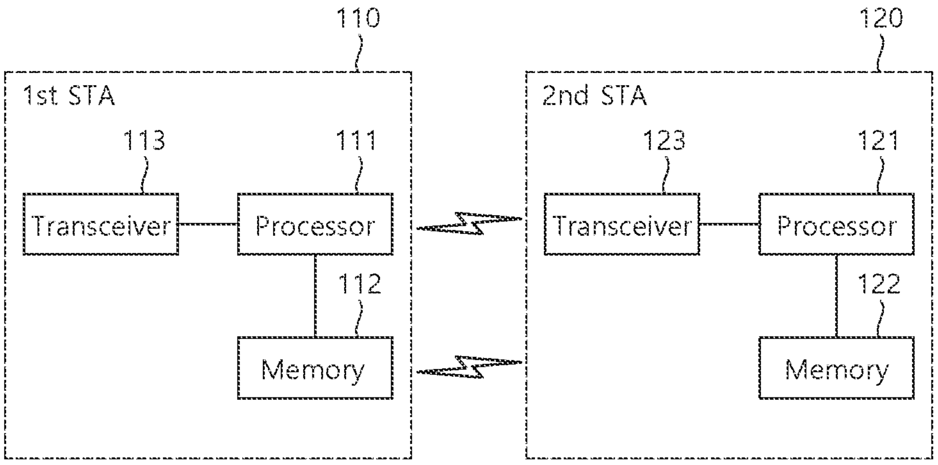
FIG. 1 shows an example of a transmitting apparatus and/or receiving apparatus of the present specification.
Figure 1:
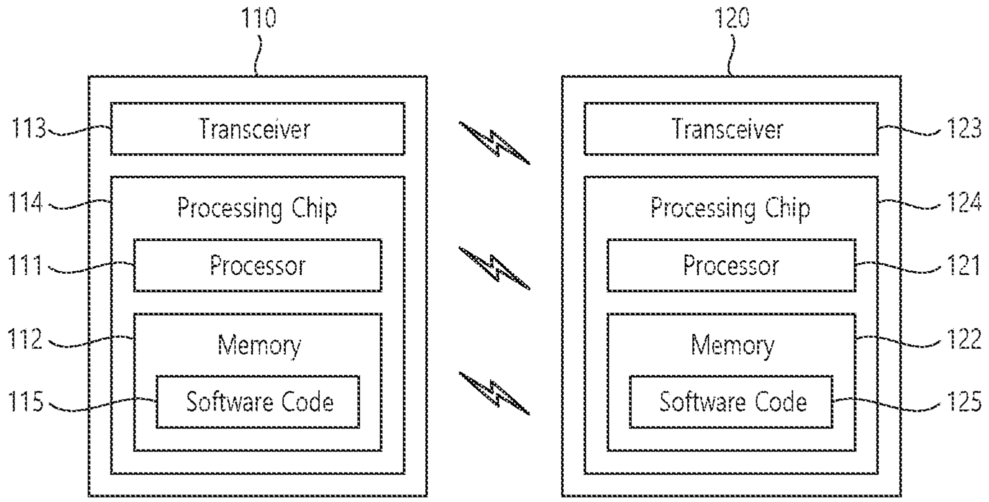

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
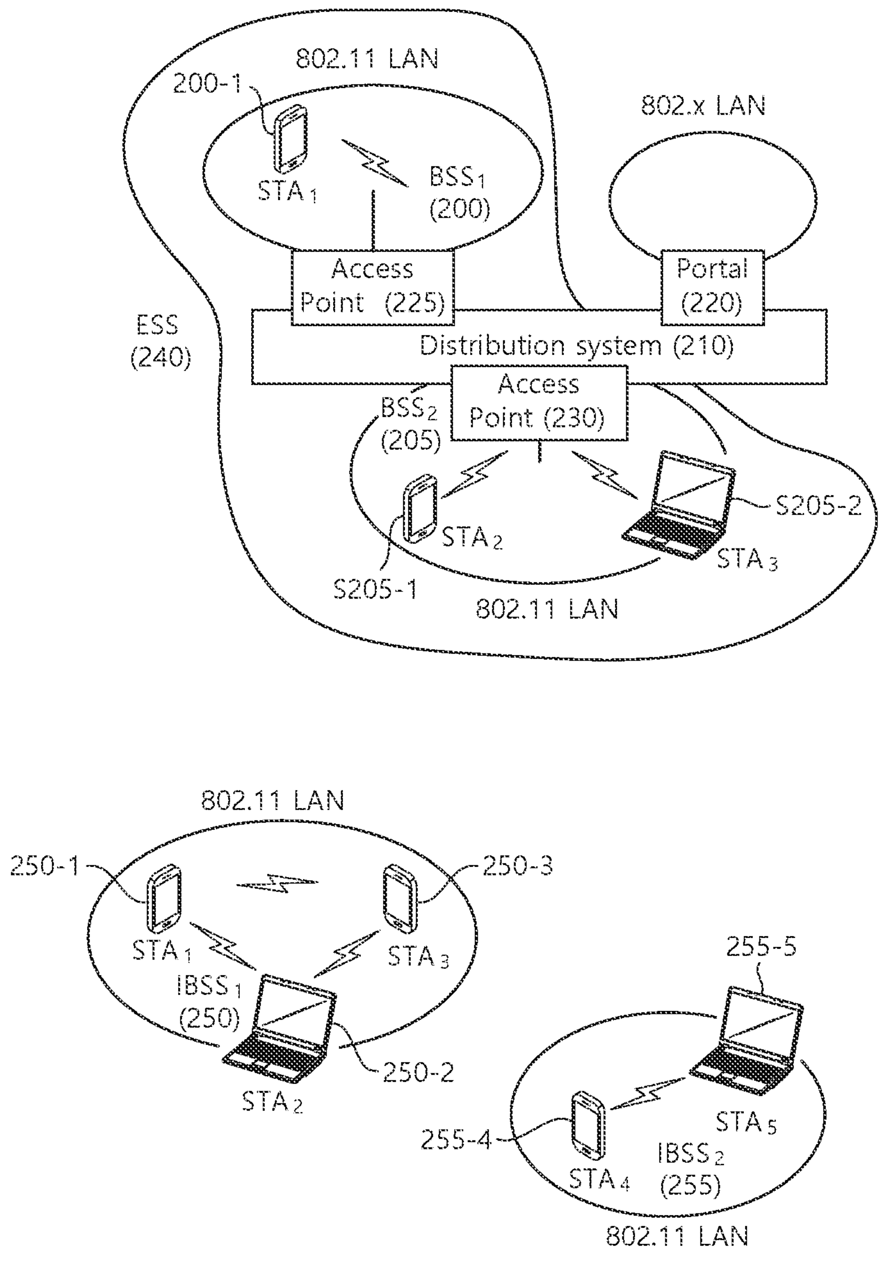
FIG. 2 is a conceptual view illustrating the structure of a wireless local area network (WLAN).

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
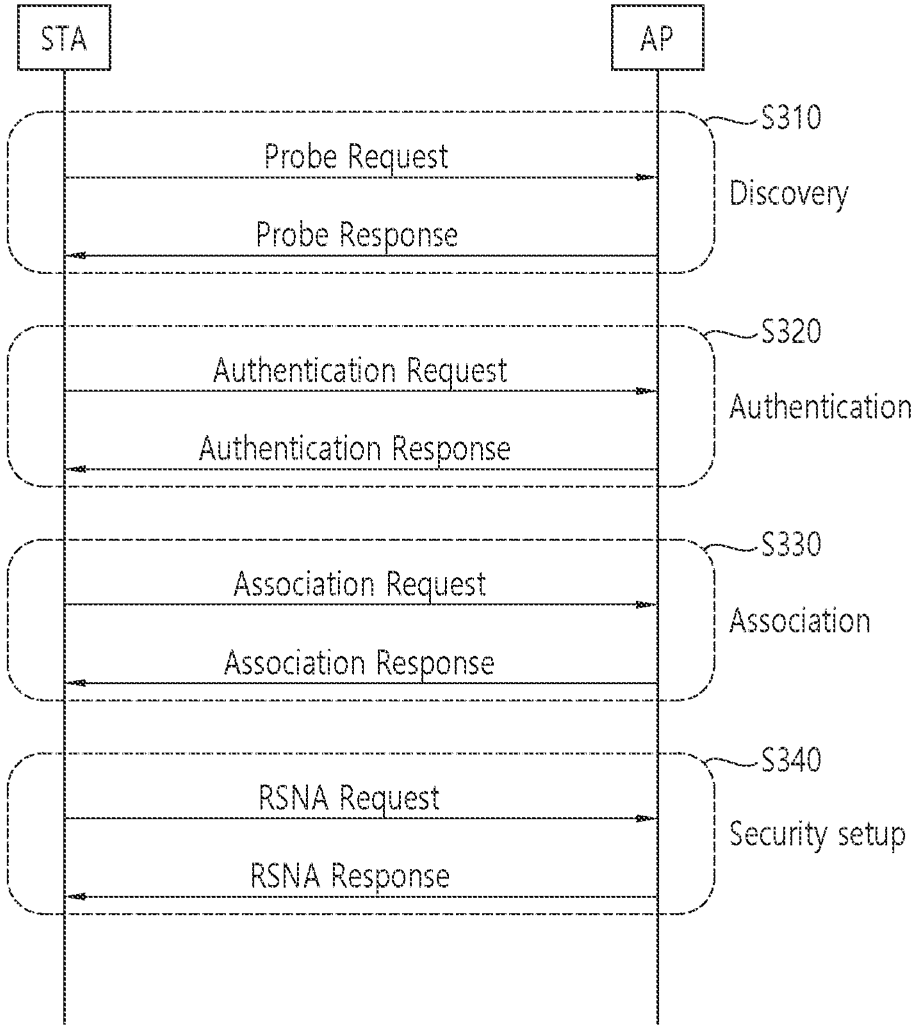
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
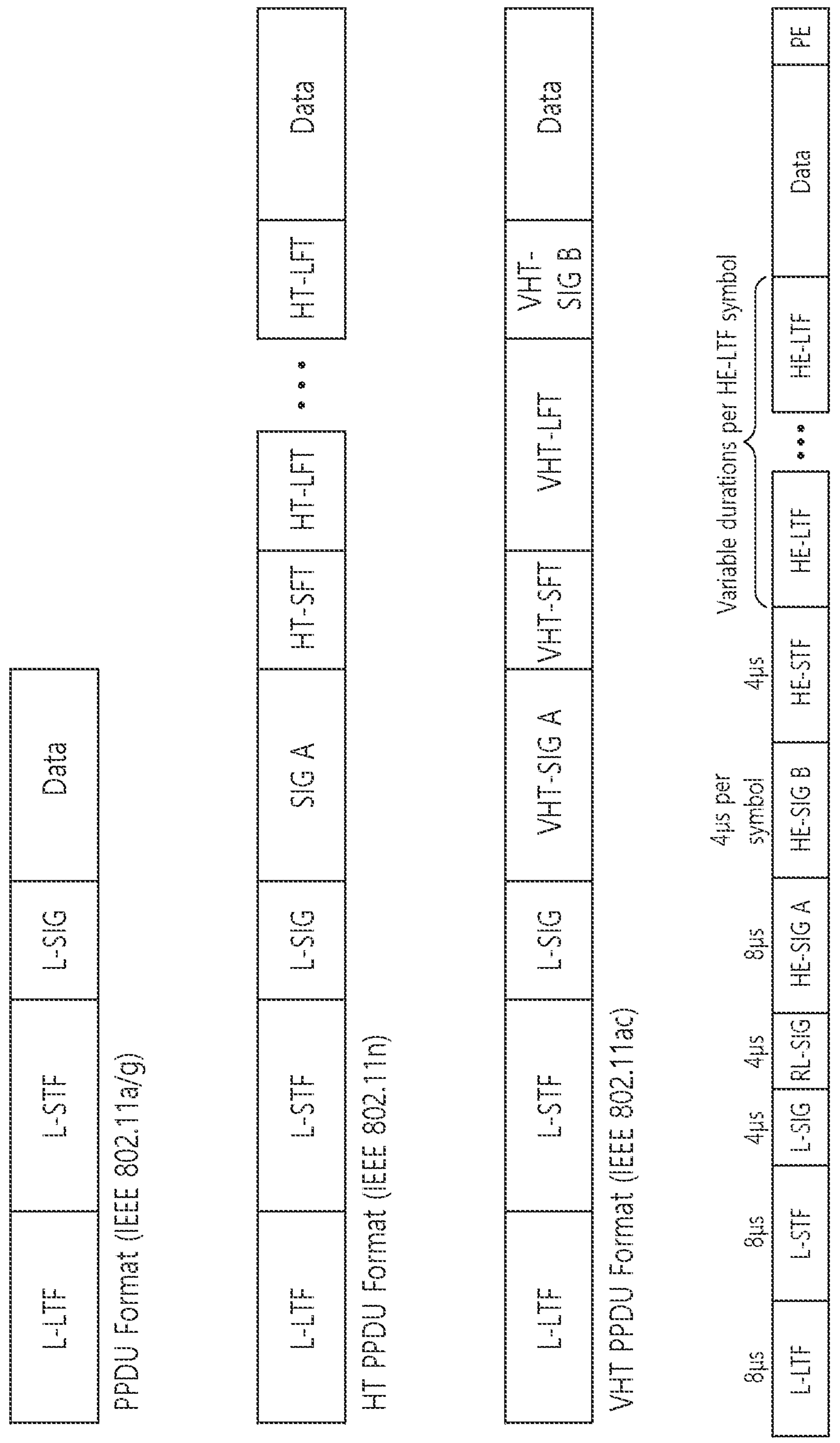
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
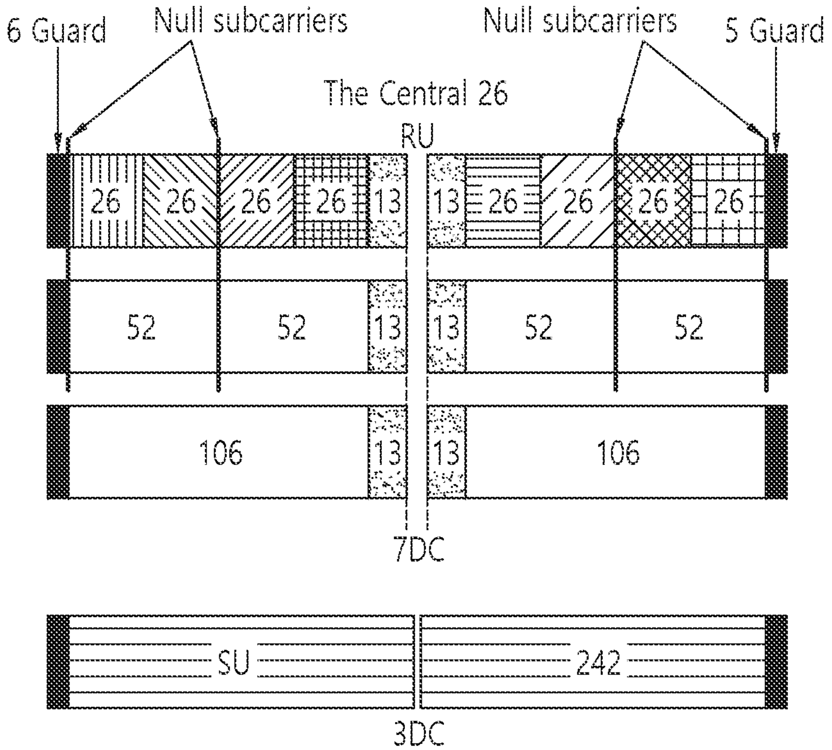
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
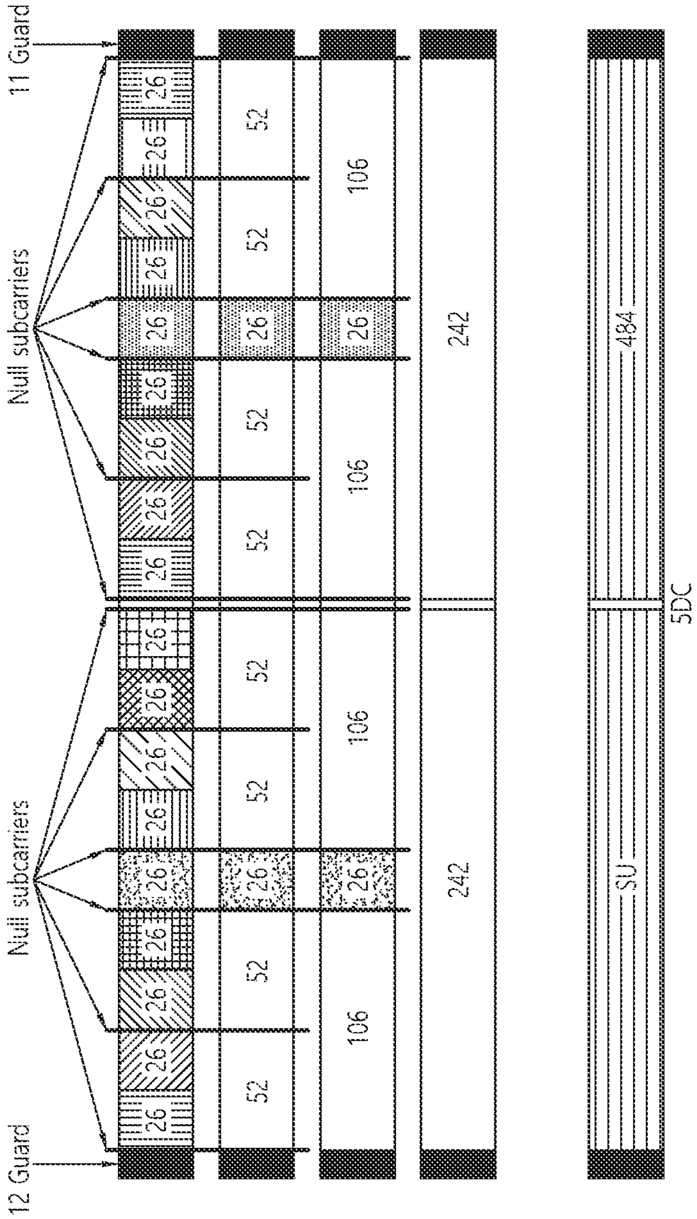
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
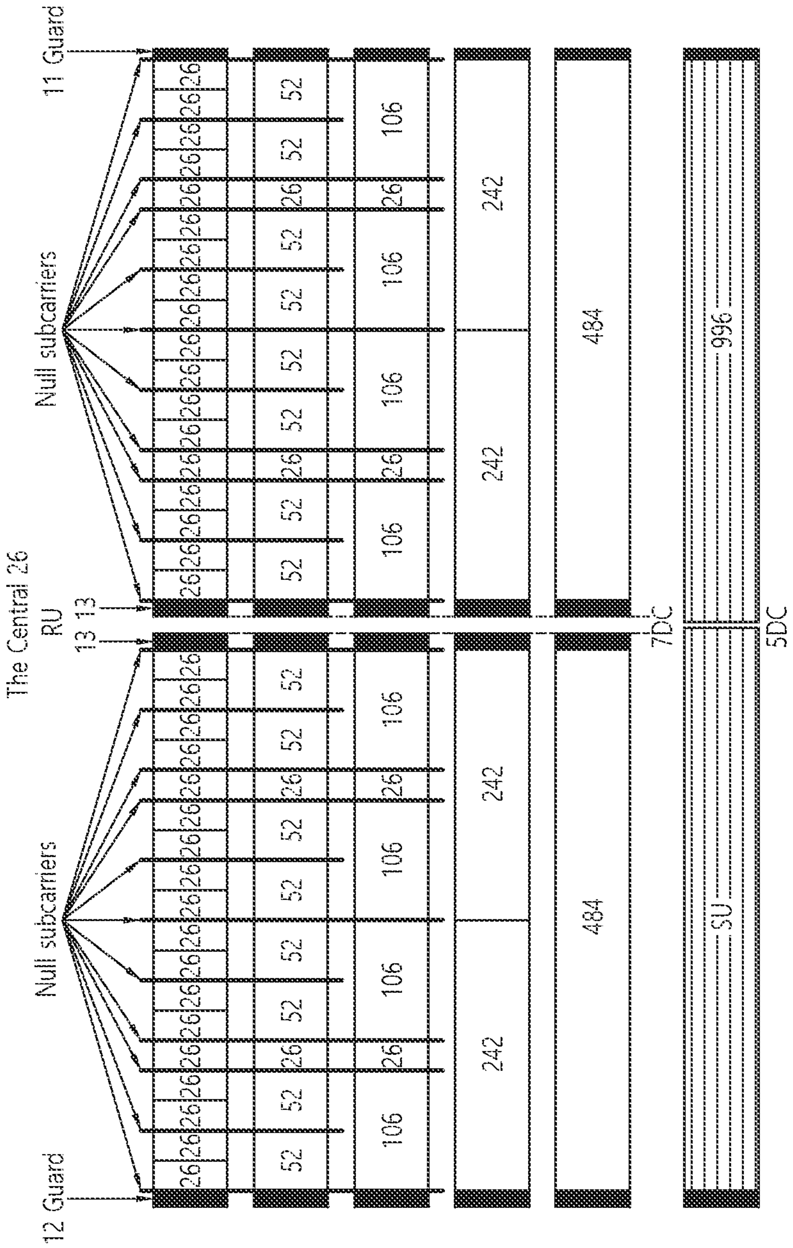
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
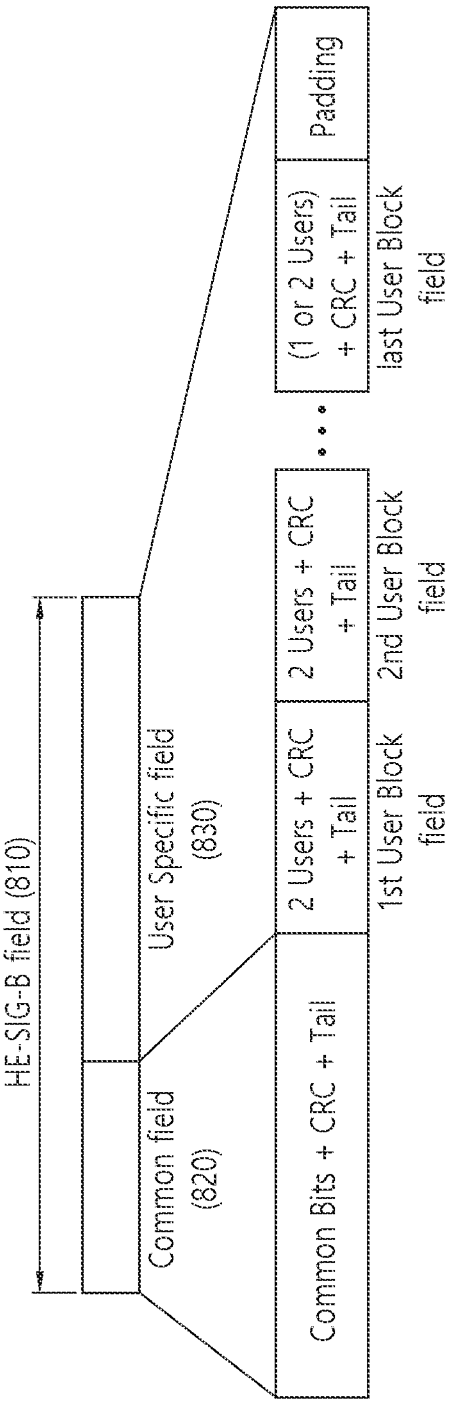
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26: | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | | 106 | | | 26 | 26 | 26 | 26 | 26 | 8 |
| $01001y_2y_1y_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y 1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y 1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 . . . B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3 . . . B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 9:
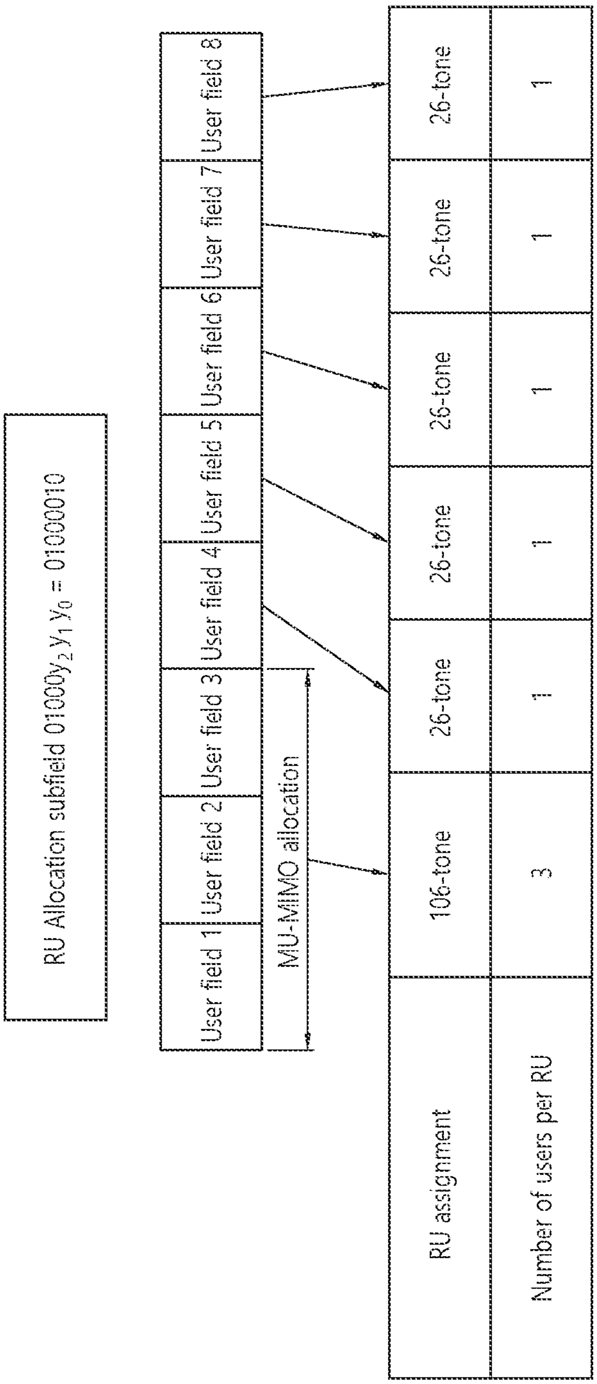
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
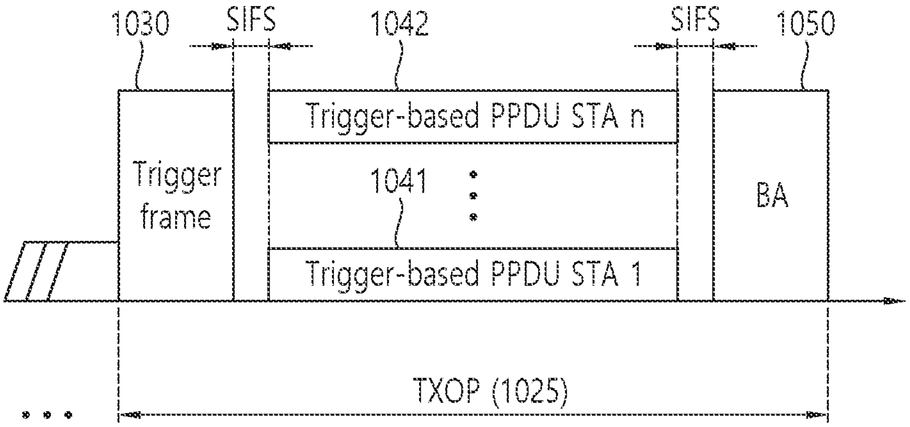
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
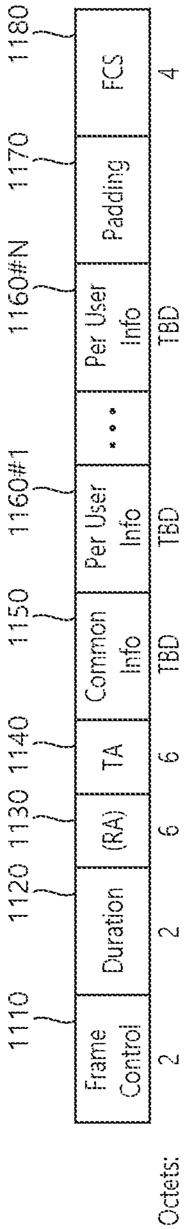
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
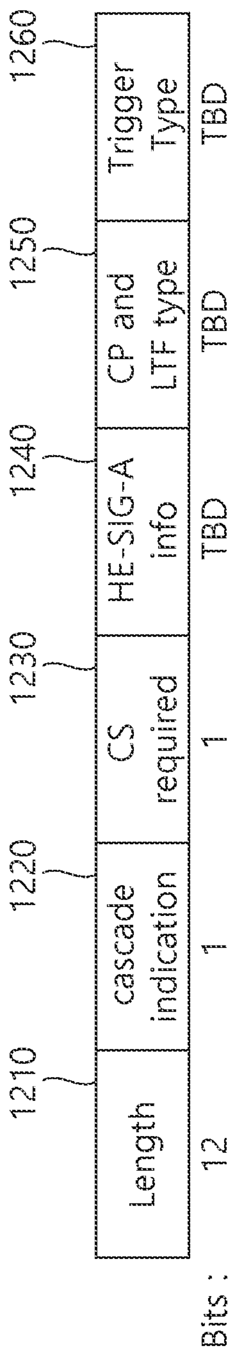
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
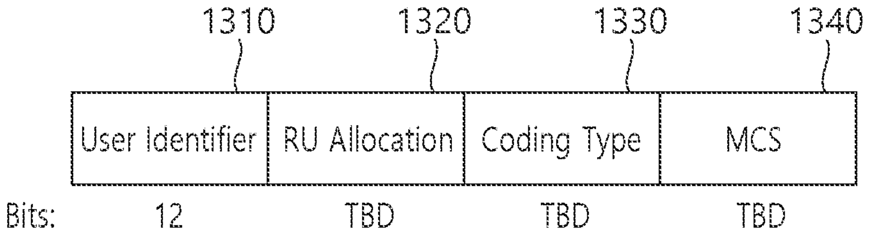
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
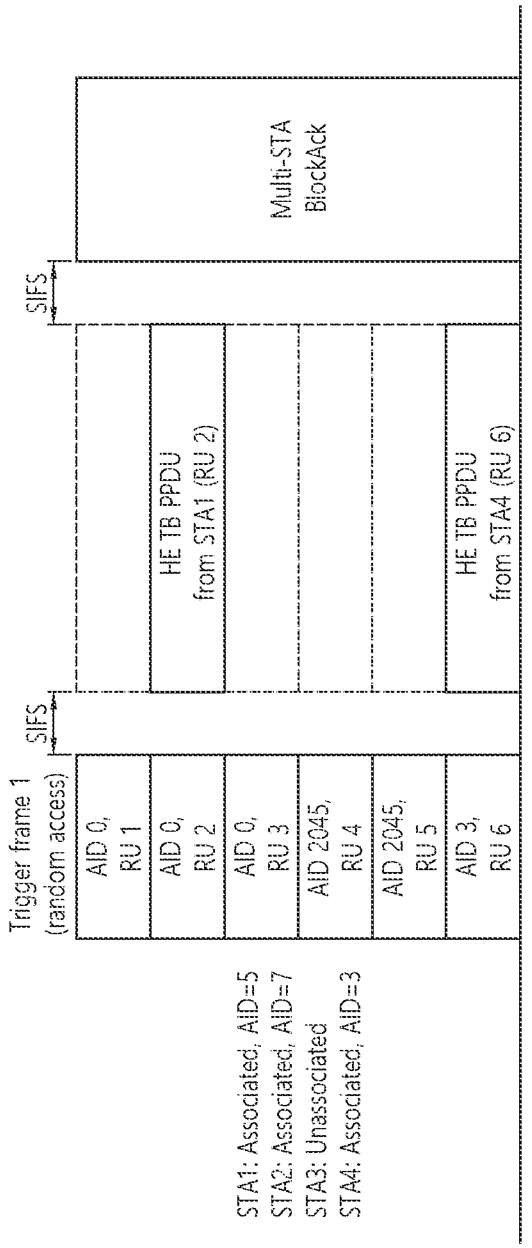
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
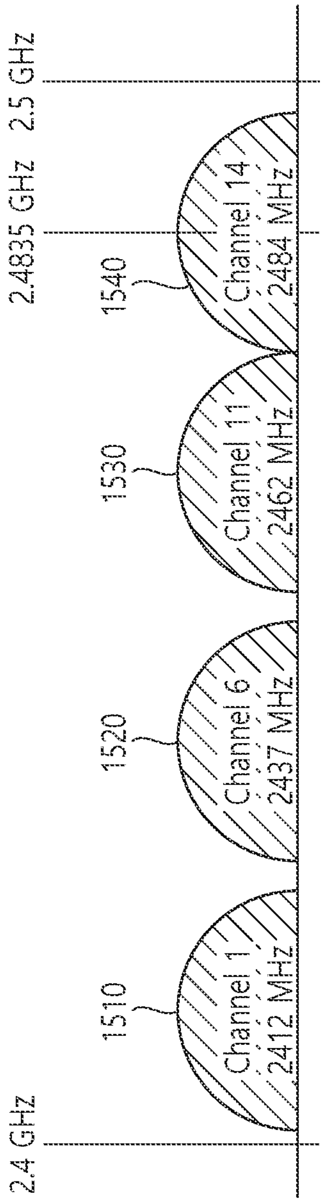
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
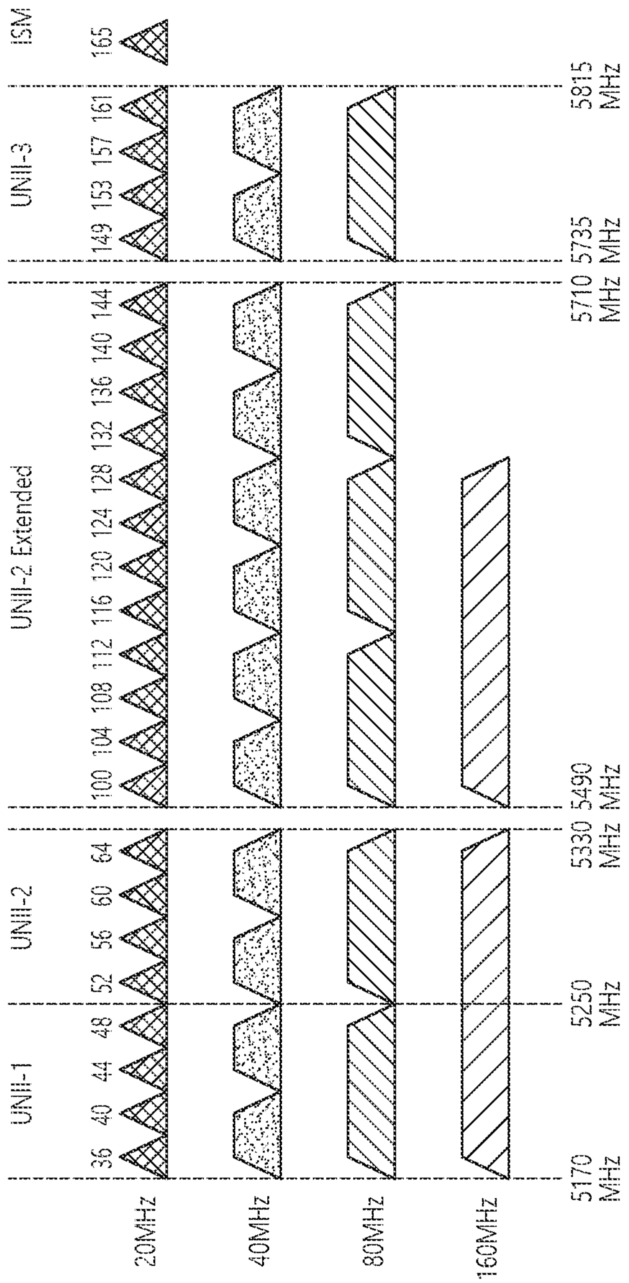
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
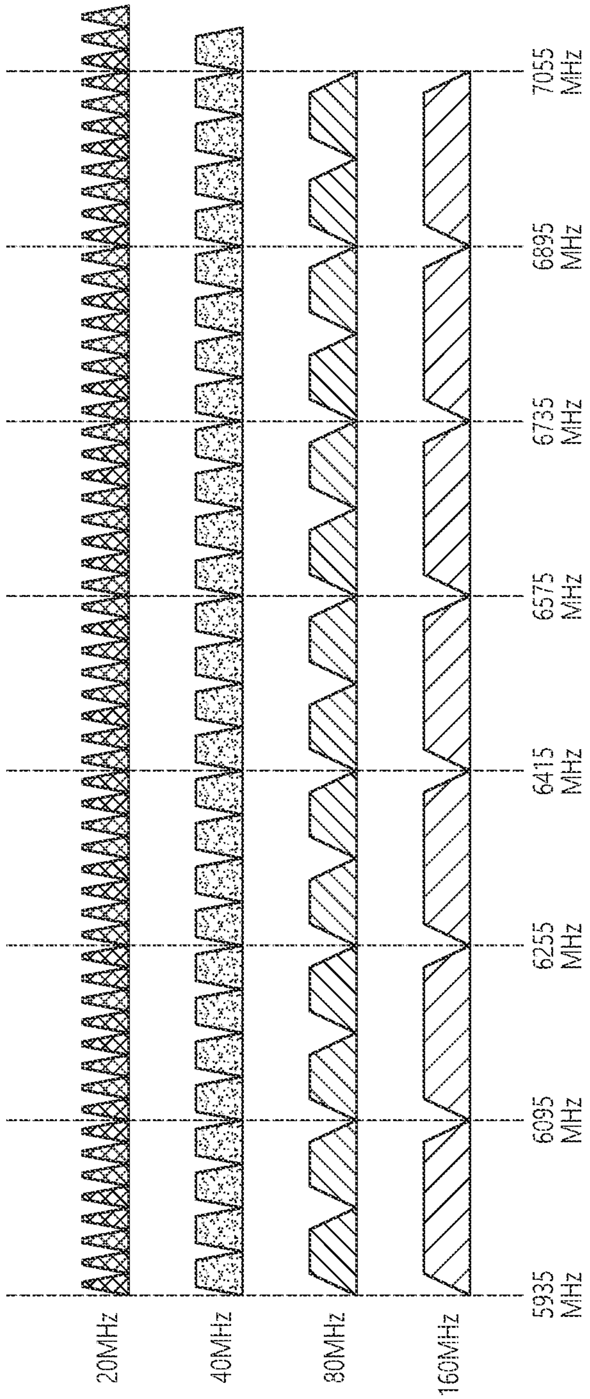
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 KHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |

TABLE 5-continued

| Indices | #1 | #2 | #3 | #4 | #5 | #6 | #7 | #8 | #9 | Number of entries |
|---|---|---|---|---|---|---|---|---|---|---|
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | 106 | | | | 1 |
| 17 | 26 | 26 | 52 | | 26 | 106 | | | | 1 |
| 18 | 52 | | 26 | 26 | 26 | 106 | | | | 1 |
| 19 | 52 | | 52 | | 26 | 106 | | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | 106 | | | | 26 | 26 | 26 | 26 | 26 | 1 |
| 21 | 106 | | | | 26 | 26 | 26 | 52 | | 1 |
| 22 | 106 | | | | 26 | 52 | | 26 | 26 | 1 |
| 23 | 106 | | | | 26 | 52 | | 52 | | 1 |
| 24 | 52 | | 52 | | — | 52 | | 52 | | 1 |
| 25 | 242-tone RU empty (with zero users) | | | | | | | | | 1 |
| 26 | 106 | | | | 26 | 106 | | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | 52 + 26 | | | 26 | 1 |
| 60 | 26 | 26 + 52 | | | 26 | 26 | 26 | 26 | 26 | 1 |
| 61 | 26 | 26 + 52 | | | 26 | 26 | 26 | 52 | | 1 |
| 62 | 26 | 26 + 52 | | | 26 | 52 | | 26 | 26 | 1 |
| 63 | 26 | 26 | 52 | | 26 | 52 + 26 | | | 26 | 1 |
| 64 | 26 | 26 + 52 | | | 26 | 52 + 26 | | | 26 | 1 |
| 65 | 26 | 26 + 52 | | | 26 | 52 | | 52 | | 1 |

TABLE 7

| | | | | | | | | | | |
|---|---|---|---|---|---|---|---|---|---|---|
| 66 | 52 | | 26 | 26 | 26 | 52 + 26 | | | 26 | 1 |
| 67 | 52 | | 52 | | 26 | 52 + 26 | | | 26 | 1 |
| 68 | 52 | | 52 + 26 | | | 52 | | 52 | | 1 |
| 69 | 26 | 26 | 26 | 26 | | 26 + 106 | | | | 1 |
| 70 | 26 | 26 + 52 | | | 26 | 106 | | | | 1 |
| 71 | 26 | 26 | 52 | | | 26 + 106 | | | | 1 |
| 72 | 26 | 26 + 52 | | | | 26 + 106 | | | | 1 |
| 73 | 52 | | 26 | 26 | | 26 + 106 | | | | 1 |
| 74 | 52 | | 52 | | | 26 + 106 | | | | 1 |
| 75 | 106 + 26 | | | | | 26 | 26 | 26 | 26 | 1 |
| 76 | 106 + 26 | | | | | 26 | 26 | 52 | | 1 |
| 77 | 106 + 26 | | | | | 52 | | 26 | 26 | 1 |
| 78 | 106 | | | | 26 | 52 + 26 | | | 26 | 1 |
| 79 | 106 + 26 | | | | | 52 + 26 | | | 26 | 1 |
| 80 | 106 + 26 | | | | | 52 | | 52 | | 1 |
| 81 | 106 + 26 | | | | | 106 | | | | 1 |
| 82 | 106 | | | | | 26 + 106 | | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU)

received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment, The EHT-STF of FIG. 18 may be set in various types. For example, a first type of STF (e.g., 1x STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2x STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

M={−1, −1, −1, 1, 1, 1, −1, 1, 1, 1, −1, 1, 1, −1, 1} <Equation 1>

The EHT-STF for the 20 MHz PPDU may be configured based on the following equation. The following example may be a first type (i.e., 1x STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) ‘a’ to a tone index ‘c’. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

EHT-STF(−112:16:112)={M}*(1+j)/sqrt(2) <Equation 2>

EHT-STF(0)=0

The EHT-STF for the 40 MHz PPDU may be configured based on the following equation. The following example may be the first type (i.e., 1x STF) sequence.

EHT-STF(−240:16:240)={M, 0, −M}*(1+j)/sqrt(2) <Equation 3>

The EHT-STF for the 80 MHz PPDU may be configured based on the following equation. The following example may be the first type (i.e., 1x STF) sequence.

EHT-STF(−496:16:496)={M, 1, −M, 0, −M, 1, −M}*(1+j)/sqrt(2) <Equation 4>

The EHT-STF for the 160 MHz PPDU may be configured based on the following equation. The following example may be the first type (i.e., 1x STF) sequence.

EHT-STF(−1008:16:1008)={M, 1, −M, 0, −M, 1, −M, 0, −M, −1, M, 0, −M, 1, −M}*(1+j)/sqrt(2) <Equation 5>

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

EHT-STF(−496:16:496)={−M, −1, M, 0, −M, 1, −M}*(1+j)/sqrt(2) <Equation 6>

Equation 7 to Equation 11 below relate to an example of a second type (i.e., 2x STF) sequence.

EHT-STF(−120:8:120)={M, 0, −M}*(1+j)/sqrt(2) <Equation 7>

The EHT-STF for the 40 MHz PPDU may be configured based on the following equation.

EHT-STF(−248:8:248)={M, −1, −M, 0, M, −1, M}*(1+j)/sqrt(2) <Equation 8>

EHT-STF(−248)=0

EHT-STF(−248)=0

The EHT-STF for the 80 MHz PPDU may be configured based on the following equation.

EHT-STF(−504:8:504)={M, −1, M, −1, −M, −1, M, 0, −−M, 1, M, 1, −M, 1, −M}*(1+j)/sqrt(2) <Equation 9>

The EHT-STF for the 160 MHz PPDU may be configured based on the following equation.

EHT-STF(−1016:16:1016)={M, −1, M, −1, −M, −1, M, 0, −M, 1, M, 1, −M, 1, −M, 0, −M, 1, −M, 1, M, 1, −M, 0, −M, 1, M, 1, −M, 1, −M}*(1+j)/sqrt(2) <Equation 10>

EHT-STF(−8)=0, EHT-STF(8)=0,

EHT-STF(−1016)=0, EHT-STF(1016)=0

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

EHT-STF(−504:8:504)={−M, 1, −M, 1, M, 1, −M, 0, −M, 1, M, 1, −M, 1, −M}*(1+j)/sqrt(2) <Equation 11>

EHT-STF(−504)=0,

EHT-STF(504)=0

The EHT-LTF may have first, second, and third types (i.e., 1x, 2x, 4x LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-) association request frame, a (re-) association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
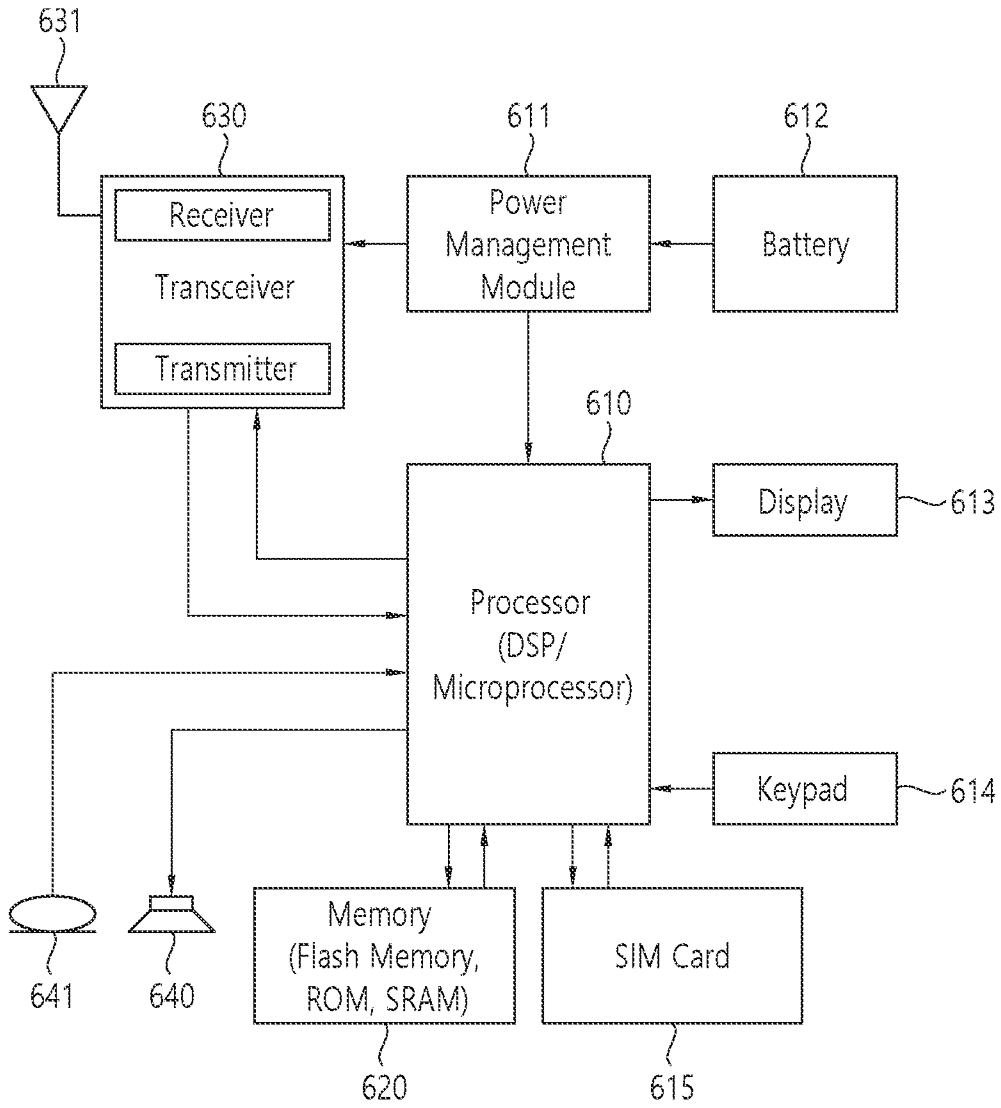
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

A 20 MHz-band 1x HE-LTF specified in the existing 802.11ax, i.e., HE, is as follows.

HELTF$_{-122,122}$ =
{0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1,
0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0,
−1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0,
0, −1, 0, 0, 0, −1, 0, 0, 0, +1, 0, 0, 0, −1, 0, 0, 0, −1, 0, 0, 0, +1, 0, 0, 0, −1, 0, 0, 0, 0, 0, 0,
0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0,
0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1,
0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0,
−1, 0, 0, 0, +1, 0, 0, 0, −1, 0, 0, 0, −1, 0, 0, 0, −1, 0, 0, 0, −1, 0, 0, 0, −1, 0, 0}

A 40 MHz-band 1x HE-LTF specified in the existing 802.11ax, i.e., HE, is as follows.

HELTF$_{-244,244}$ =
{+1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0,
0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0,
0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1,
0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0,
−1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0,
0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0,
0, 0, +1, 0, 0, 0, −1, 0, 0, 0, −1, 0, 0, 0, +1, 0, 0, 0, +1, 0, 0, 0, +1, 0, 0, 0, +1, 0, 0, 0, −1,
0, 0, 0, +1, 0, 0, 0, −1, 0, 0, 0, +1, 0, 0, 0, −1, 0, 0, 0, −1, 0, 0, 0, −1, 0, 0, 0, 0, 0, 0, 0, +1,
0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0,
+1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0,
0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0,
0, 0, −1, 0, 0, 0, +1, 0, 0, 0, −1, 0, 0, 0, −1, 0, 0, 0, −1, 0, 0, 0, +1, 0, 0, 0, +1, 0, 0, 0, −1,
0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, +1,
0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, −1,
0, 0, 0, −1, 0, 0, 0, −1, 0, 0, 0, −1, 0, 0, 0, +1, 0, 0, 0, −1, 0, 0, 0, +1, 0, 0, 0, +1, 0, 0, 0,
+1, 0, 0, 0, −1, 0, 0, 0, −1, 0, 0, 0, +1, 0, 0, 0, +1, 0, 0, 0, +1}

An 80 MHz-band 1x HE-LTF specified in the existing 802.11ax, i.e., HE, is as follows.
80 MHz:

HELTF$_{-500,500}$ =
{−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0,
0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0,
0, 0, +1, 0, 0, 0, −1, 0, 0, 0, −1, 0, 0, 0, −1, 0, 0, 0, −1, 0, 0, 0, −1, 0, 0, 0, −1, 0, 0, 0, +1,
0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, −1,
0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, +1,
0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0,
+1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0,
0, +1, 0, 0, 0, −1, 0, 0, 0, −1, 0, 0, 0, −1, 0, 0, 0, −1, 0, 0, 0, +1, 0, 0, 0, −1, 0, 0, 0, −1, 0,
0, 0, −1, 0, 0, 0, −1, 0, 0, 0, −1, 0, 0, 0, −1, 0, 0, 0, +1, 0, 0, 0, +1, 0, 0, 0, +1, 0, 0, 0, −1,
0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0,
+1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0,
0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0,
0, 0, −1, 0, 0, 0, −1, 0, 0, 0, −1, 0, 0, 0, −1, 0, 0, 0, −1, 0, 0, 0, +1, 0, 0, 0, −1, 0, 0, 0, +1,
0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0,
−1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0,
0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0,
0, 0, 0, 0, 0, 0, −1, 0, 0, 0, +1, 0, 0, 0, +1, 0, 0, 0, −1, 0, 0, 0, −1, 0, 0, 0, +1, 0, 0, 0, +1, 0,
0, 0, −1, 0, 0, 0, −1, 0, 0, 0, +1, 0, 0, 0, +1, 0, 0, 0, −1, 0, 0, 0, −1, 0, 0, 0, −1, 0, 0, 0, +1,
0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0,
+1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0,
0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0,
0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1,
0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0,
+1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0,
0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0,
0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1,
0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0,
−1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0,
0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0,
0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1,
0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1,
0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1,
0, 0, 0, +1}

A 160 MHz-band 1x HE-LTF specified in the existing 802.11ax, i.e., HE, is as follows.

160 MHz:

---

$HELTF_{-1012,1012}$ =
{$LTF_{80MHz\_lower\_1x}$, 0, 0, 0, 0, 0, 0, 0, 0, 0, 0, 0, 0, 0, 0, 0, 0, 0, 0, 0, 0, 0, 0, 0,
$LTF_{80MHz\_upper\_1x}$}

$LTF_{80MHz\_lower\_1x}$ = {$LTF_{80MHz\_left\_1x}$, 0, $LTF_{80MHz\_right\_1x}$} shall be used in the lower 80 MHz frequency segment $LTF_{80MHz\_upper\_1x}$ = {$LTF_{80MHz\_left\_1x}$, 0, $-LTF_{80MHz\_right\_1x}$} shall be used in the upper 80 MHz frequency segment $LTF_{80MHz\_left\_1x}$ = {−1, 0, 0, 0, −1, 0, 0, 0, +1, 0, 0, 0, −1, 0, 0, 0, +1, 0, 0, 0, +1, 0, 0, 0, +1, 0, 0, 0, −1, 0,
0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0,
+1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1,
0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0,
0, −1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, +1,
0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0,
0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1,
0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0,
0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0,
+1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1,
0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0,
0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1,
0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0,
0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1,
0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0}

$LTF_{80MHz\_right\_1x}$ = {0, 0, 0, −1, 0, 0, 0, +1, 0, 0, 0, +1, 0, 0, 0, −1, 0, 0, 0, −1, 0, 0, 0, +1, 0, 0, 0, +1, 0, 0,
0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1,
0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0,
0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0,
−1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1,
0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0,
0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0,
−1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, +1,
0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0,
0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0,
+1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1,
0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0,
0, −1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0,
+1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1,
0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0,
0, +1}

---

In case of 80+80 MHz transmission using the 1x HE-LTF, a lower 80 MHz frequency segment shall use the 80 MHz 1xHE-LTF sequence of $HELTF\text{-}_{-500,500-}=LTF_{80\ MHz\_lower\_1x}$, and an upper 80 MHz frequency segment shall use the 80 MHz 1xHE-LTF sequence of $HELTF\text{-}_{-500,500-}=LTF_{80\ MHz\_upper\_1x}$.

A 20 MHz-band 2x HE-LTF specified in the existing 802.11ax, i.e., HE, is as follows.

---

$HELTF_{-122,122}$ =
{−1, 0, −1, 0, −1, 0, +1, 0, $1, 0, −1, 0, −1, 0, −1, 0, −1, 0, −1, 0, −1, 0, +1, 0, −1, 0, +1, 0,
−1, 0, −1, 0, +1, 0, +1, 0, −1, 0, +1, 0, +1, 0, +1, 0, +1, 0, +1, 0, −1, 0, +1, 0, −1, 0, +1, 0,
−1, 0, −1, 0, +1, 0, +1, 0, −1, 0, +1, 0, −1, 0, −1, 0, −1, 0, −1, 0, −1, 0, −1, 0, +1, 0, +1, 0,
+1, 0, −1, 0, −1, 0, +1, 0, −1, 0, −1, 0, −1, 0, −1, 0, −1, 0, +1, 0, −1, 0, −1, 0, −1, 0, +1, 0,
+1, 0, +1, 0, −1, 0, −1, 0, +1, 0, 0, 0, +1, 0, −1, 0, +1, 0, +1, 0, −1, 0, +1, 0, +1, 0, −1, 0,
+1, 0, +1, 0, −1, 0, −1, 0, +1, 0, −1, 0, +1, 0, +1, 0, +1, 0, +1, 0, −1, 0, +1, 0, −1, 0, +1, 0,
+1, 0, −1, 0, −1, 0, +1, 0, −1, 0, −1, 0, −1, 0, −1, 0, −1, 0, +1, 0, −1, 0, +1, 0, +1, 0, −1, 0,
−1, 0, +1, 0, +1, 0, −1, 0, +1, 0, −1, 0, −1, 0, −1, 0, −1, 0, +1, 0, −1, 0, +1, 0, +1, 0, +1, 0,
−1, 0, −1, 0, +1, 0, −1, 0, −1, 0, −1, 0, −1, 0, −1, 0, +1, 0, −1, 0, +1}

---

A 40 MHz-band 2x HE-LTF specified in the existing 802.11ax, i.e., HE, is as follows.

---

$HELTF_{-244,244}$ =
{+1, 0, −1, 0, −1, 0, −1, 0, −1, 0, −1, 0, +1, 0, +1, 0, −1, 0, −1, 0, +1, 0, −1, 0, +1, 0, −1, 0,
−1, 0, −1, 0, −1, 0, −1, 0, −1, 0, +1, 0, +1, 0, +1, 0, +1, 0, −1, 0, +1, 0, −1, 0, +1, 0, +1, 0,
−1, 0, −1, 0, −1, 0, −1, 0, −1, 0, +1, 0, +1, 0, −1, 0, −1, 0, +1, 0, −1, 0, +1, 0, −1, 0, +1, 0,
+1, 0, +1, 0, +1, 0, +1, 0, −1, 0, −1, 0, −1, 0, −1, 0, +1, 0, −1, 0, +1, 0, −1, 0, +1, 0, +1, 0,
+1, 0, +1, 0, +1, 0, −1, 0, +1, 0, −1, 0, −1, 0, +1, 0, −1, 0, +1, 0, −1, 0, −1, 0, +1, 0, +1, 0,
+1, 0, +1, 0, +1, 0, −1, 0, −1, 0, +1, 0, +1, 0, −1, 0, +1, 0, −1, 0, +1, 0, +1, 0, +1, 0, +1, 0,

-continued

+1, 0, +1, 0, −1, 0, −1, 0, −1, 0, −1, 0, +1, 0, −1, 0, +1, 0, −1, 0, −1, 0, −1, 0, −1, 0, −1, 0,
−1, 0, −1, 0, +1, 0, +1, 0, −1, 0, −1, 0, +1, 0, −1, 0, +1, 0, −1, 0, +1, 0, +1, 0, +1, 0, +1, 0,
+1, 0, −1, 0, −1, 0, −1, 0, −1, 0, +1, 0, −1, 0, +1, 0, −1, 0, 0, 0, 0, 0, 0, 0, −1, 0, −1, 0, −1,
0, −1, 0, −1, 0, +1, 0, +1, 0, −1, 0, −1, 0, +1, 0, −1, 0, +1, 0, −1, 0, −1, 0, −1, 0, −1, 0, −1,
0, −1, 0, +1, 0, −1, 0, +1, 0, +1, 0, −1, 0, +1, 0, −1, 0, +1, 0, +1, 0, +1, 0, +1, 0, +1, 0, +1,
0, +1, 0, −1, 0, −1, 0, +1, 0, +1, 0, −1, 0, +1, 0, −1, 0, +1, 0, −1, 0, −1, 0, −1, 0, −1, 0, −1,
0, +1, 0, −1, 0, +1, 0, +1, 0, −1, 0, +1, 0, −1, 0, +1, 0, +1, 0, +1, 0, +1, 0, +1, 0, +1, 0, +1,
0, −1, 0, −1, 0, +1, 0, +1, 0, −1, 0, +1, 0, −1, 0, +1, 0, −1, 0, −1, 0, −1, 0, −1, 0, −1, 0, +1,
0, +1, 0, −1, 0, −1, 0, +1, 0, −1, 0, +1, 0, −1, 0, −1, 0, −1, 0, −1, 0, −1, 0, −1, 0, +1, 0, −1,
0, +1, 0, +1, 0, −1, 0, +1, 0, −1, 0, +1, 0, +1, 0, −1, 0, −1, 0, −1, 0, −1, 0, −1, 0, +1, 0, +1,
0, −1, 0, −1, 0, +1, 0, −1, 0, +1, 0, −1, 0, +1, 0, +1, 0, +1, 0, +1, 0, +1, 0, −1, 0, +1, 0, −1,
0, −1, 0, +1, 0, −1, 0, +1, 0, −1, 0, +1}

An 80 MHz-band 2x HE-LTF specified in the existing 802.11ax, i.e., HE, is as follows.

$HELTF_{-500,500}$ =
{+1, 0, +1, 0, −1, 0, +1, 0, +1, 0, +1, 0, −1, 0, +1, 0, +1, 0, +1, 0, +1, 0, −1, 0, −1, 0, −1,
0, +1, 0, −1, 0, −1, 0, +1, 0, +1, 0, −1, 0, +1, 0, +1, 0, +1, 0, −1, 0, −1, 0, −1, 0, −1, 0, +1,
0, +1, 0, +1, 0, +1, 0, −1, 0, +1, 0, +1, 0, +1, 0, −1, 0, +1, 0, −1, 0, −1, 0, +1, 0, −1, 0, −1,
0, −1, 0, +1, 0, +1, 0, −1, 0, −1, 0, −1, 0, +1, 0, −1, 0, −1, 0, +1, 0, −1, 0, +1, 0, +1, 0, −1,
0, +1, 0, +1, 0, −1, 0, +1, 0, −1, 0, −1, 0, −1, 0, +1, 0, −1, 0, −1, 0, −1, 0, −1, 0, +1, 0, −1,
0, −1, 0, +1, 0, +1, 0, −1, 0, +1, 0, +1, 0, +1, 0, −1, 0, −1, 0, −1, 0, −1, 0, +1, 0, −1, 0, +1,
0, +1, 0, +1, 0, −1, 0, +1, 0, +1, 0, +1, 0, +1, 0, −1, 0, −1, 0, −1, 0, +1, 0, +1, 0, +1, 0, −1,
0, −1, 0, +1, 0, +1, 0, +1, 0, −1, 0, +1, 0, +1, 0, −1, 0, +1, 0, −1, 0, −1, 0, −1, 0, −1, 0, +1,
0, −1, 0, −1, 0, −1, 0, +1, 0, −1, 0, +1, 0, +1, 0, −1, 0, +1, 0, +1, 0, −1, 0, −1, 0, −1, 0, +1,
0, −1, 0, −1, 0, −1, 0, +1, 0, −1, 0, +1, 0, +1, 0, −1, 0, +1, 0, +1, 0, +1, 0, −1, 0, −1, 0, +1,
0, +1, 0, +1, 0, −1, 0, +1, 0, +1, 0, −1, 0, +1, 0, −1, 0, −1, 0, +1, 0, −1, 0, +1, 0, +1, 0, +1,
0, −1, 0, +1, 0, +1, 0, +1, 0, +1, 0, −1, 0, −1, 0, −1, 0, +1, 0, −1, 0, −1, 0, +1, 0, +1, 0, −1,
0, +1, 0, +1, 0, +1, 0, −1, 0, −1, 0, −1, 0, −1, 0, +1, 0, +1, 0, +1, 0, −1, 0, −1, 0, −1, 0, −1,
0, +1, 0, −1, 0, −1, 0, −1, 0, +1, 0, −1, 0, +1, 0, +1, 0, +1, 0, −1, 0, −1, 0, +1, 0, +1, 0, +1,
0, −1, 0, +1, 0, +1, 0, −1, 0, +1, 0, −1, 0, −1, 0, −1, 0, −1, 0, +1, 0, −1, 0, −1, 0, −1, 0, +1,
0, −1, 0, +1, 0, +1, 0, −1, 0, +1, 0, +1, 0, −1, 0, +1, 0, +1, 0, −1, 0, −1, 0, +1, 0, −1, 0, −1,
0, −1, 0, +1, 0, +1, 0, +1, 0, +1, 0, −1, 0, +1, 0, −1, 0, −1, 0, −1, 0, +1, 0, −1, 0, −1, 0, −1,
0, −1, 0, +1, 0, +1, 0, +1, 0, +1, 0, −1, 0, −1, 0, −1, 0, +1, 0, +1, 0, +1, 0, 0, 0, 0, 0, 0, 0,
+1, 0, −1, 0, −1, 0, +1, 0, +1, 0, −1, 0, +1, 0, −1, 0, −1, 0, −1, 0, +1, 0, +1, 0, +1, 0, +1, 0,
−1, 0, +1, 0, +1, 0, +1, 0, −1, 0, +1, 0, −1, 0, −1, 0, −1, 0, −1, 0, +1, 0, +1, 0, +1, 0, −1, 0,
+1, 0, +1, 0, −1, 0, −1, 0, +1, 0, −1, 0, −1, 0, +1, 0, −1, 0, −1, 0, +1, 0, −1, 0, +1, 0, +1, 0,
+1, 0, −1, 0, +1, 0, +1, 0, +1, 0, +1, 0, −1, 0, +1, 0, −1, 0, −1, 0, +1, 0, −1, 0, −1, 0, −1, 0,
+1, 0, +1, 0, −1, 0, −1, 0, −1, 0, +1, 0, −1, 0, +1, 0, +1, 0, +1, 0, −1, 0, +1, 0, +1, 0, +1, 0,
+1, 0, −1, 0, −1, 0, −1, 0, +1, 0, +1, 0, +1, 0, +1, 0, −1, 0, −1, 0, −1, 0, +1, 0, −1, 0, −1, 0,
+1, 0, +1, 0, −1, 0, +1, 0, +1, 0, +1, 0, −1, 0, −1, 0, −1, 0, −1, 0, +1, 0, −1, 0, −1, 0, −1, 0,
+1, 0, −1, 0, +1, 0, +1, 0, −1, 0, +1, 0, −1, 0, −1, 0, +1, 0, −1, 0, −1, 0, −1, 0, +1, 0, +1, 0,
−1, 0, −1, 0, −1, 0, +1, 0, −1, 0, −1, 0, +1, 0, −1, 0, +1, 0, +1, 0, +1, 0, −1, 0, +1, 0, +1, 0,
+1, 0, −1, 0, +1, 0, −1, 0, +1, 0, +1, 0, −1, 0, +1, 0, −1, 0, −1, 0, −1, 0, +1, 0, −1, 0, −1, 0,
−1, 0, −1, 0, +1, 0, −1, 0, +1, 0, +1, 0, −1, 0, +1, 0, +1, 0, +1, 0, −1, 0, −1, 0, +1, 0, +1, 0,
+1, 0, −1, 0, −1, 0, −1, 0, +1, 0, +1, 0, +1, 0, +1, 0, −1, 0, +1, 0, +1, 0, +1, 0, −1, 0, +1, 0,
−1, 0, −1, 0, −1, 0, −1, 0, +1, 0, +1, 0, +1, 0, −1, 0, +1, 0, +1, 0, −1, 0, −1, 0, +1, 0, −1, 0,
−1, 0, −1, 0, −1, 0, +1, 0, −1, 0, −1, 0, −1, 0, +1, 0, −1, 0, +1, 0, +1, 0, −1, 0, +1, 0, +1, 0,
−1, 0, +1, 0, −1, 0, −1, 0, +1, 0, −1, 0, −1, 0, −1, 0, +1, 0, +1, 0, −1, 0, −1, 0, −1, 0, +1, 0,
−1, 0, −1, 0, +1, 0, −1, 0, +1, 0, +1, 0, +1, 0, −1, 0, +1, 0, +1, 0, +1, 0, +1, 0, −1, 0, −1, 0,
−1, 0, −1, 0, +1, 0, +1, 0, +1, 0, −1, 0, +1, 0, +1, 0, −1, 0, −1, 0, +1, 0, −1, 0, −1, 0, −1, 0,
+1, 0, +1, 0, +1, 0, +1, 0, −1, 0, +1, 0, +1, 0, +1, 0, −1, 0, +1, 0, +1}

A 160 MHz-band 2x HE-LTF specified in the existing 802.11ax, i.e., HE, is as follows.

$HELTF_{-1012,1012}$ = {$LTF_{80MHz\_lower\_2x}$, 0, 0, 0, 0, 0, 0, 0, 0, 0, 0, 0, 0, 0, 0, 0, 0, 0, 0, 0, 0,
0, 0, 0, $LTF_{80MHz\_upper\_2x}$}
$LTF_{80MHz\_lower\_2x}$ = {$LTF_{80MHz\_part1\_2x}$, $LTF_{80MHz\_part2\_2x}$, $LTF_{80MHz\_part3\_2x}$, $LTF_{80MHz\_part4\_2x}$,
$LTF_{80MHz\_part5\_2x}$} parts shall be used in the lower 80 MHz frequency subblock
$LTF_{80MHz\_upper\_2x}$ = {$LTF_{80MHz\_part1\_2x}$, $-LTF_{80MHz\_part2\_2x}$, $LTF_{80MHz\_part3\_2x}$, $LTF_{80MHz\_part4\_2x}$,
$-LTF_{80MHz\_part5\_2x}$} shall be used in the upper 80 MHz frequency subblock
$LTF_{80MHz\_part1\_2x}$ = {+1, 0, +1, 0, −1, 0, +1, 0, +1, 0, +1, 0, −1, 0, +1, 0, +1, 0, +1, 0, +1, 0, −1, 0, −1, 0,
−1, 0, +1, 0, −1, 0, −1, 0, +1, 0, +1, 0, −1, 0, +1, 0, +1, 0, +1, 0, −1, 0, −1, 0, −1, 0, −1, 0, +1, 0,
+1, 0, +1, 0, +1, 0, −1, 0, +1, 0, +1, 0, +1, 0, −1, 0, +1, 0, −1, 0, −1, 0, +1, 0, −1, 0, −1, 0, −1, 0,
+1, 0, +1, 0, −1, 0, −1, 0, −1, 0, +1, 0, −1, 0, −1, 0, +1, 0, −1, 0, +1, 0, +1, 0, −1, 0, +1, 0, +1, 0,
−1, 0, +1, 0, −1, 0, −1, 0, −1, 0, +1, 0, −1, 0, −1, 0, −1, 0, −1, 0, +1, 0, −1, 0, −1, 0, +1, 0, +1, 0,
−1, 0, +1, 0, +1, 0, +1, 0, −1, 0, −1, 0, −1, 0, −1, 0, +1, 0, −1, 0, −1, 0, +1, 0, −1, 0, −1, 0, +1, 0,
+1, 0, +1, 0, +1, 0, −1, 0, −1, 0, −1, 0, +1, 0, +1, 0, +1, 0, −1, 0, −1, 0, +1, 0, +1, 0, +1, 0, −1, 0,
+1, 0, +1, 0, −1, 0, +1, 0, −1, 0, −1, 0, −1, 0, −1, 0, +1, 0, −1, 0, −1, 0, −1, 0, +1, 0, −1, 0, +1, 0,
+1, 0, −1, 0, +1, 0}

-continued $LTF_{80MHz\_part2\_2x}$ = {+1, 0, −1, 0, −1, 0, −1, 0, +1, 0, −1, 0, −1, 0, −1, 0, +1, 0, −1, 0, +1, 0, +1, 0, −1, 0,
+1, 0, +1, 0, +1, 0, −1, 0, −1, 0, +1, 0, +1, 0, +1, 0, −1, 0, +1, 0, +1, 0, −1, 0, +1, 0, −1, 0, −1, 0,
+1, 0, −1, 0, +1, 0, +1, 0, +1, 0, −1, 0, +1, 0, −1, 0, +1, 0, +1, 0, −1, 0, −1, 0, −1, 0, +1, 0, −1, 0,
−1, 0, +1, 0, +1, 0, −1, 0, +1, 0, +1, 0, +1, 0, −1, 0, −1, 0, −1, 0, −1, 0, +1, 0, +1, 0, +1, 0, −1, 0,
−1, 0, −1, 0, −1, 0, +1, 0, −1, 0, −1, 0, −1, 0, +1, 0, −1, 0, +1, 0, +1, 0, +1, 0, −1, 0, −1, 0, +1, 0,
+1, 0, +1, 0, −1, 0, +1, 0, +1, 0, −1, 0, +1, 0, −1, 0, −1, 0, −1, 0, −1, 0, +1, 0, −1, 0, −1, 0, −1, 0,
+1, 0, −1, 0, +1, 0, +1, 0, −1, 0, +1, 0, +1, 0, −1, 0, +1, 0, +1, 0, −1, 0, −1, 0, +1, 0, −1, 0, −1, 0,
−1, 0, +1, 0, +1, 0, +1, 0, +1, 0, −1, 0, +1, 0, −1, 0, −1, 0, −1, 0, +1, 0, −1, 0, −1, 0, −1, 0, −1, 0,
+1, 0, +1, 0, +1, 0}

$LTF_{80MHz\_part3\_2x}$ = {+1, 0, −1, 0, −1, 0, −1, 0, +1, 0, +1, 0, +1, 0, 0, 0, 0, 0, 0, 0, +1, 0, −1, 0, −1, 0, +1, 0,
+1, 0, −1, 0, +1}

$LTF_{80MHz\_part4\_2x}$ = {0, −1, 0, −1, 0, −1, 0, +1, 0, −1, 0, +1, 0, +1, 0, −1, 0, −1, 0, +1, 0, +1, 0, −1, 0, +1, 0,
−1, 0, −1, 0, −1, 0, −1, 0, +1, 0, +1, 0, +1, 0, −1, 0, +1, 0, +1, 0, −1, 0, −1, 0, +1, 0, −1, 0, −1, 0,
+1, 0, −1, 0, −1, 0, +1, 0, −1, 0, +1, 0, +1, 0, +1, 0, −1, 0, −1, 0, +1, 0, +1, 0, +1, 0, −1, 0, +1, 0,
−1, 0, −1, 0, +1, 0, −1, 0, −1, 0, −1, 0, +1, 0, +1, 0, −1, 0, −1, 0, −1, 0, +1, 0, −1, 0, +1, 0, +1, 0,
+1, 0, −1, 0, +1, 0, +1, 0, +1, 0, +1, 0, −1, 0, −1, 0, −1, 0, +1, 0, +1, 0, +1, 0, −1, 0, −1, 0, −1, 0,
−1, 0, +1, 0, −1, 0, −1, 0, +1, 0, +1, 0, −1, 0, +1, 0, +1, 0, +1, 0, −1, 0, −1, 0, −1, 0, −1, 0, +1, 0,
−1, 0, −1, 0, −1, 0, +1, 0, −1, 0, +1, 0, +1, 0, −1, 0, +1, 0, −1, 0, −1, 0, +1, 0, −1, 0, −1, 0, −1, 0,
+1, 0, +1, 0, −1, 0, −1, 0, −1, 0, +1, 0, −1, 0, −1, 0, +1, 0, −1, 0, +1, 0, −1, 0, +1, 0, −1, 0, +1, 0,
+1, 0, +1, 0, −1}

$LTF_{80MHz\_part5\_2x}$ = {0, +1, 0, −1, 0, +1, 0, +1, 0, −1, 0, +1, 0, −1, 0, −1, 0, −1, 0, −1, 0, −1, 0, −1, 0, −1, 0,
−1, 0, +1, 0, −1, 0, +1, 0, +1, 0, −1, 0, +1, 0, +1, 0, +1, 0, −1, 0, −1, 0, +1, 0, +1, 0, +1, 0, −1, 0,
−1, 0, −1, 0, +1, 0, +1, 0, +1, 0, +1, 0, −1, 0, +1, 0, +1, 0, +1, 0, −1, 0, +1, 0, −1, 0, −1, 0, −1, 0,
−1, 0, +1, 0, +1, 0, +1, 0, −1, 0, −1, 0, +1, 0, −1, 0, −1, 0, +1, 0, −1, 0, −1, 0, −1, 0, −1, 0, +1, 0,
−1, 0, −1, 0, −1, 0, +1, 0, −1, 0, +1, 0, +1, 0, −1, 0, +1, 0, +1, 0, −1, 0, +1, 0, −1, 0, −1, 0, +1, 0,
−1, 0, −1, 0, −1, 0, +1, 0, +1, 0, −1, 0, −1, 0, −1, 0, +1, 0, −1, 0, −1, 0, +1, 0, −1, 0, +1, 0, +1, 0,
+1, 0, −1, 0, +1, 0, +1, 0, +1, 0, +1, 0, −1, 0, −1, 0, −1, 0, −1, 0, +1, 0, +1, 0, +1, 0, −1, 0, +1, 0,
+1, 0, −1, 0, −1, 0, +1, 0, −1, 0, −1, 0, −1, 0, +1, 0, +1, 0, +1, 0, +1, 0, −1, 0, +1, 0, +1, 0, +1, 0,
−1, 0, +1, 0, +1}

In case of 80+80 MHz transmission using the 2x HE-LTF, a lower 80 MHz frequency segment shall use the 80 MHz 2xHE-LTF sequence of $HELTF_{-500,500} = LTF_{80\ MHz\_lower\_2x}$, and an upper 80 MHz frequency segment shall use the 80 MHz 2xHE-LTF sequence of $HELTF_{-500,500} = LTF_{80\ MHz\_upper\_2x}$.

A 20 MHz-band 4x HE-LTF specified in the existing 802.11ax, i.e., HE, is as follows.

$HELTF_{-122,122}$ =
{−1, −1, +1, −1, +1, −1, +1, +1, +1, −1, +1, +1, +1, −1, −1, +1, −1, −1, −1, −1, −1, +1, +1,
−1, −1, −1, −1, +1, +1, −1, +1, −1, +1, +1, +1, +1, −1, +1, −1, −1, +1, +1, −1, +1, +1, +1,
+1, −1, −1, +1, −1, −1, −1, +1, +1, +1, +1, −1, +1, +1, −1, −1, −1, −1, +1, −1, −1, +1, +1,
−1, +1, −1, −1, −1, −1, +1, −1, +1, −1, −1, −1, −1, −1, −1, +1, +1, −1, −1, −1, −1, −1, +1,
−1, −1, +1, +1, +1, −1, +1, +1, +1, −1, +1, −1, +1, −1, −1, −1, −1, −1, +1, +1, +1, −1, −1,
−1, +1, −1, +1, +1, +1, 0, 0, 0, −1, +1, −1, +1, −1, +1, +1, −1, +1, +1, +1, −1, −1, +1, −1,
−1, +1, −1, +1, −1, +1, +1, +1, −1, +1, +1, +1, −1, −1, +1, −1, −1, −1, −1, −1, +1, +1, −1,
−1, −1, −1, −1, −1, +1, −1, +1, −1, −1, −1, −1, +1, −1, +1, +1, −1, −1, +1, −1, −1, −1, −1,
+1, +1, −1, +1, +1, +1, +1, +1, +1, +1, −1, +1, +1, −1, −1, −1, −1, +1, −1, −1, +1, +1, −1,
+1, −1, −1, −1, −1, +1, −1, +1, −1, −1, +1, +1, +1, +1, −1, −1, +1, +1, +1, +1, +1, −1, +1,
+1, −1, −1, −1, +1, −1, −1, −1, +1, −1, +1, −1, +1, +1}

A 40 MHz-band 4x HE-LTF specified in the existing 802.11ax, i.e., HE, is as follows.

$HELTF_{-244,244}$ =
{+1, −1, −1, −1, −1, +1, −1, −1, +1, +1, −1, +1, −1, +1, −1, +1, +1, −1,, +1, −1, −1, −1, +1,
+1, −1, −1, −1, −1, −1, −1, −1, +1, −1, −1, +1, +1, −1, +1, −1, −1, −1, −1, −1, +1, −1, +1,
+1, +1, −1, −1, +1, +1, +1, −1, −1, +1, +1, +1, +1, −1, +1, +1, −1, −1, +1, −1, +1, −1, +1,
−1, −1, +1, −1, +1, +1, +1, −1, −1, +1, +1, +1, −1, −1, −1, −1, +1, −1, −1, +1, +1, −1, +1,
−1, −1, −1, −1, −1, +1, −1, +1, +1, +1, −1, −1, +1, +1, +1, +1, +1, +1, +1, +1, −1, +1, +1,
−1, −1, +1, −1, +1, +1, +1, +1, +1, −1, +1, −1, −1, −1, +1, +1, −1, −1, −1, −1, −1, −1, −1,
−1, +1, −1, −1, +1, +1, −1, +1, −1, +1, −1, +1, +1, −1, +1, −1, −1, −1, +1, +1, −1, −1, −1,
−1, −1, −1, −1, +1, −1, −1, +1, +1, −1, +1, −1, −1, −1, −1, −1, +1, −1, +1, +1, +1, −1, −1,
+1, +1, +1, −1, −1, −1, −1, −1, −1, +1, −1, −1, +1, +1, −1, +1, −1, +1, −1, +1, +1, −1, +1,
−1, −1, −1, +1, +1, −1, −1, −1, +1, +1, +1, +1, −1, +1, +1, −1, −1, +1, −1, +1, +1, +1, +1,
+1, −1, +1, −1, −1, −1, +1, +1, −1, −1, −1, +1, 0, 0, 0, 0, 0, −1, +1, +1, +1, +1, −1, +1, +1,
−1, −1, +1, −1, +1, −1, +1, −1, −1, +1, −1, +1, +1, +1, −1, −1, +1, +1, +1, +1, +1, +1, +1,
−1, +1, +1, −1, −1, +1, −1, +1, +1, +1, +1, +1, −1, +1, −1, −1, −1, +1, +1, −1, −1, −1, +1,
+1, −1, −1, −1, −1, +1, −1, −1, +1, +1, −1, +1, −1, +1, −1, +1, +1, −1, +1, −1, −1, −1, +1,
+1, −1, −1, −1, +1, +1, +1, +1, −1, +1, +1, −1, −1, +1, −1, +1, +1, +1, +1, +1, −1, +1, −1,
−1, −1, +1, +1, −1, −1, −1, +1, −1, −1, −1, −1, +1, −1, −1, +1, +1, −1, +1, −1, +1, −1, +1,

-continued

+1, −1, +1, −1, −1, −1, +1, +1, −1, −1, −1, +1, −1, −1, −1, −1, +1, −1, −1, +1, +1, −1, +1,
−1, +1, −1, +1, +1, −1, +1, −1, −1, −1, +1, +1, −1, −1, −1, −1, −1, −1, −1, +1, −1, −1, +1,
+1, −1, +1, −1, −1, −1, −1, −1, +1, −1, +1, +1, +1, −1, −1, +1, +1, +1, −1, +1, −1, −1, −1,
−1, +1, −1, −1, +1, +1, −1, +1, −1, +1, −1, +1, +1, −1, +1, −1, −1, −1, +1, +1, −1, −1, −1,
+1, +1, +1, +1, −1, +1, +1, −1, −1, +1, −1, +1, +1, +1, +1, +1, −1, +1, −1, −1, −1, +1, +1,
−1, −1, −1, −1}

An 80 MHz-band 4x HE-LTF specified in the existing 802.11ax, i.e., HE, is as follows.

$HELTF_{-500,500}$ =
{+1, +1, −1, +1, −1, +1, −1, −1, −1, +1, −1, −1, −1, +1, +1, −1, +1, +1, +1, +1, +1, −1, −1,
+1, +1, +1, +1, −1, +1, −1, +1, −1, −1, +1, +1, −1, +1, +1, +1, −1, −1, +1, −1, −1, −1, −1,
+1, +1, +1, −1, −1, −1, −1, −1, −1, +1, +1, +1, +1, +1, +1, −1, +1, +1, +1, −1, +1, +1, −1,
−1, −1, +1, +1, −1, −1, +1, +1, −1, +1, −1, +1, +1, +1, +1, +1, −1, −1, +1, +1, +1, −1,
+1, +1, −1, −1, −1, +1, −1, +1, +1, −1, +1, +1, −1, +1, −1, −1, +1, +1, +1, +1, −1, −1, +1,
+1, +1, +1, +1, −1, +1, +1, −1, −1, −1, +1, −1, −1, −1, +1, −1, +1, −1, +1, +1, −1, +1, −1,
+1, −1, +1, +1, +1, −1, +1, +1, +1, −1, −1, +1, −1, −1, −1, −1, −1, +1, +1, −1, −1, −1, −1,
+1, −1, +1, −1, +1, +1, −1, −1, +1, −1, −1, −1, +1, +1, −1, +1, +1, +1, +1, −1, −1, −1, +1,
+1, +1, +1, −1, +1, +1, +1, +1, +1, +1, +1, −1, +1, +1, +1, −1, +1, +1, −1, −1, −1, +1, −1,
+1, −1, −1, +1, +1, −1, +1, −1, +1, +1, +1, +1, +1, −1, −1, +1, +1, +1, −1, +1, +1, −1, −1,
−1, +1, −1, +1, +1, −1, +1, +1, −1, +1, −1, −1, +1, −1, +1, −1, +1, −1, +1, +1, +1, −1, +1,
+1, +1, −1, −1, +1, −1, −1, −1, −1, −1, +1, +1, −1, −1, −1, −1, +1, −1, +1, −1, +1, +1, −1,
−1, +1, −1, −1, −1, +1, +1, −1, +1, +1, +1, +1, −1, −1, −1, +1, +1, +1, +1, −1, +1, −1, −1,
−1, −1, −1, −1, +1, −1, −1, −1, +1, −1, −1, +1, +1, +1, −1, +1, −1, +1, +1, −1, −1, +1, −1,
+1, −1, −1, −1, −1, −1, +1, +1, −1, −1, −1, +1, −1, −1, +1, +1, +1, −1, +1, −1, −1, +1, −1,
−1, +1, −1, +1, +1, +1, +1, +1, +1, −1, −1, +1, +1, +1, +1, +1, −1, +1, +1, −1, −1, −1, +1,
−1, −1, −1, +1, −1, +1, −1, +1, +1, −1, +1, −1, +1, −1, +1, +1, +1, −1, +1, +1, +1, −1, −1,
+1, −1, −1, −1, −1, −1, +1, +1, −1, −1, −1, −1, +1, −1, +1, −1, +1, +1, −1, −1, +1, −1, −1,
−1, +1, +1, −1, +1, +1, +1, +1, −1, −1, −1, +1, +1, +1, +1, −1, −1, +1, +1, +1, +1, +1, +1,
−1, +1, +1, +1, −1, +1, +1, −1, −1, −1, +1, −1, +1, −1, −1, +1, +1, −1, +1, −1, +1, +1, +1,
+1, +1, −1, −1, +1, +1, +1, −1, +1, +1, −1, −1, −1, +1, −1, +1, +1, −1, +1, +1, −1, +1, −1,
−1, −1, +1, −1, +1, −1, −1, −1, −1, +1, +1, +1, −1, −1, +1, 0, 0, 0, 0, 0, +1, −1, −1, −1, −1,
−1, −1, +1, −1, +1, +1, −1, −1, +1, +1, −1, +1, −1, +1, +1, −1, −1, +1, −1, +1, −1, −1, −1,
+1, +1, −1, +1, +1, +1, −1, +1, +1, +1, +1, +1, +1, +1, −1, +1, −1, −1, +1, −1, −1, +1, −1,
+1, +1, +1, −1, −1, +1, −1, −1, −1, +1, +1, −1, −1, −1, −1, −1, +1, −1, −1, −1, −1, −1, +1,
+1, −1, −1, −1, −1, −1, +1, −1, −1, +1, +1, +1, −1, +1, +1, +1, −1, +1, −1, +1, −1, −1, −1,
−1, −1, +1, +1, +1, −1, −1, −1, −1, +1, −1, −1, +1, +1, +1, −1, +1, +1, −1, −1, +1, −1, +1,
−1, −1, −1, −1, −1, −1, −1, +1, +1, −1, −1, −1, +1, −1, −1, +1, +1, +1, −1, +1, −1, −1, +1,
−1, −1, +1, −1, +1, +1, +1, −1, +1, −1, −1, +1, +1, −1, +1, −1, +1, +1, +1, −1, −1, +1, −1,
−1, −1, +1, −1, −1, −1, −1, −1, −1, −1, +1, −1, +1, +1, −1, +1, +1, −1, +1, −1, −1, −1, +1,
+1, −1, +1, +1, +1, −1, −1, +1, +1, +1, +1, +1, −1, +1, −1, −1, −1, −1, +1, +1, −1, −1, −1,
−1, −1, +1, −1, −1, +1, +1, +1, −1, +1, +1, +1, −1, +1, −1, +1, −1, −1, −1, −1, −1, +1, +1,
+1, −1, −1, −1, −1, +1, −1, −1, +1, +1, +1, −1, +1, +1, −1, −1, +1, −1, +1, −1, +1, +1, +1,
−1, +1, −1, −1, +1, +1, −1, +1, −1, +1, +1, +1, −1, −1, +1, −1, −1, −1, +1, −1, −1, −1, −1,
−1, −1, −1, +1, −1, +1, +1, −1, +1, +1, −1, +1, −1, −1, −1, +1, +1, −1, +1, +1, +1, −1, −1,
+1, +1, +1, +1, +1, −1, +1, +1, +1, +1, +1, −1, −1, +1, +1, +1, +1, +1, −1, +1, +1, −1, −1,
−1, +1, −1, −1, −1, +1, −1, +1, −1, +1, +1, +1, +1, +1, −1, −1, −1, +1, +1, +1, +1, −1, +1,
+1, −1, −1, −1, +1, −1, −1, +1, +1, −1, +1, −1, +1, −1, −1, −1, −1, −1, −1, +1, +1, −1, −1,
−1, +1, −1, −1, +1, +1, +1, −1, +1, −1, −1, +1, −1, −1, +1, −1, +1, −1, +1, −1, +1, −1, −1,
+1, +1, −1, +1, −1, +1, +1, +1, −1, −1, +1, −1, −1, −1, +1, −1, −1, −1, −1, −1, −1, −1, +1,
−1, +1, +1, −1, +1, +1, −1, +1, −1, −1, −1, +1, +1, −1, +1, +1, +1, −1, −1, +1, +1, +1, +1,
+1, −1, +1, −1, −1, −1, −1, +1, +1, −1, −1, −1, −1, −1, +1, −1, −1, +1, +1, +1, −1, +1, +1,
+1, −1, +1, −1, +1, −1, −1, −1, −1, −1, +1, +1, +1, −1, −1, −1, −1, +1, −1, −1, +1, +1, +1,
−1, +1, +1, −1, −1, +1, −1, +1, −1, +1}

A 160 MHz-band 4x HE-LTF specified in the existing 802.11ax, i.e., HE, is as follows.

$HELTF_{-1012,1012}$ ={$LTF_{80MHz\_lower\_4x}$, 0, 0, 0, 0, 0, 0, 0, 0, 0, 0, 0, 0, 0, 0, 0, 0, 0, 0, 0, 0,
0, 0, 0, $LTF_{80MHz\_upper\_4x}$}

$LTF_{80MHz\_lower\_4x}$ = {$LTF_{80MHz\_left\_4x}$, 0, $LTF_{80MHz\_right\_4x}$} shall be used in the lower 80 MHz frequency segment $LTF_{80MHz\_upper\_4x}$ = {$LTF_{80MHz\_left\_4x}$, 0, −$LTF_{80MHz\_right\_4x}$} shall be used in the upper 80 MHz frequency segment $LTF_{80MHz\_left\_4x}$ = {+1, +1, −1, +1, −1, +1, −1, −1, −1, +1, −1, −1, −1, +1, +1, −1, +1, +1, +1, +1, +1, −1,
−1, +1, +1, +1, +1, −1, +1, −1, +1, −1, −1, +1, +1, −1, +1, +1, +1, −1, −1, +1, −1, −1, −1, −1, +1,
+1, +1, −1, −1, −1, −1, −1, −1, +1, +1, +1, +1, +1, +1, −1, +1, +1, +1, −1, +1, +1, −1, −1, −1, +1,
−1, +1, −1, −1, +1, +1, −1, +1, −1, +1, +1, +1, +1, +1, −1, −1, +1, +1, +1, −1, +1, +1, −1, −1, −1,
+1, −1, +1, +1, −1, +1, +1, −1, +1, −1, −1, +1, +1, +1, +1, −1, −1, +1, +1, +1, +1, +1, −1, +1, +1,
−1, −1, −1, +1, −1, −1, −1, +1, −1, +1, −1, +1, +1, −1, +1, −1, +1, −1, +1, +1, +1, −1, +1, +1, +1,
−1, +1, +1, −1, +1, +1, +1, +1, −1, −1, −1, +1, +1, +1, +1, −1, +1, +1, +1, +1, +1, +1, +1, −1, −1,
+1, +1, −1, +1, +1, −1, −1, −1, +1, −1, +1, −1, −1, +1, +1, −1, +1, −1, +1, +1, +1, +1, +1, −1, −1, -continued +1, +1, +1, −1, +1, +1, −1, −1, −1, +1, −1, +1, +1, −1, +1, +1, −1, +1, −1, −1, +1, −1, +1, −1, +1,
−1, +1, +1, +1, −1, +1, +1, +1, −1, −1, +1, −1, −1, −1, −1, −1, +1, +1, −1, −1, −1, −1, +1, −1, +1,
−1, +1, +1, −1, −1, +1, −1, −1, −1, +1, +1, −1, +1, +1, +1, +1, −1, −1, −1, +1, +1, +1, +1, −1, +1,
−1, −1, −1, −1, −1, −1, +1, −1, −1, −1, +1, −1, −1, +1, +1, +1, −1, +1, −1, +1, +1, −1, −1, +1, −1,
+1, −1, −1, −1, −1, −1, +1, +1, −1, −1, −1, +1, −1, −1, +1, +1, +1, −1, +1, −1, −1, +1, −1, −1, +1,
−1, +1, +1, +1, +1, +1, +1, −1, −1, +1, +1, +1, +1, +1, −1, +1, +1, −1, −1, −1, +1, −1, −1, −1, +1,
−1, +1, −1, +1, +1, −1, +1, −1, +1, −1, +1, +1, +1, −1, +1, +1, +1, −1, −1, +1, −1, −1, −1, −1, −1,
+1, +1, −1, −1, −1, −1, +1, −1, +1, −1, +1, +1, −1, −1, +1, −1, −1, −1, +1, +1, −1, +1, +1, +1, +1,
+1, −1, +1, −1, −1, +1, +1, −1, +1, −1, +1, +1, +1, +1, +1, −1, −1, +1, +1, +1, −1, +1, +1, −1, −1,
−1, +1, −1, +1, +1, −1, +1, +1, −1, +1, −1, −1, −1, +1, −1, +1, −1, −1, −1, −1, +1, +1, +1, −1, −1,
+1, 0, 0}

$LTF_{80MHz\_right\_4x}$ = {0, 0, +1, −1, −1, −1, −1, −1, −1, +1, −1, +1, +1, −1, −1, +1, +1, −1, +1, −1, +1, +1, −1,
−1, +1, −1, +1, −1, −1, −1, +1, +1, −1, +1, +1, +1, −1, +1, +1, +1, +1, +1, +1, +1, −1, +1, −1, −1,
+1, −1, −1, +1, −1, +1, +1, +1, −1, −1, +1, −1, −1, −1, +1, +1, −1, −1, −1, −1, −1, +1, −1, −1, −1,
−1, −1, +1, +1, −1, −1, −1, −1, −1, +1, −1, −1, +1, +1, +1, −1, +1, +1, +1, −1, +1, −1, +1, −1, −1,
−1, −1, −1, +1, +1, +1, −1, −1, −1, −1, +1, −1, −1, +1, +1, +1, −1, +1, +1, −1, −1, +1, −1, +1, −1,
−1, −1, −1, −1, −1, −1, +1, +1, −1, −1, −1, +1, −1, −1, +1, +1, +1, −1, +1, −1, −1, +1, −1, −1, +1,
−1, +1, +1, +1, −1, +1, −1, −1, +1, +1, −1, +1, −1, +1, +1, +1, −1, −1, +1, −1, −1, −1, +1, −1, −1,
−1−1, −1, −1, −1, +1, −1, +1, +1, −1, +1, +1, −1, +1, −1, −1, −1, +1, +1, −1, +1, +1, +1, −1, −1,
+1, +1, +1, +1, +1, −1, +1, −1, −1, −1, −1, +1, +1, −1, −1, −1, −1, −1, +1, −1, −1, +1, +1, +1, −1,
+1, +1, +1, −1, +1, −1, +1, −1, −1, −1, −1, −1, +1, +1, +1, −1, −1, −1, −1, +1, −1, −1, +1, +1, +1,
−1, +1, +1, −1, −1, +1, −1, +1, −1, +1, +1, +1, −1, +1, −1, −1, +1, +1, −1, +1, −1, +1, +1, +1, −1,
−1, +1, −1, −1, −1, +1, −1, −1, −1, −1, −1, −1, −1, +1, −1, +1, +1, −1, +1, +1, −1, +1, −1, −1, −1,
+1, +1, −1, +1, +1, +1, −1, −1, +1, +1, +1, +1, +1, −1, +1, +1, +1, +1, +1, −1, −1, +1, +1, +1,
+1, +1, −1, +1, +1, −1, −1, −1, +1, −1, −1, −1, +1, −1, +1, −1, +1, +1, +1, +1, +1, −1, −1, −1, +1,
+1, +1, +1, −1, +1, +1, −1, −1, −1, +1, −1, −1, +1, +1, −1, +1, −1, +1, −1, −1, −1, −1, −1, −1, +1,
+1, −1, −1, −1, +1, −1, −1, +1, +1, +1, −1, +1, −1, −1, +1, −1, −1, +1, −1, +1, −1, +1, −1, +1, −1,
−1, +1, +1, −1, +1, −1, +1, +1, +1, −1, −1, +1, −1, −1, −1, +1, −1, −1, −1, −1, −1, −1, −1, +1, −1,
+1, +1, −1, +1, +1, −1, +1, −1, −1, −1, +1, +1, −1, +1, +1, +1, −1, −1, +1, +1, +1, +1, +1, −1, +1,
−1, −1, −1, −1, +1, +1, −1, −1, −1, −1, −1, +1, −1, −1, +1, +1, +1, −1, +1, +1, +1, −1, +1, −1, +1,
−1, −1, −1, −1, −1, +1, +1, +1, −1, −1, −1, −1, +1, −1, −1, +1, +1, +1, −1, +1, +1, −1, −1, +1, −1,
+1, −1, +1}

In case of 80+80 MHz transmission using the 4x HE-LTF, a lower 80 MHz frequency segment shall use the 80 MHz 4xHE-LTF sequence of $HELTF_{-500,500}$= $LTF_{80\ MHz\_lower\_4x}$, and an upper 80 MHz frequency segment shall use the 80 MHz 4xHE-LTF sequence of $HELTF_{-500,500}$=$LTF_{80\ MHz\_upper\_4x}$.

Figure 20:
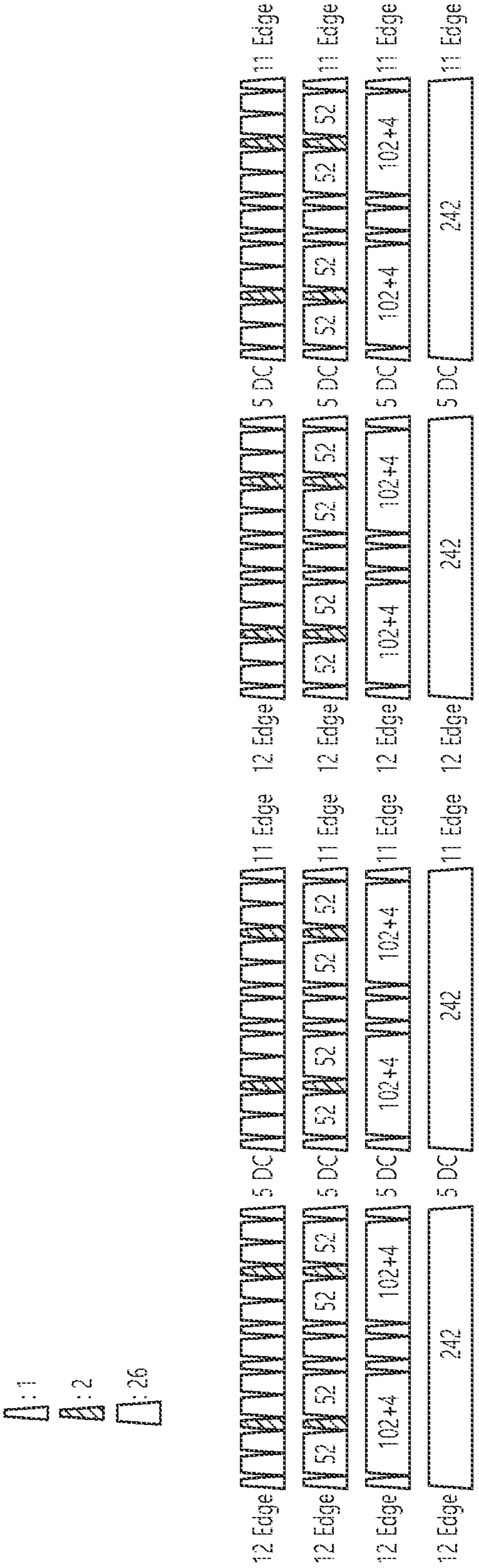
FIG. 20 is a diagram illustrating one embodiment of an 80 MHz OFDMA tone plan.

FIG. 20 is a diagram illustrating one embodiment of an 80 MHz OFDMA tone plan.

Referring to FIG. 20, an 80 MHz OFDMA tone plan can be configured by duplicating the 40 MHz OFDMA tone plan and shifting each +/−20 MHz. For example, 160 MHz, 240 MHz, and 320 MHz tone plans may be configured in a way of duplicating the 80 MHz tone plan.

An 80 MHz OFDMA tone plan can be configured as follows.

{−256+[−244:−3 3:244], 256+[−244:−3 3:244]}=[−500:−259, −253:−12, 12:253, 259:500]

The new tone plan essentially shifts only the '−253:−12' and '12:253' parts and the small RU relative to 11ax. 484RU can be similarly modified to have 5 empty tones in between. 80 MHz OFDMA is a replica of a 40 MHz tone plan, shifting the 484 tone RU in the table below by 256 tones right/left.

This specification proposes an EHT-LTF sequence for 320 MHz BW suitable for the 80 MHz OFDMA tone plan newly applied in 11be. For the existing LTF sequences at 160 MHz, the optimal sequence was found in all RU units starting from the 26-tone based RU unit. Therefore, the LTF sequence for 320 MHz BW of 11be can also apply the LTF sequence applied to the existing 80 MHz or 160 MHz based on 26 RU units suitable for the new tone plan as follows.

(In the updated SFD document, 320 MHz BW allows only 2*996 RU allocation at contiguous 160 MHz compared to the existing RU configuration, and even when transmitting at 240 MHz, only a limited number of RU configurations are allowed among 2*996+484 RU. Details For details, refer to the background description above. Accordingly, the optimal LTF sequence may be different.)

First, looking at the existing 2x sequence in units of 80 MHz, as mentioned above, it can be seen that it can be configured as $LTF_{80\ MHz\_part1\text{-}5\_2x}$. Mapping each tone at 80 MHz by indexing it from −500 to 500 is as follows, which is aligned with the RU of 11ax as shown in FIG. 7.

$LTF_{80\ MHz\_part1\_2x}$: −500~−259: This corresponds to the first 242-tone RU area from the left $LTF_{80\ MHz\_part2\_2x}$: −258~−17: This corresponds to the second 242-tone RU area from the left $LTF_{80\ MHz\_part3\_2x}$: −16~+16: This corresponds to Center-26 and 7 DCs.

$LTF_{80\ MHz_part4_2x}$: +17~+258: This corresponds to the third 242-tone RU area from the left $LTF_{80\ MHz\_part5\_2x}$: +259~+500: This corresponds to the fourth 242-tone RU area from the left For example, LTF80 MHz_part3_2x becomes the location of 26-tone RU and 7-tone DC in the middle of 80 MHz. Therefore, if this sequence is applied to 11be as it is, PAPR is not optimized.

FIG. 20 is a diagram illustrating one embodiment of an 80 MHz OFDMA tone plan.

For PAPR optimization, an LTF sequence optimized for RUs of 11be may be generated based on a new 80 MHz OFDMA tone plan applied to 11be as shown in FIG. 20. At this time, among the four 242-tone RUs included in the 80 MHz band, the pilot position in the areas corresponding to the second and third 242-tones has also changed (e.g., referring to FIGS. 7 and 20, the second from the left, in the 26-tone RU in the area corresponding to the 242-tone RU, the 6th and 20th pilots were changed to the 7th and 21st in 11be, the third from the left has been changed from the 7th and 21st to the 6th and 7th), so the sequence corresponding to the second and third can also be changed. Therefore, the following structure can be considered.

Proposal 1

$LTF_{80\ MHz\_part1\_2x}$: This corresponds to the first 242-tone RU area from the left.

5-tones: This is not used for RUs smaller than 996RU, but is used for RUs larger than 996RU. 5-seq among $LTF_{80\ MHz\_part3\_2x}$ can be used.

$LTF_{80\ MHz_part4_2x}$: This corresponds to the second 242-tone RU area from the left.

23-tones: This is not used for RUs smaller than 996RU, but is used for RUs larger than 996 except for 5 DC. A part of a sequence among $LTF_{80\ MHz\_part3\_2x}$ can be used.

$LTF_{80\ MHz\_part2\_2x}$: This corresponds to the third 242-tone RU area from the left.

5-tones: This is not used for RUs smaller than 996RU, but is used for RUs larger than 996RU. 5-seq among $LTF_{80\ MHz\_part3\_2x}$ can be used.

$LFT_{80\ MHz\_part5\_2x}$: This corresponds to the Third 242-tone RU area from the left.

Here, since $LTF_{80\ MHz\_part1\_2x}$ and $LTF_{80\ MHz\_part2\_2x}$ are sequences derived from the same structure, their positions can be changed. The same applies to $LTF_{80\ MHz_part4_2x}$ and $LFT_{80\ MHz\_\ part5\_2x}$. Therefore, in this specification, a sequence suitable for 11be 320 MHz can be configured by applying different codes of each value with this structure. That is, the structure of the proposed 2x EHT-LTF sequence is as follows.

$EHTLTF_{320\ MHz\_2x}$={$LTF_{80\ MHz\_lower1\_2x}$, 23 zeros, $LTF_{80\ MHz\_upper1\_2x}$, 23 zeros, $LTF_{80}$ MHz_lower2_2x, 23 zeros, $LTF_{80\ MHz\_upper2\_2x}$}

$LTF_{80\ MHz\_lower1\_2x}$={T(1)*$LTF_{80\ MHz\_part1\_2x}$, ±$LTF_{Add\_1}$, T(2)*$LTF_{80\ MHz_part4_2x}$, ±$LTF_{Add\_2}$, ±$LTF_{Add\_3}$, T(3)*$LTF_{80\ MHz\_part2\_2x}$, ±$LTF_{Add\_4}$, T(4)*$LTF_{80\ MHz\_part5\_2x}$}

$LTF_{80\ MHz\_upper1\_2x}$={T(5)*$LTF_{80\ MHz\_part1\_2x}$, ±$LTF_{Add\_1}$, T(6)*$LTF_{80\ MHz_part4_2x}$, ±$LTF_{Add\_2}$, ±$LTF_{Add\_3}$, T(7)*$LTF_{80\ MHz\_part2\_2x}$, ±$LTF_{Add\_4}$, T(8)*$LTF_{80\ MHz\_part5\_2x}$}

$LTF_{80\ MHz\_lower2\_2x}$={T(9)*$LTF_{80\ MHz\_part1\_2x}$, ±$LTF_{Add\_1}$, T(10)*$LTF_{80\ MHz_part4_2x}$, ±$LTF_{Add\_2}$, ±$LTF_{Add\_3}$, T(11)*$LTF_{80\ MHz\_part2\_2x}$, ±$LTF_{Add\_4}$, T(12)*$LTF_{80\ MHz\_part5\_2x}$}

$LTF_{80\ MHz\_upper2\_2x}$=={T(13)*$LTF_{80\ MHz\_part1\_2x}$, ±$LTF_{Add\_1}$, T(14)*$LTF_{80\ MHz_part4_2x}$, ±$LTF_{Add\_2}$, ±$LTF_{Add\_3}$, T(15)*$LTF_{80\ MHz\_part2\_2x}$, ±$LTF_{Add\_4}$, T(16)*$LTF_{80\ MHz\_part5\_2x}$}

$LTF_{Add\_1}$=$LTF_{80\ MHz\_part3\_2x}$(1:5), $LTF_{Add\_2}$=$LTF_{80\ MHz\_part3\_2x}$(6:16), $LTF_{Add\_3}$=$LFT_{80\ MHz\_part3\_2x}$(17:28), $LTF_{Add\_4}$=$LTF_{80\ MHz\_part3\_2x}$(29:33)

Here, $LTF_{80\ MHz\_part1\_2x}$, $LTF_{80\ MHz\_part2\_2x}$, $LTF_{80\ MHz\_part3\_2x}$, $LTF_{80\ MHz_part4_2x}$, $LTF_{80\ MHz\_part5\_2x}$ are as defined above, and 'X zeros' means X number of '0's.

Here, the index and worst PAPR values representing optimal T(1) to T(16) according to the coefficients of $LTF_{Add\_1\ to\ 4}$ applied to 2x LTF are as follows. That is, after changing the index into a 16-bit binary sequence, it can be obtained by mapping '0' to '1' and '1' to '−1'. (Alternatively, it is possible to map '0' to '−1' and '1' to '1').

First, the plus/minus in the first row below means: all plus/minus of $LTF_{Add\_1\ to\ 4}$ included in $LTF_{80\ MHz\_lower1\_2x}$; plus/minus of all $LTF_{Add\_1\ to\ 4}$ included in $LTF_{80\ MHz\ upper1\_2x}$, plus/minus of all $LTF_{Add\_1\ to\ 4}$ included in $LFT_{80\ MHz\ lower1\_2x}$; plus/minus of all $LTF_{Add\_1\ to\ 4}$ included in $LTF_{80\ MHz\ upper2\_2x}$.

TABLE 8

| (+, +, +, +) | | (+, +, +, −) | | (+, +, −, +) | | (+, −, +, +) | |
|---|---|---|---|---|---|---|---|
| T(1)~ T(16) index | Worst PAPR (dB) | T(1)~ T(16) index | Worst PAPR (dB) | T(1)~ T(16) index | Worst PAPR (dB) | T(1)~ T(16) index | Worst PAPR (dB) |
| 32228 | 9.4019655 | 32228 | 9.358729 | 24467 | 9.5169108 | 32228 | 9.4019655 |
| 16326 | 9.4909464 | 23801 | 9.521717 | 20007 | 9.5237392 | 32020 | 9.4971336 |
| 14074 | 9.5237392 | 14074 | 9.5237392 | 22223 | 9.5470653 | 20579 | 9.502057 |
| 27379 | 9.5615166 | 19944 | 9.5835997 | 20687 | 9.5762946 | 32235 | 9.5237392 |
| 27283 | 9.5823144 | 20008 | 9.6090583 | 3161 | 9.5889204 | 27283 | 9.5432724 |
| 27199 | 9.6109253 | 27199 | 9.6109253 | 27699 | 9.6241317 | 10318 | 9.563076 |
| 32020 | 9.6145126 | 32235 | 9.6153096 | 14076 | 9.6289946 | 10430 | 9.563076 |
| 19878 | 9.6262859 | 26010 | 9.6159536 | 15504 | 9.6289946 | 27379 | 9.5762946 |
| 22266 | 9.6289407 | 32020 | 9.6224937 | 14074 | 9.6456646 | 29412 | 9.5835166 |
| 14758 | 9.6305461 | 20007 | 9.622607 | 26026 | 9.6667761 | 29140 | 9.5835997 |
| 14076 | 9.6345969 | 22268 | 9.6345969 | 22950 | 9.6687118 | 29147 | 9.5835997 |
| 22268 | 9.6345969 | 28474 | 9.6353173 | 1589 | 9.6772357 | 28613 | 9.5848279 |
| 28613 | 9.6345969 | 16856 | 9.6375881 | 16855 | 9.6785861 | 16855 | 9.6033553 |
| 16855 | 9.6375881 | 4085 | 9.6445877 | 27193 | 9.6813128 | 29204 | 9.6153096 |
| 4085 | 9.6445877 | 28613 | 9.6863376 | 27199 | 9.6813128 | 16856 | 9.622607 |
| 28581 | 9.6557218 | 3322 | 9.6984249 | 10243 | 9.6865314 | 20183 | 9.622607 |
| 27184 | 9.6581441 | 14758 | 9.7052286 | 22185 | 9.6876034 | 14602 | 9.6289946 |
| 16320 | 9.6767601 | 2640 | 9.7168976 | 32027 | 9.7011447 | 22794 | 9.6289946 |
| 15519 | 9.682409 | 10305 | 9.7262725 | 27184 | 9.7013992 | 14758 | 9.6305461 |
| 28506 | 9.6868767 | 20579 | 9.7262725 | 16920 | 9.7055583 | 22185 | 9.6321135 |
| 26010 | 9.7053064 | 27283 | 9.7270961 | 3241 | 9.7215065 | 16680 | 9.6456646 |
| 3315 | 9.7060658 | 20183 | 9.7373761 | 11150 | 9.7225234 | 1020 | 9.657511 |
| 12495 | 9.7060658 | 20184 | 9.7373761 | 5931 | 9.7249793 | 934 | 9.6863376 |
| 22185 | 9.7060658 | 23286 | 9.7392032 | 7053 | 9.7262725 | 937 | 9.6863376 |
| 27285 | 9.7060658 | 28579 | 9.739991 | 25919 | 9.7269766 | 28506 | 9.6868767 |
| 32235 | 9.7134746 | 12495 | 9.74126 | 28469 | 9.7269766 | 13254 | 9.6901387 |
| 1018 | 9.714162 | 14076 | 9.7452546 | 5924 | 9.7279523 | 22824 | 9.6977129 |
| 16294 | 9.714162 | 3161 | 9.7476109 | 26018 | 9.7315792 | 26063 | 9.7013992 |
| 19943 | 9.7142729 | 20687 | 9.7476109 | 16236 | 9.7316761 | 12495 | 9.7103768 |

TABLE 9

| (+, +, −, −) | | (+, −, +, −) | | (+, −, −, +) | | (+, −, −, −) | |
|---|---|---|---|---|---|---|---|
| T(1)~ T(16) index | Worst PAPR (dB) | T(1)~ T(16) index | Worst PAPR (dB) | T(1)~ T(16) index | Worst PAPR (dB) | T(1)~ T(16) index | Worst PAPR (dB) |
| 24467 | 9.51691 | 16856 | 9.3249 | 26063 | 9.4894 | 10305 | 9.40458 |
| 20008 | 9.5836 | 32228 | 9.3831 | 14602 | 9.52374 | 24634 | 9.43822 |
| 32027 | 9.5836 | 10305 | 9.41576 | 10430 | 9.56308 | 22950 | 9.44527 |
| 3161 | 9.58892 | 16320 | 9.42929 | 16679 | 9.5836 | 26063 | 9.4894 |
| 26010 | 9.60135 | 20579 | 9.47066 | 29211 | 9.5836 | 14602 | 9.52374 |
| 20007 | 9.62261 | 20184 | 9.58776 | 32027 | 9.5836 | 16680 | 9.52374 |
| 32235 | 9.62261 | 1020 | 9.60906 | 22950 | 9.60553 | 27702 | 9.57619 |
| 22208 | 9.64132 | 2645 | 9.61509 | 27699 | 9.61195 | 20687 | 9.57629 |
| 14074 | 9.64566 | 32020 | 9.62249 | 29204 | 9.61531 | 10417 | 9.57743 |
| 11137 | 9.65768 | 14602 | 9.62899 | 22794 | 9.61759 | 29211 | 9.5836 |
| 15504 | 9.65902 | 14758 | 9.63055 | 11150 | 9.62235 | 32027 | 9.60906 |
| 25868 | 9.65921 | 32235 | 9.64566 | 16856 | 9.62261 | 11137 | 9.62235 |
| 20687 | 9.66131 | 29147 | 9.64983 | 29419 | 9.62261 | 29419 | 9.62261 |
| 28506 | 9.66299 | 19943 | 9.66492 | 16680 | 9.6308 | 28506 | 9.62899 |
| 27199 | 9.68131 | 937 | 9.68634 | 14604 | 9.632 | 22796 | 9.632 |
| 27705 | 9.69014 | 28613 | 9.68634 | 22796 | 9.632 | 14992 | 9.63532 |
| 27193 | 9.69507 | 13254 | 9.69014 | 22185 | 9.63211 | 13254 | 9.64464 |
| 3322 | 9.69842 | 29140 | 9.70114 | 13254 | 9.64464 | 32235 | 9.64566 |
| 27184 | 9.7014 | 29412 | 9.70114 | 27702 | 9.68601 | 22794 | 9.65756 |
| 27658 | 9.71571 | 26063 | 9.7014 | 24634 | 9.68634 | 9158 | 9.65884 |
| 27653 | 9.71679 | 3315 | 9.70607 | 2645 | 9.68688 | 14604 | 9.66199 |
| 5261 | 9.72627 | 22185 | 9.70607 | 20184 | 9.68853 | 10243 | 9.66323 |
| 7042 | 9.72627 | 27285 | 9.70607 | 1018 | 9.6953 | 1442 | 9.68522 |
| 7053 | 9.72627 | 3317 | 9.70682 | 16919 | 9.70556 | 22185 | 9.6876 |
| 10305 | 9.72627 | 12495 | 9.71038 | 20687 | 9.70708 | 3317 | 9.70682 |
| 3241 | 9.72698 | 980 | 9.72343 | 1455 | 9.7169 | 29204 | 9.71347 |
| 25919 | 9.72698 | 6356 | 9.72498 | 21935 | 9.7169 | 16920 | 9.71427 |
| 5924 | 9.72795 | 20588 | 9.72747 | 10318 | 9.71843 | 27653 | 9.71679 |
| 16236 | 9.73168 | 22796 | 9.72781 | 17025 | 9.72498 | 21935 | 9.7169 |
| 24467 | 9.51691 | 16856 | 9.3249 | 26063 | 9.4894 | 10305 | 9.40458 |

Further, when it is defined that $LTF_{Add\_1}$=$LTF_{80\ MHz\_part3\_2x}$(1:5), $LTF_{Add\_2}$=$LTF_{80\ MHz\_part3\_2x}$(6:16), −$LTF_{Add\_3}$=$LTF_{80\ MHz\_part3\_2x}$(17:28), $LTF_{Add\_4}$=−$LTF_{80\ MHz\_part3\_2x}$(29:33), the following Table 10 and Table 11 can be configured.

TABLE 10

| 2 × LTF candidates | | 4 × LTF candidates | |
|---|---|---|---|
| Index | Worst PAPR (dB) | Index | Worst PAPR (dB) |
| 16320 | 9.68 | 16919 | 9.27 |
| 26010 | 9.68 | 24377 | 9.27 |
| 5234 | 9.71 | 20008 | 9.28 |
| 10318 | 9.71 | 32027 | 9.30 |
| 20008 | 9.74 | 11150 | 9.31 |
| 29204 | 9.74 | 29204 | 9.34 |
| 16855 | 9.76 | 32020 | 9.34 |
| 29211 | 9.76 | 19735 | 9.37 |
| 1020 | 9.82 | 10430 | 9.38 |
| 22950 | 9.82 | 10318 | 9.39 |
| 16680 | 9.83 | 16855 | 9.40 |
| 20183 | 9.83 | 6066 | 9.40 |
| 27184 | 9.83 | 10161 | 9.40 |
| 29412 | 9.83 | 20184 | 9.40 |
| 29419 | 9.83 | 10174 | 9.40 |
| 2396 | 9.85 | 11134 | 9.40 |
| 23798 | 9.85 | 19736 | 9.40 |
| 16229 | 9.85 | 28474 | 9.40 |
| 25919 | 9.86 | 32299 | 9.40 |
| 19943 | 9.86 | 6221 | 9.41 |
| 32299 | 9.86 | 1436 | 9.41 |
| 6066 | 9.87 | 1478 | 9.42 |
| 11150 | 9.87 | 2506 | 9.42 |
| 19735 | 9.87 | 13814 | 9.42 |
| 28971 | 9.87 | 14842 | 9.42 |
| 934 | 9.87 | 23648 | 9.42 |
| 6077 | 9.88 | 24419 | 9.42 |

TABLE 10-continued

| 2 × LTF candidates | | 4 × LTF candidates | |
|---|---|---|---|
| Index | Worst PAPR (dB) | Index | Worst PAPR (dB) |
| 9329 | 9.88 | 24668 | 9.42 |
| 22259 | 9.89 | 25439 | 9.42 |
| 22268 | 9.89 | | |
| 22796 | 9.89 | | |

TABLE 11

| (+, +, −, −) | | (+, −, +, −) | | (+, −, −, +) | | (+, −, −, −) | |
|---|---|---|---|---|---|---|---|
| T(1)~ T(16) index | Worst PAPR (dB) | T(1)~ T(16) index | Worst PAPR (dB) | T(1)~ T(16) index | Worst PAPR (dB) | T(1)~ T(16) index | Worst PAPR (dB) |
| 5234 | 9.56308 | 1018 | 9.34589 | 937 | 9.50773 | 937 | 9.50773 |
| 7026 | 9.57781 | 21497 | 9.56499 | 27199 | 9.54207 | 27199 | 9.54207 |
| 20008 | 9.5836 | 10417 | 9.58411 | 14758 | 9.57767 | 14758 | 9.54766 |
| 27199 | 9.59243 | 27283 | 9.61764 | 29204 | 9.5836 | 1018 | 9.60295 |
| 16680 | 9.62261 | 16770 | 9.62899 | 27699 | 9.6007 | 32020 | 9.61703 |
| 20007 | 9.62261 | 16320 | 9.62919 | 1018 | 9.60295 | 10318 | 9.62179 |
| 10430 | 9.63883 | 6356 | 9.63987 | 5234 | 9.60371 | 12495 | 9.62859 |
| 32228 | 9.64177 | 16754 | 9.64309 | 20008 | 9.6189 | 10430 | 9.64615 |
| 32235 | 9.64177 | 5245 | 9.64615 | 16781 | 9.61973 | 5234 | 9.64993 |
| 26063 | 9.64615 | 23801 | 9.64615 | 5245 | 9.63743 | 29211 | 9.66155 |
| 16679 | 9.65239 | 26010 | 9.66553 | 32020 | 9.66242 | 23561 | 9.66949 |
| 937 | 9.6588 | 5234 | 9.6694 | 9102 | 9.66441 | 27193 | 9.67814 |
| 23561 | 9.66949 | 29419 | 9.66965 | 29412 | 9.66965 | 22185 | 9.68608 |
| 16856 | 9.67937 | 20687 | 9.67793 | 27193 | 9.67814 | 10417 | 9.69685 |
| 27283 | 9.68494 | 12495 | 9.68602 | 27283 | 9.68494 | 21920 | 9.70149 |
| 23663 | 9.69332 | 10305 | 9.70003 | 29211 | 9.6876 | 14754 | 9.7111 |
| 14758 | 9.70151 | 3161 | 9.73226 | 20687 | 9.6946 | 27283 | 9.72437 |
| 14754 | 9.7111 | 9158 | 9.73267 | 21920 | 9.70149 | 9102 | 9.72627 |
| 1442 | 9.71668 | 13254 | 9.73267 | 934 | 9.71176 | 20687 | 9.72905 |
| 27651 | 9.73232 | 22176 | 9.73382 | 32235 | 9.71831 | 27658 | 9.73232 |
| 19825 | 9.73676 | 20681 | 9.74597 | 5261 | 9.72627 | 1442 | 9.7329 |
| 16855 | 9.73775 | 14944 | 9.74851 | 10305 | 9.72627 | 32228 | 9.7333 |
| 14752 | 9.74013 | 27285 | 9.7515 | 32228 | 9.7333 | 26063 | 9.73817 |
| 22944 | 9.74013 | 32235 | 9.75449 | 26063 | 9.73817 | 24634 | 9.74387 |
| 22208 | 9.74767 | 27199 | 9.75458 | 27653 | 9.74767 | 13993 | 9.76796 |
| 10417 | 9.74864 | 11157 | 9.76859 | 14767 | 9.76272 | 16856 | 9.7761 |
| 23558 | 9.75283 | 6363 | 9.77297 | 10174 | 9.76567 | 5261 | 9.78128 |

For example, based on the sequence with the lowest worst PAPR in the table above, the 320 MHz 2x EHT-LTF sequence can be configured as follows.

$EHTLTF_{-2036,\ 2036}$={$LTF_{80\ MHz\_1st\_2x}$, 23 zeros, $LTF_{80\ MHz\_2nd\_2x}$, 23 zeros, $LFT_{80\ MHz\_3rd\_2x}$, 23 zeros, $LFT_{80\ MHz\_4th\_2x}$}

$LTF_{80\ MHz\_1st\_2x}$={$LTF_{80\ MHz\_part1\_2x}$, $M_1$, −$LTF_{80\ MHz_part4_2x}$, M2, $LTF_{80\ MHz\_part2\_2x}$, $M_3$, $LTF_{80\ MHz\_part5\_2x}$}

$LTF_{80\ MHz\_2nd\_2x}$={$LTF_{80\ MHz\_part1\_2x}$, −$M_1$, $LTF_{80\ MHz_part4_2x}$, −$M_2$, $LTF_{80\ MHz\_part2\_2x}$, −$M_3$, −$LTF_{80\ MHz\_part5\_2x}$}

$LTF_{80\ MHZ\_3rd\_2x}$={−$LTF_{80\ MHz\_part1\_2x}$, $M_1$, −$LTF_{80\ MHZ\_part4\_2x}$, $M_2$, $LTF_{80\ MHz\_part2\_2x}$, $M_3$, −$LTF_{80\ MHz\_part5\_2x}$}

$LTF_{80\ MHz\_4th\_2x}$={−$LTF_{80\ MHz\_part1\_2x}$, −$M_1$, $LTF_{80\ MHz_part4_2x}$, −$M_2$, $LTF_{80\ MHz\_part2\_2x}$, −$M_3$, $LTF_{80\ MHz\_part5\_2x}$}

$M_1$=$LTF_{80\ MHz\_part3\_2x}$(1:5), $M_2$=$LTF_{80\ MHz\_part3\_2x}$(6:28), $M_3$=$LTF_{80\ MHz\_part3\_2x}$(29:33), $LTF_{80\ MHz\_part1\_2x}$~$LTF_{80\ MHz\_part5\_2x}$ can be configured as defined in 11ax.

$LFT_{80\ MHz\_part1\_2x}$={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, ~1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0}

LTF80 MHz_part2_2x={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}

LTF80 MHz_part3_2x={+1, 0, −1, 0, −1, 0, −1, 0, +1, 0, +1, 0, +1, 0, 0, 0, 0, 0, 0, 0, +1, 0, −1, 0, −1, 0, +1, 0, +1, 0, −1, 0, +1}

LTF80 MHz_part4_2x={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, −1, 0, −1, 0, +1, 0, +1, 0, +1, 0, −1, 0, +1, 0, +1, 0, +1, 0, −1}

LTF80 MHz_part5_2x={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}

This method can also be proposed for 1x or 4x LTF. In that case, the existing $LTF_{80\ MHz\_lower/upper\_1/4x}$ can be classified as follows. Here, $LTF_{80\ MHz\_lower/upper\_1/4x}$ means $LTF_{80\ MHz\_lower\_1x}$ or $LTF_{80\ MHz\_upper\_1x}$ or $LTF_{80\ MHz\_lower\_4x}$ or $LTF_{80\ MHz\_upper\_4x}$, and U(1) to U(16) suitable for each may be different. Likewise, the positions of $LTF_{80\ MHz\_part1\_1/4x}$ and $LTF_{80\ MHz\_part2\_1/4x}$ can be changed, and $LTF_{80\ MHz\_part1\_1\_1/4x}$ and $LTF_{80\ MHz\_part1\_1/4x}$ are also possible.

$LTF_{80\ MHz_part1_1/4}$x=a sequence from 1 to 242 of $LTF_{80\ MHz\_left\_1/4x}$ $LTF_{80\ MHz\_part2\_1/4x}$=a sequence from 243 to 484 of $LTF_{80\ MHz\_left\_1/4x}$ $LTF_{80\ MHz\_part3\_1/4x}$=a sequence from 485 to 500 of $\pm LTF_{80\ MHz\_left\_1/4x}$, 0, a sequence from 1 to 16 of $\pm LFT_{80\ MHz\_right\_1/4x}$, for instance [−1, −1, −1, +1, +1, +1, −1, −1, +1, 0, 0, 0, 0, 0, −1, +1, +1, +1, +1, +1, +1, −1, +1] or [−1, −1, −1, +1, +1, +1, −1, −1, +1, 0, 0, 0, 0, 0, +1, −1, −1, −1, −1, −, −1, +1, −1] which is configured by changing plus/minus on both sides of DC(s).

$LTF_{80\ MHz\_part4\_1/4x}$=a sequence from 17 to 258 of $LTF_{80\ MHz\_right\_1/4x}$ $LTF_{80\ MHz\_part5\_1/4x}$=a sequence from 259 to 500 of $LTF_{80\ MHz\_right\_1/4x}$ When defined in this way, the structure of a 1/4x LTF sequence suitable for 320 MHz BW may be as follows.

$EHTLTF_{320\ MHz\_1/4x}$={$LTF_{80\ MHz\_lower1\_1/4x}$, 23 zeros, $LTF_{80\ MHz\_upper1\_1/4x}$, 23 zeros, $LTF_{80}$ MHz_lower2_1/4x, 23 zeros, $LTF_{80\ MHz\_upper2\_1/4x}$}

$LTF_{80\ MHz\_lower1\_1/4x}$={U(1)*$LTF_{80\ MHz\_part1\_1/4x}$, $\pm LTF_{Add\_1}$, U(2)*$LTF_{80\ MHz\_part4\_1/4x}$, $\pm LTF_{Add\_2}$, $\pm LTF_{Add\_3}$, U(3)*$LTF_{80\ MHz\_part2\_1/4x}$, $\pm LTF_{Add\_4}$, U(4)*$LTF_{80\ MHz\_part5\_1/4x}$}

$LTF_{80\ MHz\_upper1\_1/4x}$={U(5)*$LTF_{80\ MHz\_part1\_1/4x}$, $\pm LTF_{Add\_1}$, U(6)*$LTF_{80\ MHz\_part4\_1/4x}$, $\pm LTF_{Add\_2}$, $\pm LTF_{Add\_3}$, U(7)*$LTF_{80MHz\_part2\_1/4x}$, $\pm LTF_{Add\_4}$, U(8)*$LTF_{80\ MHz\_part5\_1/4x}$}

$LTF_{80\ MHz\_lower2\_1/4x}$={U(9)*$LTF_{80\ MHz\_part1\_1/4x}$, $\pm LTF_{Add\_1}$, U(10)*$LTF_{80\ MHz\_part4\_1/4x}$, $\pm LTF_{Add\_2}$, $\pm LTF_{Add\_3}$, U(11)*$LTF_{80\ MHz\_part2\_1/4x}$, $\pm LTF_{Add\_4}$, U(12)*$LTF_{80\ MHz\_part5\_1/4x}$}

$LTF_{80\ MHz\_upper2\_1/4x}$={U(13)*$LTF_{80\ MHz\_part1\_1/4x}$, $\pm LTF_{Add\_1}$, U(14)*$LTF_{80\ MHz\_part4\_1/4x}$, $\pm LTF_{Add\_2}$, $\pm LTF_{Add\_3}$, U(15)*$LTF_{80\ MHz\_part2\_1/4x}$, $\pm LTF_{Add\_4}$, U(16)*$LTF_{80\ MHz\_part5\_1/4x}$}

$LTF_{Add\_1}$=$LTF_{80\ MHz\_part3\_4x}$(1:5), $LTF_{Add\_2}$=$LTF_{80\ MHz\_part3\_4x}$(6:16), $LTF_{Add\_3}$=$LTF_{80\ MHz\_part3\_4x}$(17:28), $LTF_{Add\_4}$=$LTF_{80\ MHz\_part3\_4x}$(29:33)

Here, the index and worst PAPR values representing optimal U(1) to U(16) according to the coefficients of $LTF_{Add\_1\ to\ 4}$ applied to 4x LTF are as follows. That is, after changing the index into a 16-bit binary sequence, it can be obtained by mapping '0' to '1' and '1' to '−1'. (Alternatively, it is possible to map '0' to '−1' and '1' to '1')

First, when it is defined that $LTF_{Add\_1}$=$LTF_{80\ MHz\_part3\_4x}$(1:5), $LTF_{Add\_2}$=$LTF_{80\ MHz\_part3\_4x}$(6:16), $LTF_{Add\_3}$=$LTF_{80\ MHz\_part3\_4x}$(17:28), $LTF_{Add\_4}$=$LTF_{80\ MHz\_part3\_4x}$(29:33), the following Table 12 and Table 13 can be configured. The plus/minus in the first row below means: all plus/minus of $LTF_{Add\_1\ to\ 4}$ included in $LTF_{80\ MHz\_lower1\_4x}$; plus/minus of all $LTF_{Add\_1\ to\ 4}$ included in $LTF_{80\ MHz\_upper1\_4x}$; plus/minus of all $LTF_{Add\_1\ to\ 4}$ included in $LTF_{80\ MHZ\_lower1\_4x}$; plus/minus of all $LTF_{Add\_1\ to\ 4}$ included in $LTF_{80\ MHz\_upper2\_4x}$.

TABLE 12

| (+, +, +, +) | | (+, +, +, −) | | (+, +, −, +) | | (+, −, +, +) | |
|---|---|---|---|---|---|---|---|
| U(1)~ U(16) index | Worst PAPR (dB) | U(1)~ U(16) index | Worst PAPR (dB) | U(1)~ U(16) index | Worst PAPR (dB) | U(1)~ U(16) index | Worst PAPR (dB) |
| 11239 | 9.1047659 | 11121 | 9.1750656 | 14958 | 9.0383849 | 29203 | 9.1301721 |
| 10266 | 9.2375046 | 29140 | 9.1940175 | 32077 | 9.1195968 | 9328 | 9.1805068 |
| 20007 | 9.2394959 | 29211 | 9.2138781 | 25353 | 9.1558259 | 28970 | 9.1815634 |
| 29203 | 9.2760382 | 10161 | 9.2215489 | 5953 | 9.2179562 | 16919 | 9.1907487 |
| 16918 | 9.2939453 | 11240 | 9.2271859 | 16918 | 9.251593 | 16854 | 9.1920685 |
| 16678 | 9.296053 | 20008 | 9.2394959 | 32026 | 9.2756096 | 5158 | 9.1924007 |
| 29139 | 9.3258259 | 2396 | 9.2491492 | 29203 | 9.2760382 | 9238 | 9.1960894 |
| 25423 | 9.327695 | 16919 | 9.251593 | 11239 | 9.2760949 | 20006 | 9.2394959 |
| 1618 | 9.331596 | 13664 | 9.271087 | 29146 | 9.2883588 | 20007 | 9.2394959 |
| 13573 | 9.331596 | 29204 | 9.2718006 | 24418 | 9.2887196 | 16678 | 9.251593 |
| 29248 | 9.331596 | 16679 | 9.296053 | 16678 | 9.296053 | 32189 | 9.2529292 |
| 10474 | 9.3713552 | 1436 | 9.3012665 | 13828 | 9.3075283 | 16918 | 9.2939453 |
| 24362 | 9.3732821 | 7128 | 9.3012665 | 24520 | 9.3120787 | 14841 | 9.300368 |
| 14943 | 9.3806551 | 10174 | 9.3050946 | 6186 | 9.3252248 | 29360 | 9.3040291 |
| 16919 | 9.3929636 | 11134 | 9.3050946 | 32019 | 9.3252492 | 29139 | 9.3075283 |
| 24628 | 9.3957846 | 21344 | 9.3227713 | 25438 | 9.3284628 | 5334 | 9.3237159 |
| 13663 | 9.3989595 | 21359 | 9.3229826 | 13903 | 9.331596 | 29146 | 9.3356598 |
| 25369 | 9.4083172 | 13574 | 9.327695 | 24376 | 9.3337896 | 14991 | 9.3442425 |
| 2395 | 9.4205697 | 25424 | 9.327695 | 28963 | 9.3416204 | 16855 | 9.3769695 |
| 2613 | 9.4243625 | 1619 | 9.331596 | 6065 | 9.3457766 | 19853 | 9.3854973 |
| 1698 | 9.4243701 | 29249 | 9.3617292 | 9239 | 9.3490192 | 13663 | 9.3989595 |
| 1707 | 9.4243701 | 10475 | 9.3713552 | 6099 | 9.352523 | 10173 | 9.4055525 |
| 2616 | 9.4280881 | 10004 | 9.3832721 | 2658 | 9.3535604 | 16769 | 9.4080867 |
| 6186 | 9.4280881 | 5709 | 9.3894427 | 32064 | 9.3601002 | 5930 | 9.4126753 |
| 6844 | 9.4280881 | 5965 | 9.3894427 | 5964 | 9.3703607 | 13573 | 9.4243625 |
| 10429 | 9.4280881 | 21494 | 9.3929154 | 5708 | 9.372179 | 32474 | 9.4246393 |
| 11136 | 9.4280881 | 24629 | 9.3957846 | 13573 | 9.3792167 | 10416 | 9.4280881 |
| 11149 | 9.4280881 | 16920 | 9.4080867 | 28993 | 9.3832721 | 10429 | 9.4280881 |
| 5923 | 9.4470754 | 25370 | 9.4083172 | 29004 | 9.3832721 | 28468 | 9.4372654 |

TABLE 13

| (+, +, −, −) | | (+, −, +, −) | | (+, −, −, +) | | (+, −, −, −) | |
|---|---|---|---|---|---|---|---|
| U(1)~ U(16) index | Worst PAPR (dB) | U(1)~ U(16) index | Worst PAPR (dB) | U(1)~ U(16) index | Worst PAPR (dB) | U(1)~ U(16) index | Worst PAPR (dB) |
| 10048 | 8.9949224 | 9239 | 9.2375046 | 25349 | 8.9675546 | 25349 | 9.0516535 |
| 16855 | 9.0422236 | 24659 | 9.2603891 | 29419 | 9.0968332 | 32020 | 9.1272619 |
| 32064 | 9.1195968 | 13664 | 9.271087 | 16679 | 9.1213243 | 28994 | 9.1671671 |
| 32077 | 9.1195968 | 9329 | 9.300368 | 32027 | 9.1229844 | 19943 | 9.2223375 |
| 32026 | 9.1229844 | 5931 | 9.3040291 | 1379 | 9.1257152 | 10049 | 9.2337344 |
| 20007 | 9.1241805 | 29361 | 9.3040291 | 28994 | 9.1390948 | 32027 | 9.2394959 |
| 32019 | 9.1354994 | 29140 | 9.3075283 | 10417 | 9.2007032 | 32322 | 9.284716 |
| 27657 | 9.2097453 | 13814 | 9.3284628 | 29204 | 9.2119059 | 13904 | 9.286367 |
| 24418 | 9.2302088 | 27808 | 9.3284628 | 29211 | 9.2412287 | 23648 | 9.2887196 |
| 29146 | 9.2313131 | 14069 | 9.3579749 | 27658 | 9.2513346 | 5250 | 9.3050946 |
| 29139 | 9.26228 | 29147 | 9.3591855 | 16919 | 9.2513542 | 5261 | 9.3050946 |
| 29203 | 9.2718006 | 14992 | 9.3647473 | 32322 | 9.2760949 | 29140 | 9.3075283 |
| 2395 | 9.2733114 | 29204 | 9.3699009 | 13904 | 9.286367 | 7042 | 9.3093759 |
| 25348 | 9.2733416 | 2707 | 9.3713451 | 5159 | 9.3012665 | 13829 | 9.317151 |
| 11239 | 9.2760949 | 20579 | 9.3792167 | 14959 | 9.3047828 | 29262 | 9.3237159 |
| 7041 | 9.2819223 | 19854 | 9.3854973 | 29140 | 9.3075283 | 1481 | 9.3284628 |
| 1435 | 9.3012665 | 9447 | 9.3867331 | 29147 | 9.3075283 | 24668 | 9.3284628 |
| 20183 | 9.3088439 | 5335 | 9.3924131 | 7042 | 9.3093759 | 20579 | 9.3378202 |
| 21343 | 9.3227713 | 14842 | 9.3978372 | 13829 | 9.317151 | 2668 | 9.3535604 |
| 6186 | 9.3252248 | 15007 | 9.3978372 | 32020 | 9.3252492 | 29005 | 9.3639706 |
| 13573 | 9.327695 | 23648 | 9.3978372 | 24377 | 9.3337896 | 28964 | 9.3685716 |
| 24376 | 9.3337896 | 10174 | 9.4055525 | 20579 | 9.3378202 | 29204 | 9.3699009 |
| 13828 | 9.3368093 | 16770 | 9.4080867 | 10430 | 9.3426458 | 10004 | 9.3713552 |
| 10160 | 9.3463877 | 16920 | 9.4080867 | 10174 | 9.3463877 | 29249 | 9.372179 |
| 10211 | 9.352523 | 19943 | 9.4080867 | 5234 | 9.3527327 | 19944 | 9.3739427 |
| 2667 | 9.3535604 | 32475 | 9.4080867 | 29005 | 9.3639706 | 19854 | 9.375147 |
| 6355 | 9.3547451 | 20588 | 9.4125609 | 29262 | 9.3639706 | 13727 | 9.3806551 |
| 21253 | 9.3560298 | 13574 | 9.4243625 | 10004 | 9.3713552 | 29419 | 9.4050251 |
| 28963 | 9.3685716 | 2476 | 9.4302819 | 2506 | 9.3739048 | 32235 | 9.4080867 |

Further, when it is defined that $LTF_{Add\_1}=LTF_{80\ MHz\_part3\_4x}(1:5)$, $LTF_{Add\_2}=LTF_{80\ MHz\_part3\_4x}(6:16)$, $-LTF_{Add\_3}=LTF_{80\ MHz\_part3\_4x}(17:28)$, $LTF_{Add\_4}=LTF_{80\ MHz\_part3\_4x}(29:33)$, the following Table 14 and Table 15 can be configured.

TABLE 14

| (+, +, +, +) | | (+, +, +, −) | | (+, +, −, +) | | (+, −, +, +) | |
|---|---|---|---|---|---|---|---|
| U(1)~U(16) index | Worst PAPR (dB) | U(1)~U(16) index | Worst PAPR (dB) | U(1)~U(16) index | Worst PAPR (dB) | U(1)~U(16) index | Worst PAPR (dB) |
| 29140 | 9.2478163 | 7042 | 9.1842255 | 16679 | 9.0391677 | 29204 | 9.0923524 |
| 24778 | 9.2681288 | 5250 | 9.1945107 | 10417 | 9.0761956 | 16919 | 9.1038217 |
| 5335 | 9.2743999 | 6322 | 9.2746993 | 32299 | 9.2566062 | 24778 | 9.1217946 |
| 1619 | 9.281311 | 1619 | 9.2836286 | 10430 | 9.2615856 | 11032 | 9.1929305 |
| 27658 | 9.283486 | 13727 | 9.3012665 | 2668 | 9.2741998 | 7042 | 9.2135756 |
| 7128 | 9.3012665 | 5335 | 9.3068653 | 5245 | 9.2743999 | 32228 | 9.2298165 |
| 19735 | 9.3227639 | 16856 | 9.3132915 | 13817 | 9.2755511 | 29147 | 9.2303445 |
| 5931 | 9.3333106 | 7128 | 9.3138337 | 28508 | 9.2827439 | 16856 | 9.2478163 |
| 2476 | 9.3376681 | 6221 | 9.3143575 | 27658 | 9.283486 | 29140 | 9.2478163 |
| 29361 | 9.3420743 | 16855 | 9.3330047 | 6221 | 9.3050946 | 11137 | 9.257778 |
| 6100 | 9.3544916 | 24659 | 9.3357631 | 20007 | 9.3055116 | 7128 | 9.2790768 |
| 32065 | 9.3544916 | 21359 | 9.3481592 | 6952 | 9.3068653 | 32065 | 9.2790768 |
| 6322 | 9.3616717 | 5261 | 9.3519789 | 5336 | 9.3090825 | 5965 | 9.2887196 |
| 6952 | 9.3616717 | 6100 | 9.3544916 | 32027 | 9.3102 | 29211 | 9.2980903 |
| 7042 | 9.3616717 | 6952 | 9.3616717 | 10245 | 9.3133725 | 10049 | 9.3049327 |
| 10417 | 9.3616717 | 10417 | 9.3616717 | 5159 | 9.3138337 | 32078 | 9.3060624 |
| 11137 | 9.3616717 | 10430 | 9.3616717 | 32190 | 9.3157844 | 19944 | 9.3076637 |
| 11032 | 9.3676616 | 11137 | 9.3616717 | 28964 | 9.3325572 | 2476 | 9.3376681 |
| 29005 | 9.3722509 | 11032 | 9.3722509 | 28971 | 9.3325572 | 1708 | 9.3422644 |
| 10004 | 9.3766121 | 28994 | 9.3722509 | 20008 | 9.3330047 | 19943 | 9.3443717 |
| 17009 | 9.3766121 | 29005 | 9.3722509 | 1334 | 9.3357631 | 1699 | 9.3494961 |
| 16855 | 9.3911949 | 1379 | 9.3758184 | 29147 | 9.3428208 | 16855 | 9.3528176 |
| 32020 | 9.3911949 | 10004 | 9.3766121 | 14944 | 9.3494961 | 10062 | 9.3558009 |
| 32027 | 9.3911949 | 17009 | 9.3766121 | 32065 | 9.3544916 | 27658 | 9.3562968 |
| 29147 | 9.397164 | 14069 | 9.3851577 | 1379 | 9.3553077 | 2396 | 9.3570583 |
| 24779 | 9.4056794 | 13814 | 9.390298 | 7042 | 9.3616717 | 10417 | 9.3616717 |
| 23696 | 9.4108692 | 21494 | 9.390298 | 14752 | 9.3697048 | 14959 | 9.3702654 |
| 13817 | 9.4263769 | 32228 | 9.3909018 | 28613 | 9.3702654 | 5160 | 9.3824335 |
| 10475 | 9.4297384 | 19736 | 9.3911949 | 2476 | 9.371211 | 14074 | 9.3870613 |

TABLE 15

| (+, +, −, −) | | (+, −, +, −) | | (+, −, −, +) | | (+, −, −, −) | |
|---|---|---|---|---|---|---|---|
| U(1)~U(16) index | Worst PAPR (dB) | U(1)~U(16) index | Worst PAPR (dB) | U(1)~U(16) index | Worst PAPR (dB) | U(1)~U(16) index | Worst PAPR (dB) |
| 16679 | 9.0391677 | 29204 | 9.0923524 | 5245 | 9.1326987 | 16856 | 9.1560938 |
| 1379 | 9.0949903 | 16919 | 9.1652585 | 29419 | 9.1439858 | 17128 | 9.1821638 |
| 5159 | 9.1868689 | 29249 | 9.1802216 | 20184 | 9.2433773 | 17009 | 9.1868689 |
| 9447 | 9.1929305 | 29262 | 9.1802216 | 2668 | 9.259474 | 1427 | 9.2203531 |
| 16855 | 9.1941044 | 32078 | 9.1969144 | 16856 | 9.2683524 | 24419 | 9.2406519 |
| 5250 | 9.2268185 | 32228 | 9.2298165 | 13679 | 9.2707327 | 29419 | 9.2478163 |
| 16856 | 9.2474797 | 16856 | 9.2478163 | 29147 | 9.2767471 | 2668 | 9.259474 |
| 10430 | 9.2615856 | 11150 | 9.2558812 | 2476 | 9.2770184 | 29147 | 9.2885383 |
| 2668 | 9.2741998 | 1699 | 9.2614769 | 1708 | 9.2810196 | 1708 | 9.3012665 |
| 6322 | 9.2887196 | 24419 | 9.2616761 | 7042 | 9.2845709 | 7128 | 9.3012665 |
| 1436 | 9.3012665 | 7042 | 9.2743999 | 2659 | 9.3012665 | 29249 | 9.3012665 |
| 6221 | 9.3050946 | 10049 | 9.3049327 | 7128 | 9.3012665 | 11134 | 9.3040291 |
| 11134 | 9.3050946 | 10062 | 9.3049327 | 10049 | 9.3049327 | 10049 | 9.3049327 |
| 20007 | 9.3055116 | 7128 | 9.3138337 | 10062 | 9.3049327 | 10062 | 9.3049327 |
| 14687 | 9.3057891 | 17022 | 9.3138337 | 11134 | 9.3050946 | 14752 | 9.3069641 |
| 14767 | 9.3069641 | 16855 | 9.3330047 | 28474 | 9.3050946 | 16855 | 9.3263369 |
| 32190 | 9.3157844 | 5160 | 9.3420743 | 20007 | 9.3055116 | 16919 | 9.3335582 |
| 13679 | 9.321591 | 21359 | 9.3458398 | 14752 | 9.3069641 | 13664 | 9.3368385 |
| 1619 | 9.3264635 | 14959 | 9.3479041 | 6221 | 9.3091537 | 10174 | 9.347893 |
| 28964 | 9.3325572 | 11032 | 9.3722509 | 6066 | 9.3143575 | 2387 | 9.3609442 |
| 1334 | 9.3357631 | 13814 | 9.3851577 | 24377 | 9.3217539 | 5245 | 9.3616717 |
| 13664 | 9.3368385 | 14074 | 9.3870613 | 28964 | 9.3325572 | 32078 | 9.3616717 |
| 14752 | 9.3396475 | 24467 | 9.3905175 | 20008 | 9.3330047 | 29412 | 9.3653511 |
| 29147 | 9.3428208 | 19736 | 9.3911949 | 13984 | 9.3389314 | 16679 | 9.3795615 |
| 24377 | 9.343001 | 7053 | 9.4003741 | 10174 | 9.347893 | 9342 | 9.390667 |

TABLE 15-continued

| (+, +, −, −) | | (+, −, +, −) | | (+, −, −, +) | | (+, −, −, −) | |
|---|---|---|---|---|---|---|---|
| U(1)~ U(16) index | Worst PAPR (dB) | U(1)~ U(16) index | Worst PAPR (dB) | U(1)~ U(16) index | Worst PAPR (dB) | U(1)~ U(16) index | Worst PAPR (dB) |
| 2476 | 9.3523522 | 32020 | 9.4007607 | 14944 | 9.3479041 | 20008 | 9.3911949 |
| 11121 | 9.3542967 | 32027 | 9.4007607 | 5965 | 9.3513295 | 32292 | 9.3911949 |

For example, based on the sequence with the lowest worst PAPR in the table above, the 320 MHz 4x EHT-LTF sequence is configured as follows.

$EHTLTF_{-2036,\ 2036}$={$LTF_{80\ MHz\_1st\_4x}$, 23 zeros, $LTF_{80\ MHz\_2nd\_4x}$, 23 zeros, $LFT_{80\ MHz\_3rd\_4x}$, 23 zeros, $LFT_{80\ MHz\_4th\_4x}$}

$LTF_{80\ MHz\_1st\_4x}$={$LFT_{80\ MHz\_part1\_4x}$, $M_1$, $-LTF_{80\ MHz\_part2\_4x}$, $M_2$, $-LTF_{80\ MHz\_part3\_4x}$, $M_3$, $LTF_{80\ MHz\_part4\_4x}$}

$LTF_{80\ MHz\_2nd\_4x}$={$LTF_{80\ MHz\_part1\_4x}$, $-M_1$, $LTF_{80\ MHz\_part2\_4x}$, $-M_2$, $-LTF_{80\ MHz\_part3\_4x}$, $-M_3$, $-LTF_{80\ MHz\_part4\_4x}$}

$LFT_{80\ MHz\_3rd\_4x}$={$LTF_{80\ MHz\_part1\_4x}$, $-M_1$, $LTF_{80\ MHz\_part2\_4x}$, $-M_2$, $LTF_{80\ MHz\_part3\_4x}$, $-M_3$, $LTF_{80\ MHz\_part4\_4x}$}

$LTF_{80\ MHz\_4th\_4x}$={$LTF_{80\ MHz\_part1\_4x}$, $M_1$, $-LTF_{80\ MHz\_part2\_4x}$, $M_2$, $LTF_{80\ MHz\_part3\_4x}$, $M_3$, $-LTF_{80\ MHz\_part4\_4x}$}

$LTF_{80\ MHz\_part1\_4x}$=$LTF_{80\ MHz\_left\_4x}$(1:242), $LTF_{80\ MHz\_part2\_4x}$=$LTF_{80\ MHz\_right\_4x}$(17:258), $LTF_{80\ MHz_part3_4}$x=$LTF_{80\ MHz\_left\_4x}$(243:484), $LTF_{80\ MHz\_part4\_4x}$=$LTF_{80\ MHz\_right\_4x}$(259:500), $M_1$=$LTF_{80\ MHz\_left\_4x}$(485:489), $M_2$={$LTF_{80\ MHz\_left\_4x}$(490:500), 0, $LTF_{80\ MHz\_right\_4x}$(1:11)}, $M_3$=$LTF_{80\ MHz\_right\_4x}$(12:16)

2. Proposal 2

$LTF_{80\ MHz\_part1\_2x}$: This corresponds to the first 242-tone RU area from the left 5 nulls $LTF_{80\ MHz_part4_2x}$: This corresponds to the second 242-tone RU area from the left 23 nulls $LFT_{80\ MHz\_part2\_2x}$: This corresponds to the third 242-tone RU area from the left 5 nulls $LTF_{80\ MHz\_part5\_2x}$: This corresponds to the third 242-tone RU area from the left Here, since $LTF_{80\ MHz\_part1\_2x}$ and $LTF_{80\ MHz\_part2\_2x}$ are sequences derived from the same structure, their positions can be changed. The same applies to $LTF_{80\ MHz_part4_2x}$ and $LTF_{80\ MHz\_part5\_2x}$. Therefore, in this specification, a sequence suitable for 11be 320 MHz can be configured by applying different codes of each value with this structure. That is, the structure of the proposed 2x EHT-LTF sequence is as follows.

$EHTLTF_{320\ MHZ\_2x}$={$LTF_{80\ MHz\_lower1\_2x}$, 23 zeros, $LTF_{80\ MHz\_upper1\_2x}$, 23 zeros, $LTF_{80\ MHz\_lower2\_2x}$, 23 zeros, $LTF_{80\ MHz\_upper2\_2x}$}

$LTF_{80\ MHz\_lower1\_2x}$={T(1)*$LTF_{80\ MHz\_part1\_2x}$, 5 zeros, T(2)*$LTF_{80\ MHz_part4_2x}$, 23 zeros, T(3)*$LTF_{80\ MHz\_part2\_2x}$, 5 zeros, T(4)*$LTF_{80\ MHz\_part5\_2x}$}

$LTF_{80\ MHz\_upper1\_2x}$={T(5)*$LTF_{80\ MHz\_part\_2x}$, 5 zeros, T(6)*$LTF_{80\ MHz_part4_2x}$, 23 zeros, T(7)*$LTF_{80\ MHz\_part2\_2x}$, 5 zeros, T(8)*$LTF_{80\ MHz\_part5\_2x}$}

$LTF_{80\ MHz\_lower2\_2x}$={T(9)*$LTF_{80\ MHz\_part1\_2x}$, 5zeros, T(10)*$LTF_{80\ MHz_part4_2x}$, 23 zeros, T(11)*$LTF_{80\ MHz\_part2\_2x}$, 5 zeros, T(12)*$LTF_{80\ MHz\_part5\_2x}$}

$LTF_{80\ MHz\_upper2\_2x}$={T(13)*$LTF_{80\ MHz\_part1\_2x}$, 5 zeros, T(14)*$LFT_{80\ MHz\_part4\_2x}$, 23 zeros, T(15)*$LTF_{80\ MHz\_part2\_2x}$, 5 zeros, T(16)*$LTF_{80\ MHz\_part5\_2x}$}

Here, $LTF_{80\ MHz\_part1\_2x}$, $LTF_{80\ MHz\_part2\_2x}$, $LTF_{80\ MHz\_part3\_2x}$, $LTF_{80\ MHz_part4_2x}$, $LTF_{80\ MHz\_part5\_2x}$ are as defined above, and 'X zeros' means X number of '0's.

This method can also be proposed for 1x or 4x LTF. In that case, the existing $LTF_{80\ MHz\_lower/upper\_1/4x}$ can be classified as follows. Here, $LTF_{80\ MHz\_lower/upper\_1/4x}$ means $LTF_{80\ MHz\_lower\_1x}$ or $LTF_{80\ MHz\_upper\_1x}$ or $LTF_{80\ MHz\_lower\_4x}$ or $LTF_{80\ MHz\_upper\_4x}$, and U(1) to U(16) suitable for each may be different. Likewise, the positions of $LTF_{80\ MHz\_part1\_1/4x}$ and $LFT_{80\ MHz\_part2\_1/4x}$ can be changed, and $LTF_{80\ MHz\_part1\_1\_1/4x}$ and $LFT_{80\ MHz\_part1\_1/4x}$ are also possible.

$LTF_{80\ MHz\_part1\_1/4x}$=a sequence from 1 to 242 of $LTF_{80\ MHz\_left\_1/4x}$ $LTF_{80\ MHz\_part2\_1/4x}$=a sequence from 243 to 484 of $LTF_{80\ MHz\_left\_1/4x}$ $LTF_{80\ MHz\_part4\_1/4x}$=a sequence from 17 to 258 q of $LTF_{80\ MHz\_right\_1/4x}$ $LTF_{80\ MHz\_part5\_1/4x}$=a sequence from 259 to 500 of $LTF_{80\ MHz\_right\_1/4x}$ When defined in this way, the structure of a 1/4x LTF sequence suitable for 320 MHz BW may be as follows.

$EHTLTF_{320\ MHz\_1/4x}$={$LTF_{80\ MHz\_lower1\_1/4x}$, 23 zeros, $LFT_{80\ MHz\_upper1\_1/4x}$, 23 zeros, $LTF_{80\ MHz\_lower2\_1/4x}$, 23 zeros, $LTF_{80\ MHz\_upper2\_1/4x}$}

$LTF_{80\ MHz\_lower1\_1/4x}$={U(1)*$LTF_{80\ MHz\_part1\_1/4x}$, 5 zeros, U(2)*$LTF_{80\ MHz\_part4\_1/4x}$, 23 zeros, U(3)*$LTF_{80\ MHz\_part2\_1/4x}$, 5 zeros, U(4)*$LTF_{80\ MHz\_part5\_1/4x}$}

$LTF_{80\ MHz\_upper1\_1/4x}$={U(5) *$LTF_{80\ MHz\_part1\_1/4x}$, 5 zeros, U(6)*$LTF_{80\ MHz\_part4\_1/4x}$, 23 zeros, U(7)*$LTF_{80\ MHz\_part2\_1/4x}$, 5 zeros, U(8)*$LTF_{80\ MHz\_part5\_1/4x}$}

$LTF_{80\ MHz\_lower2\_1/4x}$={U(9)*$LTF_{80\ MHz\_part1\_1/4x}$, 5 zeros, U(10)*$LTF_{80\ MHz\_part4\_1/4x}$, 23 zeros, U(11)*$LTF_{80\ MHz\_part2\_1/4x}$, 5 zeros, U(12)*$LTF_{80\ MHz\_part5\_1/4x}$}

$LTF_{80\ MHz\_upper2\_1/4x}$={U(13)*$LTF_{80\ MHz\_part1\_1/4x}$, 5 zeros, U(14)*$LTF_{80\ MHz\_part4\_1/4x}$, 23 zeros, U(15)*$LTF_{80\ MHz\_part2\_1/4x}$, 5 zeros, U(16)*$LTF_{80\ MHz\_part5\_1/4x}$}

Below are examples of T(1) to T(16) for 2x LTF and U(1) to U(16) for 4x LTF. At this time, T(1) to T(16) and 4x LTF for 2x LTF with optimal PAPR considering all RUs and MRUs in 320 MHz BW and puncturing (all RUs and MRUs in 240 MHz BW, including puncturing) U(1) to U(16) for can be obtained from the following index. That is, after changing the index into a 16-bit binary sequence, it can be obtained by mapping '0' to '1' and '1' to '−1'. (Alternatively, it is possible to map '0' to '−1' and '1' to '1'). Here, the optimal PAPR means the sequence with the lowest worst PAPR in all cases.

TABLE 16

| 2 × LTF candidates | | 4 × LTF candidates | |
|---|---|---|---|
| Index | Worst PAPR (dB) | Index | Worst PAPR (dB) |
| 16320 | 9.68 | 16919 | 9.27 |
| 26010 | 9.68 | 24377 | 9.27 |
| 5234 | 9.71 | 20008 | 9.28 |
| 10318 | 9.71 | 32027 | 9.30 |
| 20008 | 9.74 | 11150 | 9.31 |
| 29204 | 9.74 | 29204 | 9.34 |
| 16855 | 9.76 | 32020 | 9.34 |
| 29211 | 9.76 | 19735 | 9.37 |
| 1020 | 9.82 | 10430 | 9.38 |
| 22950 | 9.82 | 10318 | 9.39 |
| 16680 | 9.83 | 16855 | 9.40 |
| 20183 | 9.83 | 6066 | 9.40 |
| 27184 | 9.83 | 10161 | 9.40 |
| 29412 | 9.83 | 20184 | 9.40 |
| 29419 | 9.83 | 10174 | 9.40 |
| 2396 | 9.85 | 11134 | 9.40 |
| 23798 | 9.85 | 19736 | 9.40 |
| 16229 | 9.85 | 28474 | 9.40 |
| 25919 | 9.86 | 32299 | 9.40 |
| 19943 | 9.86 | 6221 | 9.41 |
| 32299 | 9.86 | 1436 | 9.41 |
| 6066 | 9.87 | 1478 | 9.42 |
| 11150 | 9.87 | 2506 | 9.42 |
| 19735 | 9.87 | 13814 | 9.42 |
| 28971 | 9.87 | 14842 | 9.42 |
| 934 | 9.87 | 23648 | 9.42 |
| 6077 | 9.88 | 24419 | 9.42 |
| 9329 | 9.88 | 24668 | 9.42 |
| 22259 | 9.89 | 25439 | 9.42 |
| 22268 | 9.89 | | |
| 22796 | 9.89 | | |

For example, looking at index 16320 among 2x LTF candidates, it is '0011 1111 1100 0000' in binary, and mapping it to T(1) to T(16) gives '1 1 −1 −1 −1 −1 −1 −1 −1 −1 −1 1 1 1 1 1 1'. That is, in this case, the 2x LTF sequence can be expressed as follows.

$EHTLTF_{320\ MHZ\_2x}$={$LTF_{80\ MHz\_lower1\_2x}$, 23 zeros, $LTF_{80\ MHz\_upper1\_2x}$, 23 zeros, $LTF_{80\ MHz\_lower2\_2x}$, 23 zeros, $LTF_{80\ MHz\_upper2\_2x}$}

$LTF_{80\ MHz\_lower1\_2x}$={$LTF_{80\ MHz\_part1\_2x}$, 5 zeros, $LTF_{80\ MHz_part4_2x}$23 zeros, $-LTF_{80\ MHz\_part2\_2x}$, 5 zeros, $-LTF_{80\ MHz\_part5\_2x}$}

$LTF_{80\ MHZ\_upper1\_2x}$={$-LTF_{80\ MHz\_part1\_2x}$, 5 zeros, $-LTF_{80\ MHz\_part4\_2x}$, 23 zeros, $-LTF_{80\ MHz\_part2\_2x}$, 5 zeros, $-LTF_{80\ MHz\_part3\_2x}$}

$LTF_{80\ MHz\_lower2\_2x}$={$-LTF_{80\ MHz\_part1\_2x}$, 5 zeros, $-LTF_{80\ MHz\_part4\_2x}$, 23 zeros, $LTF_{80\ MHz\_part2\_2x}$, 5 zeros, $LTF_{80\ MHz\_part5\_2x}$}

$LTF_{80\ MHz\_upper2\_2x}$={$LTF_{80\ MHz\_part1\_2x}$, 5 zeros, $LTF_{80\ MHz_part4_2x}$, 23 zeros, $LTF_{80\ MHz\_part2\_2x}$, 5 zeros, $LTF_{80\ MHz\_part5\_2x}$}

Alternatively, it can be simply expressed as: (The same sequence can be expressed differently as shown below.)

$EHTLTF_{320\ MHz\_2x}$={$LTF_{160\ MHz\_lower\_2x}$, 23 zeros, $LTF_{160\ MHz\_upper\_2x}$}

$LTF_{160\ MHz\_lower\_2x}$={$LTF_{80\ MHz\_left\_2x}$, 23 zeros, $-LTF_{80\ MHz\_right\_2x}$, 23 zeros, $-LTF_{80\ MHz\_left\_2x}$, 23 zeros, $-LTF_{80\ MHz\_right\_2x}$}

$LTF_{160\ MHz\_upper\_2x}$={$-LTF_{80\ MHz\_left\_2x}$, 23 zeros, $LTF_{80\ MHz\_right\_2x}$, 23 zeros, $LTF_{80\ MHz\_left\_2x}$, 23 zeros, $LTF_{80\ MHz\_right\_2x}$}

$LTF_{80\ MHz\_left\_2x}$={$LTF_{80\ MHz\_part1\_2x}$, 5 zeros, $LTF_{80\ MHz_part4_2x}$}

$LTF_{80\ MHz\_right\_2x}$={$LTF_{80\ MHz\_part2\_2x}$, 5 zeros, $LTF_{80\ MHz\_part5\_2x}$}

As another example, looking at index 16919 among the 4x LTF candidates, it is '0100 0010 0001 0111' in binary, which is U(1)~U(16)=[1 −1 1 1 1 1 1 −1 1 1 1 1 −1 1 −1 −1 −1]. In this case, the 4x LTF sequence can be expressed as follows.

$EHTLTF_{320\ MHz\_4x}$={$LTF_{80\ MHz\_lower1\_4x}$, 23 zeros, $LTF_{80\ MHz\_upper1\_4x}$, 23 zeros, $LTF_{80\ MHz\_lower2\_4x}$, 23 zeros, $LTF_{80\ MHz\_upper2\_4x}$}

$LTF_{80\ MHz\_lower1\_4x}$={$LTF_{80\ MHz\_part1\_4x}$, 5 zeros, $-LTF_{80\ MHz\ part4\_4x}$, 23 zeros, $LTF_{80\ MHz\_part2\_4x}$, 5 zeros, $LTF_{80\ MHz\_part5\_4x}$}

$LTF_{80\ MHz\_upper1\_4x}$={$LTF_{80\ MHz\_part\_4x}$, 5 zeros, $LTF_{80}$ MHz_part4_4x, 23 zeros, $-LTF_{80\ MHz\_part2\_4x}$, 5 zeros, $LTF_{80\ MHz\_part5\_4x}$}

$LTF_{80\ MHz\_lower2\_4x}$={$LTF_{80\ MHz\_part1\_4x}$, 5 zeros, $LFT_{80\ MHz\_part4\_4x}$, 23 zeros, $LTF_{80\ MHz\_part2\_4x}$, 5 zeros, $-LTF_{80\ MHz\_part5\_4x}$}

$LTF_{80\ MHz\_upper2\_4x}$={$LTF_{80\ MHz\_part1\_4x}$, 5 zeros, $-LTF_{80\ MHz\_part4\_4x}$, 23 zeros, $LTF_{80\ MHz\_part2\_4x}$, 5 zeros, $-LTF_{80\ MHz\_part5\_4x}$}

We proposed an LTF sequence for the 320 MHz bandwidth. However, as mentioned, since the 80 MHz-based tone plan has changed, it can also be proposed as an LTF sequence with an existing bandwidth lower than 320 MHz based on it. For example, LTF based on 80MHz or 160 MHz can be expressed as follows.

$EHTLTF_{80\ MHz\_1/2/4x}$={S(1)*$LTF_{80\ MHz\_part1\_1/4x}$, 5 zeros, S(2)*$LTF_{80\ MHz\_part4\_1/2/4x}$, 23 zeros, S(3)*$LTF_{80\ MHz\_part2\_1/2/4x}$, 5 zeros, S(4)*$LTF_{80\ MHz\_part5\_1/2/4x}$}

$EHTLTF_{160\ MHz\_1/2/4x}$={$LTF_{80\ MHz\_lower\_1/2/4x}$, 23 zeros, $LTF_{80\ MHz\_upper\_1/2/4x}$}

$LTF_{80\ MHz\_lower\_1/4x}$={T(1)*$LTF_{80}$ MHz_part1_1/2/4x, 5 zeros, T(2)*$LTF_{80\ MHz\_part4\_1/4x}$, 23 zeros, T(3)*$LTF_{80\ MHz\_part2\_1/2/4x}$, 5 zeros, T(4)*$LTF_{80\ MHz\_part5\_1/2/4x}$}

$LTF_{80\ MHz\_upper\_1/4x}$={T(5)*$LTF_{80\ MHz\_part1\_1/2/4x}$, 5 zeros, T(6)*$LFT_{80\ MHz\_part4\_1/2/4x}$, 23 zeros, T(7)*$LTF_{80\ MHz\_part2\_1/2/4x}$, 5 zeros, T(8)*$LTF_{80\ MHz\_part5\_1/2/4x}$}

Here, S(1) to S(4) and T(1) to T(8) represent values of '+1' or '−1' and may have different values depending on 1x, 2x, and 4x.

3. Proposal 3

$LTF_{80\ MHz\_part1\_2x}$: This corresponds to the first 242-tone RU area from the left.

5-tones: This is not used for RUs smaller than 996RU, but is used for RUs larger than 996RU. 5-seq among $LTF_{80\ MHz\_part3\_2x}$ can be used.

$LTF_{80\ MHz_part4_2x}$: This corresponds to the second 242-tone RU area from the left.

23-tones: This is not used for RUs smaller than 996RU, but is used for RUs larger than 996 except for 5 DC. A part of a sequence among $LTF_{80\ MHz\_part3\_2x}$ can be used.

$LTF_{80\ MHz\_part2\_2x}$: This corresponds to the third 242-tone RU area from the left.

5-tones: This is not used for RUs smaller than 996RU, but is used for RUs larger than 996RU. 5-seq among $LTF_{80\ MHz\_part3\_2x}$ can be used.

$LTF_{80\ MHz\_part5\_2x}$: This corresponds to the Third 242-tone RU area from the left.

Here, since $LTF_{80\ MHz\_part1\_2x}$ and $LTF_{80\ MHz\_part2\_2x}$ are sequences derived from the same structure, their positions can be changed. The same applies to $LTF_{80\ MHz_part4_2x}$ and $LTF_{80\ MHz\_part5\_2x}$. Therefore, in this specification, a sequence suitable for 11be 320 MHz can be configured by applying different codes of each value with this structure. That is, the structure of the proposed 2x EHT-LTF sequence is as follows.

$EHTLTF_{320\ MHZ\_2x}$={$LTF_{80\ MHz\_lower1\_2x}$, 23 zeros, $LTF_{80\ MHz\_upper1\_2x}$, 23 zeros, $LTF_{80\ MHz\_lower2\_2x}$, 23 zeros, $LTF_{80\ MHz\_upper2\_2x}$}

$LTF_{80\ MHz\_lower1\_2x}$={T(1)*$LTF_{80\ MHz\_part1\_2x}$, ±$LTF_{Add\_1}$, T(2)*$LTF_{80\ MHz_part4_2x}$, ±$LTF_{Add\_2}$, ±$LTF_{Add\_3}$, T(3)*$LTF_{80\ MHz\_part2\_2x}$, ±$LTF_{Add\_4}$, T(4)*$LTF_{80\ MHz\_part5\_2x}$}

$LTF_{80\ MHz\_upper1\_2x}$={T(5)*$LTF_{80\ MHz\_part1\_2x}$, ±$LTF_{Add\_1}$, T(6)*$LTF_{80\ MHz_part4_2x}$, ±$LTF_{Add\_2}$, ±$LTF_{Add\_3}$, T(7)*$LTF_{80\ MHz\_part2\_2x}$, ±$LTF_{Add\_4}$, T(8)*$LTF_{80\ MHz\_part5\_2x}$}

$LTF_{80\ MHz\_lower2\_2x}$={T(9)*$LTF_{80\ MHz\_part1\_2x}$, ±$LTF_{Add\_1}$, T(10)*$LTF_{80\ MHz_part4_2x}$, ±$LTF_{Add\_2}$, ±$LTF_{Add\_3}$, T(11)*$LTF_{80\ MHz\_part2\_2x}$, ±$LTF_{Add\_4}$, T(12)*$LTF_{80\ MHz\_part5\_2x}$}

$LTF_{80\ MHz\_upper2\_2x}$={T(13)*$LFT_{80\ MHz\_part1\_2x}$, ±$LTF_{Add\_1}$, T(14)*$LTF_{80\ MHz\_part4\_2x\text{-}}$, ±$LTF_{Add\_2}$, ±$LTF_{Add\_3}$, T(15)*$LTF_{80\ MHz\_part2\_2x}$, ±$LTF_{Add\_4}$, T(16)*$LTF_{80\ MHz\_part5\_2x}$}

$LTF_{Add\_1}$=$LTF_{80\ MHz\_part3\_2x}$(1:5), $LTF_{Add\_2}$=$LTF_{80\ MHz\_part3\_2x}$(6:16), $LTF_{Add\_3}$=$LTF_{80\ MHz\_part3\_2x}$(17:28), $LTF_{Add\_4}$=$LTF_{80\ MHz\_part3\_2x}$(29:33)

Here, $LTF_{80\ MHz\_part1\_2x}$, $LTF_{80\ MHz\_part2\_2x}$, $LTF_{80\ MHz\_part3\_2x}$, $LTF_{80\ MHZ\_part4\_2x}$, $LTF_{80\ MHz\_part5\_2x}$ are as defined above, and 'X zeros' means X number of '0's.

This method can also be proposed for 1x or 4x LTF. In that case, the existing $LTF_{80\ MHz\_lower/upper\_1/4x}$ can be classified as follows. Here, $LTF_{80\ MHz\_lower/upper\_1/4x}$ means $LTF_{80\ MHz\_lower\_1x}$ or $LTF_{80\ MHz\_upper\_1x}$ or $LTF_{80\ MHz\_lower\_4x}$ or $LTF_{80\ MHz\_upper\_4x}$, and U(1) to U(16) suitable for each may be different. Likewise, the positions of $LTF_{80\ MHz\_part1\_1/4x}$ and $LTF_{80\ MHz\_part2\_1/4x}$ can be changed, and $LFT_{80\ MHz\_part1\_1\_1/4x}$ and $LTF_{80\ MHz\_part1\_1/4x}$ are also possible.

$LTF_{80\ MHz\_part1\_1/4x}$=a sequence from 1 to 242 of $LTF_{80\ MHz\_left\_1/4x}$ $LTF_{80\ MHz\_part2\_1/4x}$=a sequence from 243 to 484 of $LTF_{80\ MHz\_left\_1/4x}$ $LTF_{80\ MHz\_part3\_1/4x}$=a sequence from 485 to 500 of ±$LTF_{80\ MHz\_left\_1/4x}$, 0, a sequence from 1 to 16 of ±$LTF_{80\ MHz\_right\_1/4x}$, for instance [−1, −1, −1, +1, +1, +1, −1, −1, +1, 0, 0, 0, 0, 0, −1, +1, +1, +1, +1, +1, +1, −1, +1] or [−1, −1, −1, +1, +1, +1, −1, −1, +1, 0, 0, 0, 0, 0, +1, −1, 18 1, −1, −1, −1, −1, +1, −1] which is configured by changing plus/minus on both sides of DC(s).

$LTF_{80\ MHz\_part4\_1/4x}$=a sequence from 17 to 258 of $LTF_{80\ MHz\_right\_1/4x}$ $LTF_{80\ MHz\_part5\_1/4x}$=a sequence from 259 to 500 of $LTF_{80\ MHz\_right\_1/4x}$ When defined in this way, the structure of a 1/4x LTF sequence suitable for 320 MHz BW may be as follows.

$EHTLTF_{320\ MHz\_1/4x}$={$LTF_{80\ MHz\_lower1\_1/4x}$, 23 zeros, $LTF_{80\ MHz\_upper1\_1/4x}$, 23 zeros, $LTF_{80\ MHz\_lower2\_1/4x}$, 23 zeros, $LTF_{80\ MHz\_upper2\_1/4x}$}

$LTF_{80\ MHz\_lower1\_1/4x}$={U(1)*$LTF_{80\ MHz\_part1\_1/4x}$, $LTF_{Add\_1}$, U(2) *$LTF_{80\ MHz\_part4\_1/4x}$, ±$LTF_{Add\_2}$, ±$LTF_{Add\_3}$, U(3)*$LTF_{80\ MHz\_part2\_1/4x}$, ±$LTF_{Add\_4}$, U(4)*$LTF_{80\ MHz\_part5\_1/4x}$}

$LTF_{80\ MHz\_upper1\_1/4x}$={U(5)*$LTF_{80\ MHz\_part1\_1/4x}$, ±$L/TF_{Add\_1}$, U(6)*$LTF_{80\ MHz\_part4\_1/4x}$, ±$LTF_{Add\_2}$, ±$LTF_{Add\_3}$, U(7)*$LTF_{80\ MHz\_part2\_1/4x}$, ±$LTF_{Add\_4}$, U(8)*$LTF_{80\ MHz\_part5\_1/4x}$}

$LTF_{80\ MHz\_lower2\_1/4x}$={U(9)*$LTF_{80\ MHz\_part1\_1/4x}$, ±$LTF_{Add\_1}$, U(10)*$LTF_{80\ MHz\_part4\_1/4x}$, ±$LTF_{Add\_2}$, ±$LTF_{Add\_3}$, U(11)*$LTF_{80\ MHz\_part2\_1/4x}$, ±$LTF_{Add\_4}$, U(12)*$LTF_{80\ MHz\_part5\_1/4x}$}

$LTF_{80\ MHz\_upper2\_1/4x}$={U(13)*$LTF_{80\ MHz\_part1\_1/4x}$, ±$LTF_{Add\_1}$, U(14)*$LTF_{80\ MHz\_part4\_1/4x}$, ±$LTF_{Add\_2}$, ±$LTF_{Add\_3}$, U(15)*$LTF_{80\ MHz\_part2\_1/4x}$, ±$LTF_{Add\_4}$, U(16)*$LTF_{80\ MHz\_part5\_1/4x}$}

$LTF_{Add\_1}$=$LTF_{80\ MHz\_part3\_4x}$(1:5), $LTF_{Add\_2}$=$LTF_{80\ MHz\_part3\_4x}$(6:16), $LTF_{Add\_3}$=$LTF_{80\ MHz\_part3\_4x}$(17:28), $LTF_{Add\_4}$=$LTF_{80\ MHz\_part3\_4x}$(29:33)

Table 17 shows examples of T(1) to T(16) for 2x LTF and U(1) to U(16) for 4x LTF. The worst PAPR written below is the result when the values of LTFAdd_1/2/3 are set to null. At this time, T(1) to T(16) for 2x LTF and U(1) to U(16) for 4x LTF with optimal PAPR considering all RUs and MRUs and puncturing in 320 MHz BW are from the next index can be obtained. That is, after changing the index into a 16-bit binary sequence, it can be obtained by mapping '0' to '1' and '1' to '−1'. (Alternatively, it is possible to map '0' to '−1' and '1' to '1'). Here, the optimal PAPR means the sequence with the lowest worst PAPR in all cases.

TABLE 17

| 2 × LTF candidates | | 4 × LTF candidates | |
|---|---|---|---|
| Index | Worst PAPR (dB) | Index | Worst PAPR (dB) |
| 16320 | 9.68 | 16919 | 9.27 |
| 26010 | 9.68 | 24377 | 9.27 |
| 5234 | 9.71 | 20008 | 9.28 |
| 10318 | 9.71 | 32027 | 9.30 |
| 20008 | 9.74 | 11150 | 9.31 |
| 29204 | 9.74 | 29204 | 9.34 |
| 16855 | 9.76 | 32020 | 9.34 |
| 29211 | 9.76 | 19735 | 9.37 |
| 1020 | 9.82 | 10430 | 9.38 |
| 22950 | 9.82 | 10318 | 9.39 |
| 16680 | 9.83 | 16855 | 9.40 |
| 20183 | 9.83 | 6066 | 9.40 |
| 27184 | 9.83 | 10161 | 9.40 |
| 29412 | 9.83 | 20184 | 9.40 |
| 29419 | 9.83 | 10174 | 9.40 |
| 2396 | 9.85 | 11134 | 9.40 |
| 23798 | 9.85 | 19736 | 9.40 |
| 16229 | 9.85 | 28474 | 9.40 |
| 25919 | 9.86 | 32299 | 9.40 |
| 19943 | 9.86 | 6221 | 9.41 |
| 32299 | 9.86 | 1436 | 9.41 |
| 6066 | 9.87 | 1478 | 9.42 |
| 11150 | 9.87 | 2506 | 9.42 |
| 19735 | 9.87 | 13814 | 9.42 |
| 28971 | 9.87 | 14842 | 9.42 |
| 934 | 9.87 | 23648 | 9.42 |
| 6077 | 9.88 | 24419 | 9.42 |
| 9329 | 9.88 | 24668 | 9.42 |
| 22259 | 9.89 | 25439 | 9.42 |
| 22268 | 9.89 | | |
| 22796 | 9.89 | | |

For example, considering the index '16320' among 2x LTF candidates, it is '0011 1111 1100 0000' in binary, and mapping it to T(1) to T(16) gives '1 1 −1 −1 −1 −1 −1 −1 −1 −1 1 1 1 1 1 1'. At this time, if the following minus/plus is applied to $LTF_{Add\_1/2/3/4}$, the worst PAPR becomes 9.72 dB, and in this case, the 2x LTF sequence can be expressed as follows.

$EHTLTF_{320\ MHZ\_2x}$={$LTF_{80\ MHz\_lower1\_2x}$, 23 zeros, $LTF_{80\ MHz\_upper1\_2x}$, 23 zeros, $LTF_{80\ MHz\_lower2\_2x}$, 23 zeros, $LTF_{80\ MHz\_upper2\_2x}$}

$LTF_{80\ MHz\_lower1\_2x}$={$LTF_{80\ MHz\_part1\_2x}$, $LTF_{Add\_1}$, $LTF_{80\ MHz_part4_2x}$, $LTF_{Add\_2}$, $LTF_{Add\_3}$, −$LTF_{80\ MHz\text{-}part2\text{-}2x}$, $LTF_{Add\_4}$, −$LTF_{80\ MHz\_part5\_2x}$}

$LTF_{80\ MHz\text{-}upper1\_2x}$={−$LTF_{80\ MHz\_part1\_2x}$, −$LTF_{Add\_1}$, −$LTF_{80\ MHz_part4_2x}$, −$LTF_{Add\_2}$, −$LTF_{Add\_3}$, −$LTF_{80\ MHz\_part2\_2x}$, −$LTF_{Add\_4}$, −$LTF_{80\ MHz\_part5\_2x}$}

$LTF_{80\ MHz\_lower2\_2x}$={$-LTF_{80\ MHz\_part1\_2x}$, $LTF_{Add\_1}$, $-LTF_{80\ MHz\_part4\_2x}$, $LTF_{Add\_2}$, $LTF_{Add\_3}$, j $LFT_{80\ MHz\_part2\_2x}$, $LTF_{Add\_4}$, $LTF_{80\ MHz\_part5\_2x}$}

$LTF_{80\ MHz\_upper2\_2x}$={$LTF_{80\ MHz\_part1\_2x}$, $-LTF_{Add\_1}$, $LTF_{80\ MHz_part4_2x}$, $-LTF_{Add\_2}$, $-LTF_{Add\_3}$, j $LTF_{80\ MHz\_part2\_2x}$, $-LTF_{Add\_4}$, $LTF_{80\ MHz\_part5\_2x}$}

Alternatively, if $LTF_{Add\_1/2/3/4}$ is applied as follows, the worst PAPR becomes 9.63 dB.

$EHTLTF_{320\ MHZ\_2x}$={$LTF_{80\ MHz\_lower1\_2x}$, 23 zeros, $LTF_{80\ MHz\_upper1\_2x}$, 23 zeros, $LTF_{80\ MHz\_lower2\_2x}$, 23 zeros, $LTF_{80\ MHz\_upper2\_2x}$}

$LTF_{80\ MHz\_lower1\_2x}$={$LTF_{80\ MHz\_part1\_2x}$, $LTF_{Add\_1}$, $LTF_{80\ MHz_part4_2x}$, $LTF_{Add\_2}$, $-LTF_{Add\_3}$, j $-LTF_{80\ MHz\_part2\_2x}$, $-LTF_{Add\_4}$, $-LTF_{80\ MHz\_part5\_2x}$}

$LTF_{80\ MHZ\_upper1\_2x}$={$-LTF_{80\ MHz\_part1\_2x}$, $-LTF_{Add\_1}$, $-LTF_{80\ MHz\_part4\_2x}$, $-LTF_{Add\_2}$, $LTF_{Add\_3}$, $-LTF_{80\ MHz\_part2\_2x}$, $LTF_{Add\_4}$, $-LTF_{80\ MHz\_part5\_2}$}

$LTF_{80\ MHz\_lower2\_2x}$={$-LTF_{80\ MHz\_part1\_2x}$, $LTF_{Add\_1}$, $-LTF_{80\ MHz\_part4\_2x}$, $LTF_{Add\_2}$, $-LTF_{Add\ \ 3}$, $LTF_{80\ MHz\_part2\_2x}$, $-LTF_{Add\_4}$, $LTF_{80\ MHz\_part5\_2x}$}

$LTF_{80\ MHz\_upper2\_2x}$={$LTF_{80\ MHz\_part1\_2x}$, $-LTF_{Add\_1}$, $LTF_{80\ MHz_part4_2x}$, $-LTF_{Add\_2}$, $LTF_{Add\_3}$, $LTF_{80\ MHz\_part2\_2x}$, $LTF_{Add\_4}$, $LTF_{80\ MHz\_part5\_2x}$}

This can also be expressed as:

$EHTLTF_{320\ MHZ\_2x}$={$LTF_{80\ MHz\_lower1\_2x}$, 23 zeros, $LTF_{80\ MHz\_upper1\_2x}$, 23 zeros, $LTF_{80\ MHz\_lower2\_2x}$, 23 zeros, $LTF_{80\ MHz\_upper2\_2x}$}

$LTF_{80\ MHz\_lower1\_2x}$={$LTF_{80\ MHz\_part1\_2x}$, $LTF_{Add\_1}$, $LTF_{80\ MHz_part4_2x}$, $LTF_{Add\_2}$, $-LTF_{80\ MHz\_part2\_2x}$, $LTF_{Add\_3}$, $-LTF_{80\ MHz\_part5\_2x}$}

$LTF_{80\ MHz\_upper1\_2x}$={$-LTF_{80\ MHz\_part1\_2x}$, $-LTF_{Add\_1}$, $-LTF_{80\ MHz\_part4\_2x}$, $-LTF_{Add\_2}$, $-LTF_{80\ MHz\_part2\_2x}$, $-LTF_{Add\_3}$, $-LTF_{80\ MHz\_part5\_2x}$}

$LTF_{80\ MHZ\_lower2\_2x}$={$-LTF_{80\ MHz\_part1\_2x}$, $LTF_{Add\_1}$, $-LTF_{80\ MHz\_part4\_2x}$, $LTF_{Add\_2}$, $LTF_{80\ MHz\_part2\_2x}$, $LTF_{Add\_3}$, $LTF_{80\ MHz\_part5\_2x}$}

$LTF_{80\ MHz\_upper2\_2x}$={$LTF_{80\ MHz\_part1\_2x}$, $-LTF_{Add\_1}$, $LTF_{80\ MHz_part4_2x}$, $-LTF_{Add\_2}$, $LTF_{80\ MHz\_part2\_2x}$, $-LTF_{Add\_3}$, $LTF_{80\ MHz\_part5\_2x}$}

$LTF_{Add\_1}$=[+1, 0, −1, 0, −1]

$LTF_{Add\_2}$=[0, −1, 0, +1, 0, +1, 0, +1, 0, 0, 0, 0, 0, 0, 0, −1, 0, +1, 0, +1, 0, −1, 0]

$LTF_{Add\_3}$=[−1, 0, +1, 0, −1]

As another example, considering the index '16919' among the 4x LTF candidates, it is '0100 0010 0001 0111' in binary, which is U(1)~U(16)=[1 −1 1 1 1 1 1 −1 1 1 1 1 −1 1 −1 −1 −1]. In this case, the 4x LTF sequence can be expressed as follows.

$EHTLTF_{320\ MHz\_4x}$={$LTF_{80\ MHz\_lower1\_4x}$, 23 zeros, $LTF_{80\ MHz\_upper1\_4x}$, 23 zeros, $LTF_{80\ MHz\_lower2\_4x}$, 23 zeros, $LTF_{80\ MHz\_upper2\_4x}$}

$LTF_{80\ MHz\_lower1\_4x}$={$LTF_{80\ MHz\_part1\_4x}$, $LTF_{Add\_1}$, $-LTF_{80\ MHz\_part4\_4x}$, $LTF_{Add\_2}$, $LTF_{80\ MHz\_part2\_4x}$, $LTF_{Add\_3}$, $LTF_{80\ MHz\_part5\_4x}$}

$LTF_{80\ MHz\_upper1\_4x}$={$LTF_{80\ MHz_part1_4}$x, $-LTF_{Add\_1}$, $LTF_{80\ MHz\_part4\_4x}$, $-LTF_{Add\_2}$, $LTF_{80\ MHz\_part2\_4x}$, $-LTF_{Add\_3}$, $LTF_{80\ MHz_part5_4}$x}

$LTF_{80\ MHz\_lower2\_4x}$={$LTF_{80\ MHz\_part1\_4x}$, $LTF_{Add\_1}$, $LFT_{80\ MHz\_part4\_4x}$, $LTF_{Add\_2}$, $LTF_{80\ MHz\_part2\_4x}$, $LTF_{Add\_3}$, $-LTF_{80\ MHz\_part5\_4x}$}

$LTF_{80\ MHz\_upper2\_4x}$={$LTF_{80\ MHz\_part1\_4x}$, $LTF_{Add\_1}$, $-LTF_{80\ MHz\_part4\_4x}$, $LTF_{Add\_2}$, $-LTF_{80\ MHz\_part2\_4x}$, $LTF_{Add\_3}$, $-LTF_{80\ MHz\_part5\_4x}$}

In case where $LTF_{Add\_1}$=[−1, +1, −1 +1, −1], $LTF_{Add\_2}$=[−1, −1, −1, +1, +1, +1, −1, −1, +1, 0, 0, 0, 0, 0, +1, −1, −1, −1, −1, −1, −1, +1, −1], $LTF_{Add\_3}$=[+1, +1, −1, −1, +1], worst PAPR=9.44 dB In case where $LTF_{Add\_1}$=[−1, +1, −1, +1, −1], $LTF_{Add\_2}$=[−1, −1, −1, +1, +1, +1, −1, −1, +1, 0, 0, 0, 0, 0, −1, +1, +1, +1, +1, +1, +1, −1, +1], $LTF_{Add\_3}$=[−1, −1, +1, +1, −1], worst PAPR=9.3 dB We proposed an LTF sequence for the 320 MHz bandwidth. However, as mentioned, since the 80 MHz-based tone plan has changed, it can also be proposed as an LTF sequence with an existing bandwidth lower than 320 MHz based on it. For example, LTF based on 80 MHz or 160 MHz can be expressed as follows.

$EHTLTF_{80\ MHz\_1/2/4x}$={S(1)*$LTF_{80\ MHz\_part1\_1/4x}$, $\pm LTF_{Add\_1}$, S(2)*$LTF_{80\ MHz\_part4\_1/2/4x}$, $\pm LTF_{Add\_2}$, S(3)*$LTF_{80\ MHz\_part2\_1/2/4x}$, $\pm LTF_{Add\_3}$, S(4)*$LTF_{80\ MHz\_part5\_1/2/4x}$}

$EHTLTF_{160\ MHz\_1/2/4x}$={$LTF_{80\ MHz\_lower\_1/2/4x}$, 23 zeros, $LTF_{80\ MHz\_upper\_1/2/4x}$}

$LTF_{80\ MHz\_lower\_1/4x}$={T(1)*$LTF_{80\ MHz\_part1\_1/2/4x}$, $\pm LTF_{Add\_1}$, T(2)*$LTF_{80\ MHz\_part4\_1/4x}$, $\pm LTF_{Add\_2}$, T(3)*$LTF_{80\ MHz\_part2\_1/2/4x}$, $\pm LTF_{Add\_3}$, T(4)*$LTF_{80\ MHz\_part5\_1/2/4x}$}

$LTF_{80\ MHz\_upper\_1/4x}$={T(5)*$LTF_{80\ MHz\_part1\_1/2/4x}$, $\pm LTF_{Add\_1}$, T(6)*$LTF_{80\ MHz\_part4\_1/2/4x}$, $\pm LTF_{Add\_2}$, T(7)*$LTF_{80\ MHz\_part2\_1/2/4x}$, $\pm LTF_{Add\_3}$, T(8)*$LTF_{80\ MHz\_part5\_1/2/4x}$}

Here, S(1) to S(4) and T(1) to T(8) represent values of '+1' or '−1' and may have different values depending on 1x, 2x, and 4x. Also, as mentioned above, $+LTF_{Add\_1/2/3}$ may have different values according to 1x, 2x, and 4x.

4. Proposal 4

$LTF_{80\ MHz\_part1\_2x}$: This corresponds to the first 242-tone RU area from the left.

5-tones: This is not used for RUs smaller than 996RU, but is used for RUs larger than 996RU. 5-seq among $LTF_{80\ MHz\_part3\_2x}$ can be used.

$LTF_{80\ MHz_part4_2x}$: This corresponds to the second 242-tone RU area from the left.

23-tones: This is not used for RUs smaller than 996RU, but is used for RUs larger than 996 except for 5 DC. A part of a sequence among $LTF_{80\ MHz\_part3\_2x}$ can be used.

$LTF_{80\ MHz\_part\_2x}$: This corresponds to the third 242-tone RU area from the left.

5-tones: This is not used for RUs smaller than 996RU, but is used for RUs larger than 996RU. 5-seq among $LTF_{80\ MHz\_part3\_2x}$ can be used.

$LTF_{80\ MHz\_part5\_2x}$: This corresponds to the Third 242-tone RU area from the left.

Here, since $LFT_{80\ MHzpart1\_2x}$ and $LTF_{80\ MHz\_part2\_2x}$ are sequences derived from the same structure, their positions can be changed. The same applies to $LTF_{80\ MHz\ part4\_2x}$ and $LTF_{80\ MH\_part5\_2x}$. Therefore, in this specification, a sequence suitable for 11be 160 MHz can be configured by applying different codes of each value with this structure. That is, the structure of the proposed 2x EHT-LTF sequence is as follows. The same method as above can be applied to 1x LTF and 4x LTF. That is, in the case of 1/4x LTF, it is configured as $LTF_{80\ MHz\_left\_1/4x}$ and $LTF_{80\ MHz\_right\_1/4x}$ in units of 80 MHz (see background description), and the above method can be applied when it is divided as follows.

$LTF_{80\ MHz\_part1\_1/4x}$=$LTF_{80\ MHz\_left\_1/4x}$(1:242)

$LTF_{80\ MHz\_part2\_1/4x}$=$LFT_{80\ MHz\_left\_1/4x}$(243:484)

$LTF_{80\ MHz\_part3\_1/4x}$={$LTF_{80\ MHz\_left\_1/4x}$(485:500), 0, $LTF_{80\ MHz\_right\_1/4x}$(1:16)}

$LTF_{80\ MHz\_part4\_1/4x}$=$LFT_{80\ MHz\_right\_1/4x}$(17:258)

$LTF_{80\ MHz\_part5\_1/4x}$=$LTF_{80\ MHz\_right\_1/4x}$(259:500)

That is, the structures of EHT-LTF sequences proposed for 80 MHz and 160 MHz are as follows.

$EHTLTF_{80\ MHz\_1/2/4x}$={S(1)*$LTF_{80\ MHz\_part1\_1/2/4x}$, ±M1, S(2)*$LTF_{80\ MHz\_part4\_1/2/4x}$, ±M2, 0, ±M3, S(3)*$LTF_{80\ MHz\_part2\_1/2/4x}$, ±M4, S(4)*$LTF_{80\ MHz\_part5\_1/2/4x}$}

$EHTLTF_{160\ MHz\_1/2/4x}$={$LTF_{80\ MHz\_lower\_1/2/4x}$, 23 zeros, $LTF_{80\ MHz\_upper\_1/2/4x}$}

$LTF_{80\ MHz\_lower\_1/4x}$={T(1)*$LTF_{80\ MHz\_part1\_1/2/4x}$, ±M1, T(2)*$LTF_{80\ MHz\_part4\_1/4x}$, ±M2, 0, ±M3, T(3)*$LTF_{80\ MHz\_part2\_1/2/4x}$, ±M4, T(4)*$LTF_{80\ MHz\_part5\_1/2/4x}$}

$LTF_{80\ MHz\_upper\_1/4x}$={T(5)*$LTF_{80\ MHz\_part1\_1/2/4x}$, ±M1, T(6)*$LTF_{80\ MHz\_part4\_1/2/4x}$, ±M2, 0, ±M3, T(7)*$LTF_{80\ MHz\_part2\_1/2/4x}$, ±M4, T(8)*$LTF_{80\ MHz\_part5\_1/2/4x}$}

Here, S(1) to S(4) and T(1) to T(8) represent values of '+1' or '−1' and may have different values depending on 1x, 2x, and 4x. In addition, M1 to M4 can be defined as follows, and the codes applied to each may also have different values according to 1x, 2x, and 4x.

M1=contiguous 5 sequences among $LTF_{80\ MHz\_part3\_1/2/4x}$, for instance $LTF_{80\ MHz\_part3\_1/2/4x}$(1:5)

M2=contiguous 11 sequences among $LTF_{80\ MHz\_part3\_1/2/4x}$, for instance $LTF_{80\ MHz\_part3\_1/2/4x}$(6:16)

M3=contiguous 11 sequences among $LTF_{80\ MHz\_part3\_1/2/4x}$, for instance $LTF_{80\ MHz\_part3\_1/2/4x}$(18:28)

M4=contiguous 5 sequences among $LTF_{80\ MHz\_part3\_1/2/4x}$, for instance $LTF_{80\ MHz\_part3\_1/2/4x}$(29:33)

A detailed configuration example of the above sequence is presented below.

First, in the case of 2x EHT-LTF, $LTF_{80\ MHz\_part1/2/4/5\_2x}$ is the same as before, and M1 to M4 can be defined as follows.

M1=[+1, 0, −1, 0, −1];

M2=[0, −1, 0, +1, 0, +1, 0, +1, 0, 0, 0];

M3=[0, 0, 0, +1, 0, −1, 0, −1, 0, +1, 0];

M4=[+1, 0, −1, 0, +1];

At this time, an example of 2x EHT-LTF sequences in 80 MHz PPDU is as follows.

$EHTLTF_{80\ MHz\_2x}$={S(1)*$LTF_{80\ MHz\_part1\_2x}$, M1, S(2)*$LTF_{80\ MHz_part4_2x}$, M2, 0, M3, S(3)*$LTF_{80\ MHz\_part2\_2x}$, M4, S(4)*$LTF_{80\ MHz\_part5\_2x}$}

Here, S(1) to S(4) expresses the index in the following table as a 4-bit binary number, and then '0' is expressed as '1' and '1' as '−1', or '0' is expressed as '−1' and '1' matched the value expressed by '1', and the worst PAPR according to each index was also displayed (applied in the same way when reading the table below).

TABLE 18

| index | Worst PAPR |
|---|---|
| 0 | 8.593146 |
| 1 | 9.2597002 |
| 2 | 8.708124 |
| 3 | 8.593146 |
| 4 | 8.9591108 |
| 5 | 8.593146 |
| 6 | 8.593146 |

$EHTLTF_{80\ MHz\_2x}$={S(1)*$LTF_{80\ MHz\_part1\_2x}$, M1, S(2)*$LTF_{80\ MHz\_part\ 4\_2x}$, M2, 0, −M3, S(3)*$LTF_{80\ MHz\_part2\_2x}$, −M4, S(4)*$LTF_{80\ MHz\_part5\_2x}$}

TABLE 19

| index | Worst PAPR |
|---|---|
| 0 | 8.593146 |
| 1 | 9.5409565 |
| 2 | 8.8774006 |
| 3 | 8.593146 |
| 4 | 9.2838981 |
| 5 | 8.593146 |
| 6 | 8.593146 |

An example of 2x EHT-LTF sequences in 160 MHz PPDU is as follows.

$EHTLTF_{160\ MHz\_2x}$={$LTF_{80\ MHz\_lower\_2x}$, 23 zeros, $LTF_{80\ MHz\_upper\_2x}$}

$LTF_{80\ MHz\_lower\_2x}$={T(1)*$LTF_{80\ MHz\_part1\_2x}$, M1, T(2)*$LTF_{80\ MHz_part4_2x}$, M2, 0, M3, T(3)*$LTF_{80\ MHz\_part2\_2x}$, M4, T(4)*$LFT_{80\ MHz\_part5\_2x}$}

$LTF_{80\ MHz\_upper\_2x}$={T(5)*$LTF_{80\ MHz\_part1\_2x}$, M1, T(6)*$LTF_{80\ MHz_part4_2x}$, M2, 0, M3, T(7)*$LTF_{80\ MHz\_part2\_2x}$, M4, T(8)*$LTF_{80\ MHz\_part5\_2x}$}

Here, T(1) to T(8) expresses the index of the following table as an 8-bit binary number, and then '0' is expressed as '1' and '1'as '−1', or '0' is expressed as '−1'. ' and '1' matched the value expressed as '1', and the worst PAPR according to each index was also displayed (the same method is applied when reading the table below).

TABLE 20

| index | Worst PAPR |
|---|---|
| 10 | 8.765372 |
| 89 | 8.85728 |
| 3 | 8.871749 |
| 48 | 8.871749 |
| 54 | 8.898339 |
| 99 | 8.912174 |
| 57 | 8.914869 |
| 5 | 8.968869 |
| 80 | 8.968869 |
| 12 | 9.035478 |
| 108 | 9.117043 |
| 106 | 9.133637 |
| 39 | 9.137542 |
| 125 | 9.196883 |
| 86 | 9.232336 |
| 101 | 9.232336 |
| 78 | 9.24614 |
| 40 | 9.294588 |

$EHTLTF_{160\ MHz\_2x}$={$LTF_{80\ MHz\_lower\_2x}$, 23 zeros, $LTF_{80\ MHz\_upper\_2x}$}

$LTF_{80\ MHz\_lower\_2x}$={T(1)*$LTF_{80\ MHz\_part1\_2x}$, M1, T(2)*$LTF_{80\ MHz_part4_2x}$, M2, 0, M3, T(3)*$LTF_{80\ MHz\_part2\_2x}$, M4, T(4)*$LTF_{80\ MHz\_part5\_2x}$}

$LTF_{80\ MHz\_upper\_2x}$={T(5)*$LTF_{80\ MHz\_part1\_2x}$, −M1, T(6)*$LTF_{80\ MHz_part4_2x}$, −M2, 0, −M3, T(7)*$LTF_{80\ MHz\_part2\_2x}$, −M4, T(8)*$LTF_{80\ MHz\_part5\_2x}$}

TABLE 21

| index | Worst PAPR |
|---|---|
| 99 | 8.856338 |
| 89 | 8.85728 |
| 106 | 8.85728 |
| 54 | 8.898339 |
| 57 | 8.914869 |
| 108 | 8.914869 |
| 80 | 8.968869 |
| 48 | 9.077035 |

TABLE 21-continued

| index | Worst PAPR |
|---|---|
| 86 | 9.092197 |
| 3 | 9.106636 |
| 114 | 9.115953 |
| 125 | 9.179852 |
| 39 | 9.230469 |
| 101 | 9.232336 |
| 40 | 9.249253 |
| 5 | 9.268045 |

$EHTLTF_{160\ MHz\_2x}=\{LTF_{80\ MHz\_lower\_2x},\ 23\ zeros,\ LTF_{80\ MHz\_upper\_2x}\}$ $LTF_{80\ MHz\_lower\_2x}=\{T(1)*LTF_{80\ MHz\_part1\_2x},\ M1,\ T(2)*LTF_{80\ MHz\_part4\_2x},\ M2,\ 0,\ -M3,\ T(3)*LTF_{80\ MHz\_part2\_2x},\ -M4,\ T(4)*LTF_{80\ MHz\_part5\_2x}\}$ $LTF_{80\ MHz\_upper\_2x}=\{T(5)*LTF_{80\ MHz\_part1\_2x},\ M1,\ T(6)*LTF_{80\ MHz\_part4\_2x},\ M2,\ 0,\ -M3,\ T(7)*LTF_{80\ MHz\_part2\_2x},\ -M4,\ T(8)*LTF_{80\ MHz\_part5\_2x}\}$

TABLE 22

| index | Worst PAPR |
|---|---|
| 95 | 8.689848 |
| 108 | 8.823144 |
| 86 | 8.932701 |
| 101 | 8.932701 |
| 63 | 9.049219 |
| 54 | 9.074827 |
| 106 | 9.20192 |
| 92 | 9.202021 |
| 10 | 9.223771 |
| 99 | 9.268552 |

$EHTLTF_{160\ MHz\_2x}=\{LTF_{80\ MHz\_lower\_2x},\ 23\ zeros,\ LTF_{80\ MHz\_upper\_2x}\}$ $LTF_{80\ MHz\_lower\_2x}=\{T(1)*LTF_{80\ MHZ\_part1\_2x},\ M1,\ T(2)*LTF_{80\ MHz\_part4\_2x},\ M2,\ 0,\ -M3,\ T(3)*LTF_{80\ MHz\_part2\_2x},\ -M4,\ T(4)*LTF_{80\ MHz\_part5\_2x}\}$ $LTF_{80\ MHz\_upper\_2x}=\{T(5)*LTF_{80\ MHz\_part1\_2x},\ -M1,\ T(6)*LTF_{80\ MHz\_part4\_2x},\ -M2,\ 0,\ M3,\ T(7)*LTF_{80\ MHz\_part2\_2x},\ M4,\ T(8)*LTF_{80\ MHz\_part5\_2x}\}$

TABLE 23

| index | Worst PAPR |
|---|---|
| 99 | 8.834257 |
| 54 | 8.889518 |
| 95 | 8.899729 |
| 5 | 8.931776 |
| 101 | 8.937423 |
| 114 | 8.973907 |
| 10 | 9.073144 |
| 3 | 9.254184 |
| 39 | 9.267806 |

In case of 4x EHT-LTF, $LTF_{80\ MHz\_part1/2/4/5\_4x}$ and M1 to M4 can be defined as follows.

$LTF_{80\ MHz\_part1\_4x}=LTF_{80\ MHz\_left\_4x}(1:242)$ $LFT_{80\ MHz\_part2\_4x}=LTF_{80\ MHz\_left\_4x}(243:484)$ $LTF_{80\ MHz\_part4\_4x}=LTF_{80\ MHz\_right\_4x}(17:258)$ $LTF_{80\ MHz\_part5\_4x}=LFT_{80\ MHz\_right\_4x}(259:500)$ $M1=LTF_{80\ MHz\_left\_4x}(485:489)$, i.e., [−1, +1, −1, +1, −1];

$M2=LTF_{80\ MHz\_left\ 4x}(490:500)$, i.e., [−1, −1, −1, +1, +1, +1, −1, −1, +1, 0, 0];

$M3=LTF_{80\ MHz\_left\_4x}(1:11)$, i.e., [0, 0, +1, −1, −1, −1, −1, −1, −1, +1, −1];

$M4=LTF_{80\ MHz\_left\_4x}(12:16)$, i.e., [+1, +1, −1, −1, +1];

At this time, an example of 4x EHT-LTF sequences in 80 MHz PPDU is as follows.

$EHTLTF_{80\ MHz\_4x}=\{S(1)*LTF_{80\ MHz\_part\_4x},\ M1,\ S(2)*LTF_{80\ MHz\_part4\_4x},\ M2,\ 0,\ M3,\ S(3)*LTF_{80\ MHz\_part2\_4x},\ M4,\ S(4)*LTF_{80\ MHz\_part5\_4x}\}$ Here, T(1) to T(8) expresses the index of the following table as an 8-bit binary number, and then '0' is expressed as '1' and '1' as '−1', or '0' is expressed as '−1'. ' and '1' matched the value expressed as '1', and the worst PAPR according to each index was also displayed (the same method is applied when reading the table below).

TABLE 24

| index | Worst PAPR |
|---|---|
| 0 | 8.2902416 |
| 1 | 8.2217025 |
| 2 | 7.9748572 |
| 3 | 8.324071 |
| 4 | 8.3352121 |
| 5 | 8.1596773 |
| 6 | 8.0924477 |

$EHTLTF_{80\ MHz\_4x}=\{S(1)*LTF_{80\ MHz\_part\_4x},\ M1,\ S(2)*LTF_{80\ MHz\_part4\_4x},\ M2,\ 0,\ -M3,\ S(3)*LTF_{80\ MHz\_part2\_4x},\ -M4,\ S(4)*LTF_{80\ MHz\_part5\_4x}\}$

TABLE 25

| index | Worst PAPR |
|---|---|
| 0 | 8.2902416 |
| 1 | 8.2240823 |
| 2 | 8.3387915 |
| 3 | 7.9243351 |
| 4 | 8.2902416 |
| 5 | 8.1596773 |
| 6 | 8.3484227 |

An example of 2x EHT-LTF sequences in 160 MHz PPDU is as follows.

$EHTLTF_{160\ MHz\_4x}=\{LTF_{80\ MHz\_lower\_4x},\ 23\ zeros,\ LTF_{80\ MHz\_upper\_4x}\}$ $LTF_{80\ MHz\_lower\_4x}=\{T(1)*LTF_{80\ MHz\_part1\_4x},\ M1,\ T(2)*LTF_{80\ MHz\_part4\_4x},\ M2,\ 0,\ M3,\ T(3)*LTF_{80\ MHz\_part2\_4x},\ M4,\ T(4)*LTF_{80\ MHz\_part5\_4x}\}$ $LTF_{80\ MHz\_upper\_4x}=\{T(5)*LTF_{80\ MHz\_part1\_4x},\ M1,\ T(6)*LTF_{80\ MHz\_part4\_4x},\ M2,\ 0,\ M3,\ T(7)*LTF_{80\ MHz\_part2\_4x},\ M4,\ T(8)*LTF_{80\ MHz\_part5\_4x}\}$ Here, T(1) to T(8) expresses the index of the following table as an 8-bit binary number, and then '0' is expressed as '1' and '1' as '−1', or '0' is expressed as '−1'. ' and '1' matched the value expressed as '1', and the worst PAPR according to each index was also displayed (the same method is applied when reading the table below).

TABLE 26

| index | Worst PAPR |
|---|---|
| 99 | 8.519428 |
| 54 | 8.520575 |
| 125 | 8.616767 |
| 78 | 8.641096 |
| 39 | 8.649411 |
| 108 | 8.677054 |
| 95 | 8.717887 |
| 57 | 8.813709 |
| 113 | 8.815107 |
| 43 | 8.885937 |
| 27 | 8.886533 |

TABLE 26-continued

| index | Worst PAPR |
|---|---|
| 10 | 8.951927 |
| 23 | 8.961349 |
| 114 | 9.10502 |
| 40 | 9.163471 |
| 126 | 9.199194 |
| 77 | 9.206623 |
| 53 | 9.235807 |
| 83 | 9.235807 |
| 80 | 9.281992 |

$EHTLTF_{160\ MHz\_4x}=\{LTF_{80\ MHz\_lower\_4x}$, 23 zeros, $LTF_{80\ MHz\_upper\_4x}\}$ $LTF_{80\ MHz\_lower\_4x}=\{T(1)*LTF_{80\ MHz\_part1\_4x}$, M1, $T(2)*LTF_{80\ MHz\_part4\_4x}$, M2, 0, −M3, $T(3)*LTF_{80\ MHz\_part2\_4x}$, −M4, $T(4)*LTF_{80\ MHz\_part5\_4x}\}$ $LTF_{80\ MHz\_upper\_4x}=\{T(5)*LTF_{80\ MHz\_part1\_4x}$, M1, $T(6)*LTF_{80\ MHz\_part4\_4x}$, M2, 0, −M3, $T(7)*LTF_{80\ MHz\_part2\_4x}$, −M4, $T(8)*LTF_{80\ MHz\_part5\_4x}\}$ Here, T(1) to T(8) expresses the index of the following table as an 8-bit binary number, and then ‘0’ is expressed as ‘1’ and ‘1’ as ‘−1’, or ‘0’ is expressed as ‘−1’. ' and ‘1’ matched the value expressed as ‘1’, and the worst PAPR according to each index was also displayed (the same method is applied when reading the table below).

TABLE 27

| index | Worst PAPR |
|---|---|
| 78 | 8.67453 |
| 108 | 8.690704 |
| 57 | 8.712807 |
| 80 | 8.746319 |
| 40 | 8.76835 |
| 95 | 8.769018 |
| 20 | 8.77958 |
| 65 | 8.77958 |
| 10 | 8.802595 |
| 27 | 8.880547 |
| 125 | 8.886977 |
| 99 | 8.910601 |
| 83 | 8.939917 |
| 43 | 8.976437 |
| 5 | 8.994334 |
| 53 | 9.007061 |
| 23 | 9.017615 |
| 54 | 9.07877 |
| 39 | 9.079033 |
| 58 | 9.145908 |
| 111 | 9.147051 |
| 126 | 9.154321 |
| 113 | 9.211298 |
| 36 | 9.215948 |
| 66 | 9.215948 |
| 24 | 9.258645 |
| 6 | 9.298159 |

$EHTLTF_{160\ MHz\_4x}=\{LTF_{80\ MHz\_lower\_4x}$, 23 zeros, $LTF_{80\ MHz\_upper\_4x}\}$ $LTF_{80\ MHz\_lower\_4x}=\{T(1)*LTF_{80\ MHz\_part1\_4x}$, M1, $T(2)*LTF_{80\ MHz\_part4\_4x}$, M2, 0, M3, $T(3)*LTF_{80\ MHz\_part2\_4x}$, M4, $T(4)*LTF_{80\ MHz\_part5\_4x}\}$ $LTF_{80\ MHz\_upper\_4x}=\{T(5)*LTF_{80\ MHz\_part1\_4x}$, −M1, $T(6)*LTF_{80\ MHz\_part4\_4x}$, −M2, 0, −M3, $T(7)*LTF_{80\ MHz\_part2\_4x}$, −M4, $T(8)*LTF_{80\ MHz\_part5\_4x}\}$ Here, T(1) to T(8) expresses the index of the following table as an 8-bit binary number, and then ‘0’ is expressed as ‘1’ and ‘1’ as ‘−1’, or ‘0’ is expressed as ‘−1’. ' and ‘1’ matched the value expressed as ‘1’, and the worst PAPR according to each index was also displayed (the same method is applied when reading the table below).

TABLE 28

| index | Worst PAPR |
|---|---|
| 125 | 8.472995 |
| 78 | 8.641096 |
| 108 | 8.677054 |
| 57 | 8.813709 |
| 99 | 8.842765 |
| 40 | 8.850863 |
| 96 | 8.860076 |
| 27 | 8.886533 |
| 113 | 8.935642 |
| 10 | 8.951927 |
| 95 | 8.951927 |
| 23 | 8.996254 |
| 39 | 9.029745 |
| 36 | 9.042915 |
| 80 | 9.043222 |
| 53 | 9.046156 |
| 43 | 9.091816 |
| 77 | 9.091816 |
| 114 | 9.10502 |
| 20 | 9.224595 |
| 83 | 9.235807 |
| 54 | 9.286588 |

$EHTLTF_{160\ MHz\_4x}=\{LTF_{80\ MHz\_lower\_4x}$, 23 zeros, $LTF_{80\ MHz\_upper\_4x}\}$ $LTF_{80\ MHz\_lower\_4x}=\{T(1)*LTF_{80\ MHz\_part1\_4x}$, M1, $T(2)*LTF_{80\ MHz\_part4\_4x}$, M2, 0, −M3, $T(3)*LTF_{80\ MHz\_part2\_4x}$, −M4, $T(4)*LTF_{80\ MHz\_part5\_4x}\}$ $LTF_{80\ MHz\_upper\_4x}=\{T(5)*LTF_{80\ MHz\_part\_4x}$, −M1, $T(6)*LTF_{80\ MHz\_part4\_4x}$, −M2, 0, M3, $T(7)*LTF_{80\ MHz\_part2\_4x}$, M4, $T(8)*LTF_{80\ MHz\_part5\_4x}\}$ Here, T(1) to T(8) expresses the index of the following table as an 8-bit binary number, and then ‘0’ is expressed as ‘1’ and ‘1’ as ‘−1’, or ‘0’ is expressed as ‘−1’. ' and ‘1’ matched the value expressed as ‘1’, and the worst PAPR according to each index was also displayed (the same method is applied when reading the table below).

TABLE 29

| index | Worst PAPR |
|---|---|
| 10 | 8.463942 |
| 95 | 8.463942 |
| 57 | 8.605589 |
| 27 | 8.631551 |
| 78 | 8.67453 |
| 39 | 8.760108 |
| 65 | 8.77958 |
| 108 | 8.783061 |
| 99 | 8.869384 |
| 23 | 8.88674 |
| 125 | 8.886977 |
| 54 | 8.910601 |
| 83 | 8.939917 |
| 43 | 8.958759 |
| 77 | 8.958759 |
| 40 | 8.974338 |
| 5 | 8.994334 |
| 92 | 9.145908 |
| 113 | 9.211298 |
| 66 | 9.215948 |
| 58 | 9.253977 |
| 9 | 9.258645 |
| 24 | 9.258645 |
| 111 | 9.258645 |
| 126 | 9.258645 |
| 53 | 9.280521 |

5. Proposal 5

$LTF_{80\ MHz\_part1\_2x}$: This corresponds to the first 242-tone RU area from the left.

5-tones: This is not used for RUs smaller than 996RU, but is used for RUs larger than 996RU. 5-seq among $LTF_{80\ MHz\_part3\_2x}$ can be used.

$LTF_{80\ MHZ\_part4\_2x}$: This corresponds to the second 242-tone RU area from the left.

23-tones: This is not used for RUs smaller than 996RU, but is used for RUs larger than 996 except for 5 DC. A part of a sequence among $LTF_{80\ MHz\_part3\_2x}$ can be used.

$LTF_{80\ MHz\_part2\_2x}$: This corresponds to the third 242-tone RU area from the left.

5-tones: This is not used for RUs smaller than 996RU, but is used for RUs larger than 996RU. 5-seq among $LTF_{80\ MHz\_part3\_2x}$ can be used.

$LTF_{80\ MHz\_part5\_2x}$: This corresponds to the Third 242-tone RU area from the left.

Here, since $LTF_{80\ MHz\_part1\_2x}$ and $LTF_{80\ MHz\_part2\_2x}$ are sequences derived from the same structure, their positions can be changed. The same applies to $LTF_{80\ MHz_part4_2x}$ and $LTF_{80\ MHz\_part5\_2x}$. Therefore, in this specification, a sequence suitable for 11be 320 MHz can be configured by applying different codes of each value with this structure. That is, the structure of the proposed 2x EHT-LTF sequence is as follows.

$EHTLTF_{320\ MHz\_2x}$={$LTF_{80\ MHz\_lower1\_2x}$, 23 zeros, $LTF_{80\ MHz\_upper1\_2x}$, 23 zeros, $LTF_{80\ MHz\_lower2\_2x}$, 23 zeros, $LTF_{80\ MHz\_upper2\_2x}$}

$LTF_{80\ MHz\_lower1\_2x}$={T(1)*$LTF_{80\ MHz\_part1\_2x}$, ±$LTF_{Add\_1}$, T(2)*$LTF_{80\ MHz_part4_2x}$, ±$LTF_{Add\_2}$, ±$LTF_{Add\_3}$, T(3)*$LTF_{80\ MHz\_part2\_2x}$, ±$LTF_{Add\_4}$, T(4)*$LTF_{80\ MHz\_part5\_2x}$}

$LTF_{80\ MHz\_upper1\_2x}$={T(5)*$LTF_{80\ MHz\_part1\_2x}$, ±$LTF_{Add\_1}$, T(6)*$LTF_{80\ MHz_part4_2x}$, ±$LTF_{Add\_2}$, ±$LTF_{Add\_3}$, T(7)*$LTF_{80\ MHz\_part2\_2x}$, ±$LTF_{Add\_4}$, T(8)*$LTF_{80\ MHz\_part5\_2}$}

$LTF_{80\ MHz\_lower2\_2x}$={T(9)*$LTF_{80\ MHz\_part1\_2x}$, ±$LTF_{Add\_1}$, T(10)*$LTF_{80\ MHz_part4_2x}$, ±$LTF_{Add\_2}$, ±$LTF_{Add\_3}$, T(11)*$LTF_{80\ MHz\_part2\_2x}$, ±$LTF_{Add\_4}$, T(12)*$LTF_{80\ MHz\_part5\_2x}$}

$LTF_{80\ MHz\_upper2\_2x}$={T(13)*$LTF_{80\ MHz\_part1\_2x}$, ±$LTF_{Add\_1}$, T(14)*$LTF_{80\ MHz_part4_2x}$, ±$LTF_{Add\_2}$, ±$LTF_{Add\_3}$, T(15)*$LTF_{80\ MHz\_part2\_2x}$, ±$LTF_{Add\_4}$, T(16)*$LTF_{80\ MHz\_part5\_2x}$}

$LTF_{Add\_1}$=$LTF_{80\ MHz\_part3\_2x}$(1:5), $LTF_{Add\_2}$=$LTF_{80\ MHz\_part3\_2x}$(6:16), $LTF_{Add\_3}$=$LTF_{80\ MHz\_part3\_2x}$(17:28), $LTF_{Add\_4}$=$LTF_{80\ MHz\_part3\_2x}$(29:33)

Here, $LTF_{80\ MHz\_part1\_2x}$, $LTF_{80\ MHz\_part2\_2x}$, $LTF_{80\ MHz\_part3\_2x}$, $LTF_{80\ MHz_part4_2x}$, $LTF_{80\ MHz\_part5\_2x}$ are as defined above, and 'X zeros' means X number of '0's.

Here, the index and worst PAPR values representing the optimal T(1) to T(16) according to the coefficients of $LTF_{Add\_1\ to\ 4}$ are as follows. That is, after changing the index into a 16-bit binary sequence, it can be obtained by mapping '0' to '1' and '1' to '−1'. (Alternatively, it is possible to map '0' to '−1' and '1' to '1')

First when it is defined that $LTF_{Add\_1}$=$LTF_{80\ MHz\_part3\_2x}$(1:5), $LTF_{Add\_2}$=$LTF_{80\ MHz\_part3\_2x}$(6:16), $LTF_{Add\_3}$=$LTF_{80\ MHz\_part3\_2x}$(17:28), $LTF_{Add\_4}$=$LTF_{80\ MHz\_part3\_2x}$(29:33, the plus/minus in the first row below means: all plus/minus of $LTF_{Add\_1\ to\ 4}$ included in $LTF_{80\ MHz\_lower1\_2x}$; plus/minus of all $LTF_{Add\_1\ to\ 4}$ included in $LTF_{80\ MHz\_upper1\_2x}$; plus/minus of all $LTF_{Add\_1\ to\ 4}$ included in $LTF_{80\ MHz\_lower1\_2x}$; plus/minus of all $LTF_{Add\_1\ to\ 4}$ included in $LTF_{80\ MHz\_upper2\_2x}$.

TABLE 30

| (+, +, +, +) | | (+, +, +, −) | | (+, +, −, +) | | (+, −, +, +) | |
|---|---|---|---|---|---|---|---|
| T(1)~ T(16) index | Worst PAPR (dB) | T(1)~ T(16) index | Worst PAPR (dB) | T(1)~ T(16) index | Worst PAPR (dB) | T(1)~ T(16) index | Worst PAPR (dB) |
| 27184 | 9.73 | 20008 | 9.61 | 27184 | 9.72627 | 934 | 9.72627 |
| 16320 | 9.74 | 28613 | 9.69 | 22950 | 9.74323 | 29412 | 9.74177 |
| 19943 | 9.76 | 26010 | 9.77 | 20183 | 9.76213 | 28613 | 9.76339 |
| 20183 | 9.76 | 27184 | 9.77 | 22268 | 9.76339 | 16680 | 9.77495 |
| 22268 | 9.76 | 14959 | 9.8 | 28474 | 9.76428 | 10174 | 9.79239 |
| 28474 | 9.76 | 16680 | 9.8 | 5261 | 9.79085 | 27285 | 9.81109 |
| 28613 | 9.76 | 23286 | 9.86 | 32299 | 9.81088 | 16855 | 9.82147 |
| 26010 | 9.77 | 27802 | 9.86 | 15366 | 9.85858 | 165 | 9.82287 |
| 934 | 9.78 | 6066 | 9.87 | 16284 | 9.85858 | 20183 | 9.85111 |
| 14959 | 9.8 | 28469 | 9.87 | 29005 | 9.86274 | 20008 | 9.85176 |
| 22950 | 9.8 | 1699 | 9.88 | 28971 | 9.86923 | 13679 | 9.86141 |
| 12495 | 9.81 | 21497 | 9.88 | 24474 | 9.87196 | 5335 | 9.86274 |
| 19735 | 9.82 | 23801 | 9.88 | 13993 | 9.88076 | 17127 | 9.86764 |
| 1619 | 9.85 | 25443 | 9.88 | 26010 | 9.88308 | 22950 | 9.86793 |
| 27285 | 9.85 | 10305 | 9.89 | 19735 | 9.89494 | 1020 | 9.87859 |
| 13993 | 9.86 | 32475 | 9.89 | | | 10318 | 9.87927 |
| 15366 | 9.86 | 1738 | 9.91 | | | 10430 | 9.87927 |
| 15471 | 9.86 | 5234 | 9.91 | | | 25443 | 9.88427 |
| 22266 | 9.86 | 5245 | 9.91 | | | 24570 | 9.89207 |
| 23046 | 9.86 | 13923 | 9.91 | | | 29147 | 9.89282 |
| 27283 | 9.86 | 24565 | 9.91 | | | 26010 | 9.89491 |
| 28476 | 9.86 | 26063 | 9.91 | | | | |
| 28581 | 9.86 | 1625 | 9.92 | | | | |
| 1596 | 9.87 | 2640 | 9.92 | | | | |
| 12365 | 9.87 | 23280 | 9.92 | | | | |
| 26172 | 9.87 | 25349 | 9.92 | | | | |
| 1020 | 9.88 | 16234 | 9.93 | | | | |
| 1699 | 9.88 | 23663 | 9.93 | | | | |
| 15519 | 9.88 | 28474 | 9.93 | | | | |

TABLE 31

| (+, +, −, −) | | (+, −, +, −) | | (+, −, −, +) | | (+, −, − ,−) | |
|---|---|---|---|---|---|---|---|
| T(1)~ T(16) index | Worst PAPR (dB) | T(1)~ T(16) index | Worst PAPR (dB) | T(1)~ T(16) index | Worst PAPR (dB) | T(1)~ T(16) index | Worst PAPR (dB) |
| 22950 | 9.66 | 29412 | 9.71452 | 29203 | 9.6153 | 16680 | 9.73335 |
| 27184 | 9.81 | 16320 | 9.72062 | 10174 | 9.7263 | 29419 | 9.74761 |
| 3315 | 9.82 | 28613 | 9.73189 | 934 | 9.7674 | 29412 | 9.79097 |
| 24476 | 9.83 | 29419 | 9.75362 | 29210 | 9.8016 | 28613 | 9.80439 |
| 27285 | 9.83 | 16680 | 9.76014 | 16855 | 9.8249 | 1436 | 9.84796 |
| 1020 | 9.84 | 27285 | 9.77192 | 20182 | 9.8511 | 29211 | 9.84817 |
| 16284 | 9.86 | 25504 | 9.8275 | 14604 | 9.8586 | 27702 | 9.84974 |
| 24474 | 9.87 | 26010 | 9.83729 | 16284 | 9.8586 | 27184 | 9.87484 |
| 15519 | 9.89 | 19943 | 9.84946 | 24414 | 9.8641 | 13993 | 9.88076 |
| 32445 | 9.89 | 3317 | 9.86142 | 25442 | 9.8641 | 26010 | 9.88308 |
| 20008 | 9.91 | 13993 | 9.86142 | 16919 | 9.8676 | 2396 | 9.88654 |
| 22185 | 9.92 | 20735 | 9.86859 | 22949 | 9.8679 | 14992 | 9.90711 |
| 25404 | 9.93 | 1020 | 9.87859 | 24473 | 9.872 | 20725 | 9.90744 |
| 3317 | 9.94 | 24565 | 9.89207 | 10318 | 9.8793 | 90 | 9.90854 |
| 14604 | 9.94 | 29147 | 9.89282 | 10430 | 9.8793 | 28971 | 9.91071 |
| 20183 | 9.94 | 11137 | 9.89364 | 20108 | 9.8861 | 26063 | 9.91143 |
| 22796 | 9.94 | 13984 | 9.89863 | 29360 | 9.8861 | 28579 | 9.91362 |
| 12495 | 9.95 | 13923 | 9.91066 | 29418 | 9.8988 | 14687 | 9.91872 |
| 23801 | 9.95 | 26063 | 9.91143 | 26062 | 9.9026 | 924 | 9.92651 |
| 20184 | 9.96 | 12495 | 9.92051 | 13919 | 9.9055 | 1434 | 9.92651 |
| 20687 | 9.96 | 1370 | 9.92651 | 14687 | 9.9055 | 27141 | 9.92651 |
| 12365 | 9.97 | 14799 | 9.92651 | 27198 | 9.906 | 24325 | 9.93205 |
| 13254 | 9.97 | 27141 | 9.92651 | 27279 | 9.9061 | 22208 | 9.93207 |
| 23184 | 9.97 | 16208 | 9.93034 | 14992 | 9.9071 | 10318 | 9.93235 |
| 25545 | 9.98 | 22176 | 9.93207 | 17025 | 9.9071 | 20008 | 9.93235 |
| 26010 | 9.98 | 22208 | 9.93207 | 28612 | 9.9071 | 29262 | 9.93235 |
| | | 10318 | 9.93235 | 32444 | 9.9071 | 32299 | 9.93235 |
| | | 14687 | 9.93235 | 27183 | 9.909 | 10243 | 9.93518 |
| | | 14959 | 9.93235 | 2570 | 9.9218 | 2617 | 9.93526 |
| | | 20008 | 9.93235 | 13878 | 9.923 | | |

Further, when it is defined that $LTF_{Add\_1}$=$LTF_{80\ MHz\_part3\_2x}$(1:5), $LTF_{Add\_2}$=$LTF_{80\ MHz\_part3\_2x}$(6:

16), $-LTF_{Add\_3}=LTF_{80\ MHz\_part3\_2x}(17:28)$, $LTF_{Add\_4}=-LTF_{80\ MHz\_part3\_2x}(29:33)$, the following configuration can be obtained.

TABLE 32

| (+, +, +, +) | | (+, +, +, −) | | (+, +, −, +) | | (+, −, +, +) | |
|---|---|---|---|---|---|---|---|
| T(1)~T(16) index | Worst PAPR (dB) | T(1)~T(16) index | Worst PAPR (dB) | T(1)~T(16) index | Worst PAPR (dB) | T(1)~T(16) index | Worst PAPR (dB) |
| 22950 | 9.66476 | 26010 | 9.70248 | 22950 | 9.7 | 23036 | 9.71232 |
| 27184 | 9.80521 | 16680 | 9.84654 | 27184 | 9.81 | 29419 | 9.78357 |
| 3315 | 9.81762 | 27283 | 9.86142 | 13993 | 9.86 | 29412 | 9.80951 |
| 24476 | 9.82777 | 14691 | 9.87548 | 29204 | 9.89 | 10318 | 9.85156 |
| 27285 | 9.83272 | 3315 | 9.88701 | 7026 | 9.9 | 27285 | 9.85203 |
| 1020 | 9.8369 | 20008 | 9.90125 | 20008 | 9.91 | 12495 | 9.86763 |
| 16284 | 9.85858 | 3317 | 9.91157 | 24570 | 9.91 | 3315 | 9.87889 |
| 24474 | 9.86996 | 16229 | 9.91856 | 26010 | 9.91 | 27184 | 9.88548 |
| 15519 | 9.88877 | 27802 | 9.92269 | 12495 | 9.92 | 25404 | 9.88752 |
| 32445 | 9.89182 | 23801 | 9.9261 | 22185 | 9.92 | 1020 | 9.89997 |
| 20008 | 9.90887 | 22944 | 9.92651 | 7042 | 9.93 | 27802 | 9.91826 |
| 22185 | 9.92013 | 24486 | 9.92651 | 25404 | 9.93 | 22796 | 9.92333 |
| 25404 | 9.92651 | 27702 | 9.93344 | 1619 | 9.94 | 23200 | 9.92651 |
| 14604 | 9.93852 | 16855 | 9.93857 | 5234 | 9.94 | 16855 | 9.93857 |
| 22796 | 9.93852 | 20183 | 9.93857 | 22268 | 9.94 | 3317 | 9.94553 |
| 3317 | 9.93857 | 24518 | 9.93857 | 1699 | 9.95 | 10305 | 9.94664 |
| 20183 | 9.93857 | 1619 | 9.94472 | 27285 | 9.95 | 23801 | 9.9494 |
| 23801 | 9.9494 | 24374 | 9.94676 | 13158 | 9.97 | 16856 | 9.95644 |
| 12495 | 9.95276 | 1699 | 9.948 | 14748 | 9.97 | 16320 | 9.95677 |
| 20184 | 9.95644 | 12394 | 9.94999 | 15462 | 9.97 | 1013 | 9.95713 |
| 20687 | 9.9576 | 2640 | 9.95431 | 16208 | 9.97 | 20687 | 9.95886 |
| 13254 | 9.96905 | 16326 | 9.95539 | 25401 | 9.98 | 26163 | 9.96144 |
| 12365 | 9.97251 | 14602 | 9.96637 | | | 13133 | 9.97251 |
| 23184 | 9.97472 | 22991 | 9.9685 | | | 10174 | 9.97792 |
| 25545 | 9.97673 | 13254 | 9.96905 | | | 10430 | 9.97792 |
| 26010 | 9.98459 | 22796 | 9.97209 | | | 25401 | 9.98444 |
| 1699 | 9.98642 | 16234 | 9.97587 | | | 25545 | 9.98563 |
| 16229 | 9.98772 | 22976 | 9.97684 | | | 14748 | 9.98912 |
| 23280 | 9.98939 | 15462 | 9.98912 | | | | |

TABLE 33

| (+, +, −, −) | | (+, −, +, −) | | (+, −, −, +) | | (+, −, −, −) | |
|---|---|---|---|---|---|---|---|
| T(1)~T(16) index | Worst PAPR (dB) | T(1)~T(16) index | Worst PAPR (dB) | T(1)~T(16) index | Worst PAPR (dB) | T(1)~T(16) index | Worst PAPR (dB) |
| 16680 | 9.76057 | 16320 | 9.62582 | 12494 | 9.83115 | 12495 | 9.83115 |
| 20008 | 9.76057 | 26010 | 9.65837 | 12456 | 9.83368 | 22950 | 9.84216 |
| 16297 | 9.83368 | 27285 | 9.81448 | 10317 | 9.85156 | 13993 | 9.86142 |
| 13878 | 9.86412 | 12495 | 9.8475 | 29261 | 9.87361 | 27702 | 9.86432 |
| 23558 | 9.87857 | 3315 | 9.87889 | 29203 | 9.87916 | 16320 | 9.8683 |
| 29204 | 9.8918 | 12394 | 9.88176 | 29210 | 9.90543 | 10161 | 9.90887 |
| 15366 | 9.90766 | 10161 | 9.92392 | 22949 | 9.91278 | 29211 | 9.91089 |
| 25919 | 9.9089 | 23801 | 9.9261 | 26009 | 9.91278 | 16208 | 9.92284 |
| 26010 | 9.91278 | 23200 | 9.92651 | 22265 | 9.93599 | 27139 | 9.93857 |
| 7042 | 9.92018 | 27283 | 9.93297 | 25442 | 9.94075 | 21497 | 9.94331 |
| 9219 | 9.93518 | 21497 | 9.93456 | 22267 | 9.94254 | 10417 | 9.94664 |
| 13679 | 9.93852 | 16855 | 9.93857 | 10304 | 9.94664 | 23801 | 9.94999 |
| 15471 | 9.93852 | 10417 | 9.94664 | 22027 | 9.95147 | 16680 | 9.95243 |
| 25443 | 9.94075 | 16680 | 9.95243 | 16679 | 9.95243 | 27285 | 9.95358 |
| 1619 | 9.94472 | 29419 | 9.95632 | 24414 | 9.9553 | 26010 | 9.95584 |
| 23584 | 9.94676 | 29147 | 9.95679 | 16319 | 9.95677 | 23205 | 9.96369 |
| 24374 | 9.94676 | 1370 | 9.9572 | 13979 | 9.9671 | 23663 | 9.96637 |
| 1699 | 9.948 | 20687 | 9.9576 | 13835 | 9.97527 | 12394 | 9.96868 |
| 23801 | 9.94999 | 13923 | 9.96896 | 25544 | 9.97673 | 13971 | 9.97232 |
| 10243 | 9.95199 | 22796 | 9.97209 | 20734 | 9.98939 | 2640 | 9.98837 |
| 16214 | 9.95539 | 2640 | 9.98837 | | | 20725 | 9.98939 |
| 2570 | 9.95872 | | | | | | |
| 9315 | 9.96223 | | | | | | |
| 16208 | 9.97496 | | | | | | |
| 19735 | 9.97827 | | | | | | |
| 22259 | 9.97921 | | | | | | |
| 27702 | 9.98563 | | | | | | |

For example, based on the sequence with the lowest worst PAPR in the table above, the 320 MHz 1x EHT-LTF sequence is configured as follows.

$EHTLTF_{320\ MHz\_2x}=\{LTF_{80\ MHz\_lower1\_2x}$, 23 zeros, $LTF_{80\ MHz\_upper1\_2x}$, 23 zeros, $LTF_{80\ MHz\_lower2\_2x}$, 23 zeros, $LTF_{80\ MHz\_upper2\_2x}\}$ $LTF_{80\ MHz\_lower1\_2x}=\{LTF_{80\ MHz\_part\_2x}$, $LTF_{Add\_1}$, $-LTF_{80\ MHz\_part4\_2x}$, $LTF_{Add\_2}$, $LTF_{Add\_3}$, $LTF_{80\ MHz\_part2\_2x}$, $LTF_{Add\_4}$, $LTF_{80\ MHz\_part5\_2}\}$ $LTF_{80\ MHz\_upper1\_2x}=\{-LTF_{80\ MHz\_part1\_2x}$, $LTF_{Add\_1}$, $-LTF_{80\ MHz\_part4\_2x}$, $LTF_{Add\_2}$, $LTF_{Add\_3}$, $-LTF_{80\ MHz\_part2\_2x}$, $LTF_{Add\_4}$, $LTF_{80\ MHz\_part5\_2x}\}$ $LTF_{80\ MHz\_lower2\_2x}=\{LTF_{80\ MHz\_part1\_2x}$, $LTF_{Add\_1}$, $LTF_{80\ MHz_part4_2x}$, $LTF_{Add\_2}$, $LTF_{Add\_3}$, $-LTF_{80\ MHz\_part2\_2x}$, $LTF_{Add\_4}$, $LTF_{80\ MHz\_part5\_2x}\}$ $LTF_{80\ MHz\_upper2\_2x}=\{-LTF_{80\ MHz\_part1\_2x}$, $-LTF_{Add\_1}$, $LTF_{80\ MHz_part4_2x}$, $-LTF_{Add\_2}$, $-LTF_{Add\_3}$, $LTF_{80\ MHz\_part2\_2x}$, $-LTF_{Add\_4}$, $LTF_{80\ MHz\_part5\_2x}\}$ $LTF_{Add\_1}=LTF_{80\ MHz\_part3\_2x}(1:5)$, $LTF_{Add\_2}=LTF_{80\ MHz\_part3\_2x}(6:16)$ , $LTF_{Add\_3}=LTF_{80\ MHz\_part3\_2x}(17:28)$, $LTF_{Add\_4}=LTF_{80\ MHz\_part3\_2x}(29:33)$ This method can also be proposed for 1x or 4x LTF. In that case, the existing $LTF_{80\ MHz\text{-}lower/upper\_1/4x}$ can be classified as follows. Here, $LTF_{80\ MHz\_lower/upper\_1/4x}$ means $LTF_{80\ MHz\_lower\_1x}$ or $LTF_{80\ MHz\_upper\_1x}$ or $LTF_{80\ MHz\_lower\_4x}$ or $LTF_{80\ MHz\_upper\_4x}$, and U(1) to U(16) suitable for each may be different. Likewise, the positions of $LFT_{80\ MHz\_part1\_1/4x}$ and $LTF_{80\ MHz\_part2\_1/4x}$ can be changed, and $LTF_{80\ MHz\_part1\_1\_1/4x}$ and $LFT_{80\ MHz\_part1\_1/4x}$ are also possible.

$LTF_{80\ MHz\_part1\_1/4x}$=a sequence from 1 to 242 of $LTF_{80\ MHz\_left\_1/4x}$ $LTF_{80\ MHz\_part2\_1/4x}$=a sequence from 243 to 484 of $LTF_{80\ MHz\_left\_1/4x}$ $LTF_{80\ MHz\_part3\_1/4x}$=a sequence from 485 to 500 of $\pm LTF_{80\ MHz\_left\_1/4x}$, 0, a sequence from 1 to 16 of $\pm LTF_{80\ MHz\_right\_1/4x}$, for instance [−1, −1, −1, +1, +1, +1, −1, −1, +1, 0, 0, 0, 0, 0, −1, +1, +1, +1, +1, +1, +1, −1, +1] or [−1, −1, −1, +1, +1, +1, −1, −1, +1, 0, 0, 0, 0, 0, +1, −1, −1, −1, −1, −1, −1, +1, −1] which is configured by changing plus/minus on both sides of DC(s).

$LTF_{80\ MHz\_part4\_1/4x}$=a sequence from 17 to 258 of $LTF_{80\ MHz\_right\_1/4x}$ $LTF_{80\ MHz\_part5\_1/4x}$=a sequence from 259 to 500 of $LTF_{80\ MHz\_right\_1/4x}$ When defined in this way, the structure of a 1/4x LTF sequence suitable for 320 MHz BW may be as follows.

$EHTLTF_{320\ MHz\_1/4x}=\{LTF_{80\ MHz\_lower1\_1/4x}$, 23 zeros, $LTF_{80\ MHz\_upper1\_1/4x}$, 23 zeros, $LTF_{80\ MHz\_lower2\_1/4x}$, 23 zeros, $LTF_{80\ MHz\_upper2\_1/4x}\}$ $LTF_{80\ MHz\_lower1\_1/4x}=\{U(1)*LTF_{80\ MHz\_part1\_1/4x}$, $\pm LTF_{Add\_1}$, $U(2)*LTF_{80\ MHz\_part4\_1/4x}$, $\pm LTF_{Add\_2}$, $\pm LTF_{Add\_3}$, $U(3)*LTF_{80\ MHz\_part2\_1/4x}$, $\pm LTF_{Add\_4}$, $U(4)*LTF_{80\ MHz\_part5\_1/4x}\}$ $LTF_{80\ MHz\_upper1\_1/4x}=\{U(5)*LTF_{80\ MHz\_part1\_1/4x}$, $\pm LTF_{Add\_1}$, $U(6)*LTF_{80\ MHz\_part4\_1/4x}$, $\pm LTF_{Add\_2}$, $\pm LTF_{Add\_3}$, $U(7)*LTF_{80\ MHz\_part2\_1/4x}$, $\pm LTF_{Add\_4}$, $U(8)*LTF_{80\ MHz\_part5\_1/4x}\}$ $LTF_{80\ MHz\_lower2\_1/4x}=\{U(9)*LTF_{80\ MHz\_part1\_1/4x}$, $\pm LTF_{Add\_1}$, $U(10)*LTF_{80\ MHz\_part4\_1/4x}$, $\pm LTF_{Add\_2}$, $\pm LTF_{Add\_3}$, $U(11)*LTF_{80\ MHz\_part2\_1/4x}$, $\pm LTF_{Add\_4}$, $U(12)*LTF_{80\ MHz\_part5\_1/4x}\}$ $LTF_{80\ MHz\_upper2\_1/4x}=\{U(13)*LTF_{80\ MHz\_part1\_1/4x}$, $\pm LTF_{Add\_1}$, $U(14)*LTF_{80\ MHz\_part4\_1/4x}$, $\pm LTF_{Add\_2}$, $\pm LTF_{Add\_3}$, $U(15)*LTF_{80\ MHz\_part2\_1/4x}$, $\pm LTF_{Add\_4}$, $U(16)*LTF_{80\ MHz\_part5\_1/4x}\}$ $LTF_{Add\_1}=LTF_{80\ MHz\_part3\_4x}(1:5)$, $LTF_{Add\_2}=LTF_{80\ MHz\_part3\_4x}(6:16)$, $LTF_{Add\_3}=LTF_{80\ MHz\_part3\_4x}(17:28)$, $LTF_{Add\_4}=LTF_{80\ MHz\_part3\_4x}(29:33)$ Here, the index and worst PAPR values representing the optimal U(1) to U(16) according to the coefficients of $LTF_{Add\_1\ to\ 4}$ are as follows. That is, after changing the index into a 16-bit binary sequence, it can be obtained by mapping '0' to '1' and '1' to '−1'. (Alternatively, it is possible to map '0' to '−1' and '1' to '1').

First, when it is defined that $LTF_{Add\_1}=LTF_{80\ MHz\_part3\_4x}(1:5)$, $LTF_{Add\_2}=LTF_{80\ MHz\_part3\_4x}(6:16)$, $LTF_{Add\_3}=LTF_{80\ MHz\_part3\_4x}(17:28)$, $LTF_{Add\_4}=LTF_{80\ MHz\_part3\_4x}(29:33)$, the plus/minus in the first row below means: all plus/minus of $LTF_{Add\_1\ to\ 4}$ included in $LTF_{80\ MHz\_lower1\_4x}$; plus/minus of all $LTF_{Add\_1\ to\ 4}$ included in $LTF_{80\ MHz\_upper1\_4x}$; plus/minus of all $LTF_{Add\_1\ to\ 4}$ included in $LTF_{80\ MHz\_lower1\_4x}$; plus/minus of all $LTF_{Add\_1\ to\ 4}$ included in $LTF_{80\ MHz\_upper2\_4x}$.

TABLE 34

| (+, +, +, +) | | (+, +, +, −) | | (+, +, −, +) | | (+, −, +, +) | |
|---|---|---|---|---|---|---|---|
| U(1)~ U(16) index | Worst PAPR (dB) | U(1)~ U(16) index | Worst PAPR (dB) | U(1)~ U(16) index | Worst PAPR (dB) | U(1)~ U(16) index | Worst PAPR (dB) |
| 13664 | 9.39896 | 11121 | 9.23131 | 32027 | 9.32601 | 29140 | 9.30753 |
| 29140 | 9.41411 | 10161 | 9.34052 | 28994 | 9.38327 | 16679 | 9.36937 |
| 10430 | 9.42809 | 10004 | 9.38327 | 5954 | 9.39171 | 5159 | 9.38327 |
| 10417 | 9.46622 | 5965 | 9.38944 | 5965 | 9.39316 | 10417 | 9.42809 |
| 1699 | 9.49829 | 29211 | 9.42098 | 29140 | 9.41411 | 10430 | 9.42809 |
| 11137 | 9.49897 | 10417 | 9.42809 | 11032 | 9.42809 | 14842 | 9.42809 |
| 5924 | 9.50997 | 11150 | 9.42809 | 14602 | 9.42809 | 16919 | 9.43773 |
| 16754 | 9.50997 | 11240 | 9.42809 | 10161 | 9.43261 | 29106 | 9.45291 |
| 29249 | 9.50997 | 5924 | 9.45877 | 29249 | 9.45877 | 28971 | 9.45731 |
| 11150 | 9.51575 | 10174 | 9.46089 | 24521 | 9.4622 | 7042 | 9.46163 |
| 24634 | 9.52566 | 6100 | 9.48251 | 10417 | 9.46622 | 9329 | 9.47844 |
| 13984 | 9.52721 | 7128 | 9.48251 | 13664 | 9.47816 | 7026 | 9.48957 |
| 16679 | 9.52787 | 10049 | 9.48563 | 13679 | 9.47816 | 16855 | 9.49321 |
| 7042 | 9.5356 | 10062 | 9.48563 | 13727 | 9.47883 | 10475 | 9.51366 |
| 6187 | 9.53895 | 13679 | 9.49319 | 11134 | 9.47908 | 11150 | 9.52063 |
| 7026 | 9.54005 | 1619 | 9.49829 | 32065 | 9.48251 | 9239 | 9.52764 |
| 6322 | 9.54666 | 11239 | 9.50127 | 21254 | 9.48365 | 5234 | 9.52787 |
| 14944 | 9.55441 | 13664 | 9.50274 | 24844 | 9.49635 | 6322 | 9.52787 |
| 25349 | 9.55807 | 11137 | 9.52774 | 2659 | 9.49988 | 11121 | 9.53124 |
| 25354 | 9.56262 | 29204 | 9.52787 | 29419 | 9.50083 | 11137 | 9.53124 |
| 28964 | 9.56358 | 10430 | 9.53767 | 32235 | 9.50083 | 13664 | 9.53817 |
| 10049 | 9.5647 | 13712 | 9.54633 | 24377 | 9.51288 | 10062 | 9.53986 |
| 29211 | 9.56961 | 6333 | 9.54666 | 11150 | 9.52692 | 10174 | 9.53986 |
| 5954 | 9.57205 | 16679 | 9.54726 | 10049 | 9.52787 | 29147 | 9.55539 |
| 13574 | 9.57906 | 13999 | 9.55443 | 11137 | 9.52787 | 32475 | 9.55539 |
| 25424 | 9.57906 | 5234 | 9.5551 | 25349 | 9.52787 | 19854 | 9.55626 |
| 28469 | 9.58003 | 25349 | 9.55807 | 29204 | 9.53038 | 25349 | 9.55807 |
| 21494 | 9.58054 | 25354 | 9.55807 | 32020 | 9.53038 | 28994 | 9.55898 |
| 5965 | 9.58117 | 7026 | 9.56962 | 7042 | 9.5356 | 5250 | 9.56237 |

TABLE 35

| (+, +, −, −) | | (+, −, +, −) | | (+, −, −, +) | | (+, −, −, −) | |
|---|---|---|---|---|---|---|---|
| U(1)~ U(16) index | Worst PAPR (dB) | U(1)~ U(16) index | Worst PAPR (dB) | U(1)~ U(16) index | Worst PAPR (dB) | U(1)~ U(16) index | Worst PAPR (dB) |
| 29204 | 9.32957 | 9329 | 9.30037 | 28994 | 9.30753 | | |
| 32020 | 9.32957 | 29140 | 9.30753 | 29140 | 9.32274 | | |
| 10049 | 9.34052 | 13814 | 9.35225 | 10430 | 9.34265 | | |
| 13574 | 9.35225 | 10174 | 9.44651 | 32322 | 9.35252 | | |
| 25349 | 9.37179 | 28971 | 9.45731 | 5234 | 9.35273 | | |
| 7128 | 9.4077 | 10062 | 9.48563 | 5159 | 9.38327 | | |
| 10212 | 9.41699 | 5261 | 9.48664 | 20579 | 9.39087 | | |
| 27653 | 9.42041 | 13679 | 9.49319 | 25349 | 9.39108 | | |
| 5965 | 9.42809 | 29106 | 9.49499 | 32027 | 9.39186 | | |
| 6100 | 9.42809 | 11121 | 9.50295 | 27653 | 9.39784 | | |

TABLE 35-continued

| (+, +, −, −) | | (+, −, +, −) | | (+, −, −, +) | | (+, −, −, −) | |
|---|---|---|---|---|---|---|---|
| U(1)~ U(16) index | Worst PAPR (dB) | U(1)~ U(16) index | Worst PAPR (dB) | U(1)~ U(16) index | Worst PAPR (dB) | U(1)~ U(16) index | Worst PAPR (dB) |
| 11240 | 9.42809 | 5159 | 9.51991 | 10417 | 9.40809 | | |
| 21494 | 9.43691 | 10004 | 9.51991 | 32475 | 9.4405 | | |
| 29211 | 9.44232 | 11239 | 9.52757 | 32065 | 9.44358 | | |
| 25439 | 9.46067 | 16781 | 9.52757 | 29106 | 9.45291 | | |
| 24521 | 9.4622 | 11137 | 9.52774 | 29147 | 9.45731 | | |
| 11134 | 9.47908 | 6322 | 9.52787 | 2506 | 9.46067 | | |
| 10062 | 9.4931 | 29204 | 9.52787 | 13814 | 9.46067 | | |
| 11150 | 9.49947 | 11150 | 9.53136 | 13679 | 9.47816 | | |
| 32027 | 9.50726 | 13664 | 9.53817 | 9329 | 9.47844 | | |
| 24377 | 9.51288 | 16679 | 9.54726 | 9345 | 9.47844 | | |
| 29005 | 9.51366 | 2476 | 9.54822 | 13727 | 9.47883 | | |
| 29262 | 9.51366 | 19943 | 9.54985 | 11134 | 9.47908 | | |

TABLE 35-continued

| (+, +, −, −) | | (+, −, +, −) | | (+, −, −, +) | | (+, −, −, −) | |
|---|---|---|---|---|---|---|---|
| U(1)~ U(16) index | Worst PAPR (dB) | U(1)~ U(16) index | Worst PAPR (dB) | U(1)~ U(16) index | Worst PAPR (dB) | U(1)~ U(16) index | Worst PAPR (dB) |
| 20184 | 9.52042 | 5234 | 9.5551 | 7042 | 9.48745 | | |
| 10161 | 9.52092 | 14074 | 9.60116 | 16855 | 9.49591 | | |
| 10417 | 9.52092 | 14842 | 9.60116 | 14687 | 9.49678 | | |
| 1436 | 9.52723 | 23648 | 9.60116 | 32235 | 9.50083 | | |
| 5250 | 9.52723 | 23696 | 9.60116 | 24377 | 9.51288 | | |
| 10174 | 9.52723 | 24668 | 9.60116 | 5335 | 9.51366 | | |
| 32065 | 9.53091 | 29412 | 9.60768 | 6363 | 9.51366 | | |

When it is defined that $LTF_{Add\_1}=LTF_{80\ MHz\_part3\_4x}(1:5)$, $LTF_{Add\_2}=LTF_{80\ MHz\_part3\_4x}(6:16)$, $-LTF_{Add\_3}=LTF_{80\ MHz\_part3\_4x}(17:28)$, $LTF_{Add\_4}=-LTF_{80\ MHz\_part3\_4x}(29:33)$, the following configuration can be obtained.

TABLE 36

| (+, +, +, +) | | (+, +, +, −) | | (+, +, −, +) | | (+, −, +, +) | |
|---|---|---|---|---|---|---|---|
| U(1)~ U(16) index | Worst PAPR (dB) | U(1)~ U(16) index | Worst PAPR (dB) | U(1)~ U(16) index | Worst PAPR (dB) | U(1)~ U(16) index | Worst PAPR (dB) |
| 2476 | 9.35589 | 32228 | 9.3909 | 2476 | 9.37121 | 16919 | 9.31855 |
| 19735 | 9.3688 | 32020 | 9.39595 | 13679 | 9.40512 | 2476 | 9.35589 |
| 32020 | 9.39119 | 11032 | 9.40809 | 5159 | 9.41649 | 24377 | 9.39119 |
| 24778 | 9.40663 | 11137 | 9.42398 | 32065 | 9.42476 | 24778 | 9.40663 |
| 2506 | 9.43625 | 6100 | 9.42476 | 32190 | 9.43438 | 6187 | 9.40809 |
| 10430 | 9.46168 | 6952 | 9.42476 | 24668 | 9.44689 | 10417 | 9.40809 |
| 24360 | 9.48795 | 7128 | 9.42476 | 24419 | 9.45043 | 32020 | 9.41212 |
| 9358 | 9.48817 | 21497 | 9.43311 | 1379 | 9.45875 | 32228 | 9.41212 |
| 27653 | 9.51105 | 10430 | 9.43735 | 10475 | 9.46117 | 17009 | 9.41649 |
| 10318 | 9.5312 | 21254 | 9.44296 | 32468 | 9.46425 | 7037 | 9.42419 |
| 32292 | 9.53942 | 32027 | 9.4435 | 32292 | 9.46501 | 10267 | 9.42476 |
| 6100 | 9.53945 | 13814 | 9.45043 | 1478 | 9.47659 | 11150 | 9.42611 |
| 16765 | 9.53945 | 14959 | 9.46296 | 13814 | 9.47659 | 2506 | 9.43625 |
| 32065 | 9.53945 | 10475 | 9.4651 | 10049 | 9.47987 | 14959 | 9.4429 |
| 29140 | 9.55014 | 20534 | 9.47532 | 10267 | 9.48633 | 1478 | 9.44689 |
| 17127 | 9.55192 | 27658 | 9.47628 | 25439 | 9.4936 | 1388 | 9.46334 |
| 13814 | 9.55518 | 24668 | 9.47659 | 1436 | 9.50289 | 23648 | 9.47659 |
| 13919 | 9.55518 | 10004 | 9.4936 | 5261 | 9.50289 | 24419 | 9.47659 |
| 24419 | 9.55518 | 16855 | 9.49389 | 19736 | 9.50289 | 13919 | 9.4818 |
| 28971 | 9.57105 | 24778 | 9.49895 | 1733 | 9.50443 | 20008 | 9.48472 |
| 2668 | 9.57518 | 19736 | 9.50289 | 16679 | 9.50486 | 28618 | 9.48763 |
| 1379 | 9.58568 | 20678 | 9.50289 | 7053 | 9.5069 | 5159 | 9.4936 |
| 1589 | 9.58568 | 20681 | 9.50289 | 11032 | 9.50711 | 9239 | 9.4936 |
| 1619 | 9.58568 | 20588 | 9.50443 | 20579 | 9.5137 | 13814 | 9.4936 |
| 5159 | 9.58568 | 21359 | 9.50443 | 7042 | 9.51381 | 6221 | 9.50289 |
| 10004 | 9.58568 | 27653 | 9.51105 | 10430 | 9.51415 | 16856 | 9.50289 |
| 10049 | 9.58568 | 13727 | 9.5137 | 29361 | 9.52115 | 20681 | 9.50289 |
| 16679 | 9.58568 | 25594 | 9.51944 | 6077 | 9.53247 | 27728 | 9.50443 |
| 17009 | 9.58568 | 5931 | 9.52115 | 1427 | 9.53717 | 28499 | 9.50443 |

TABLE 37

| (+, +, −, −) | | (+, −, +, −) | | (+, −, −, +) | | (+, −, −, −) | |
|---|---|---|---|---|---|---|---|
| U(1)~ U(16) index | Worst PAPR (dB) | U(1)~ U(16) index | Worst PAPR (dB) | U(1)~ U(16) index | Worst PAPR (dB) | U(1)~ U(16) index | Worst PAPR (dB) |
| 2476 | 9.35235 | 16919 | 9.31855 | 2476 | 9.29256 | | |
| 16679 | 9.37205 | 14959 | 9.39119 | 20184 | 9.30403 | | |
| 1436 | 9.40256 | 29204 | 9.39595 | 24377 | 9.32175 | | |
| 10417 | 9.40809 | 21497 | 9.40794 | 19944 | 9.36863 | | |
| 10430 | 9.43735 | 6187 | 9.40809 | 6221 | 9.39119 | | |
| 21494 | 9.44296 | 11032 | 9.40809 | 32299 | 9.39119 | | |
| 5335 | 9.44719 | 20093 | 9.40809 | 1436 | 9.40256 | | |
| 10475 | 9.44719 | 32078 | 9.40809 | 13679 | 9.40512 | | |
| 7042 | 9.44947 | 21254 | 9.42048 | 10417 | 9.40809 | | |
| 14752 | 9.45628 | 32020 | 9.42209 | 14959 | 9.40866 | | |
| 2659 | 9.45875 | 32228 | 9.42209 | 11134 | 9.40867 | | |
| 20534 | 9.46585 | 16770 | 9.43438 | 16856 | 9.42973 | | |
| 16855 | 9.47061 | 6100 | 9.45387 | 6066 | 9.43478 | | |
| 2707 | 9.47628 | 5954 | 9.45448 | 5234 | 9.44356 | | |
| 1478 | 9.47659 | 29147 | 9.46501 | 19736 | 9.44555 | | |
| 2506 | 9.47659 | 24377 | 9.46894 | 19825 | 9.44719 | | |
| 13814 | 9.47659 | 28971 | 9.48235 | 10011 | 9.46252 | | |
| 10049 | 9.47987 | 20008 | 9.48472 | 32292 | 9.46501 | | |
| 21254 | 9.4809 | 13814 | 9.4936 | 23648 | 9.47659 | | |
| 32027 | 9.48707 | 16855 | 9.49389 | 24419 | 9.47659 | | |
| 2617 | 9.48961 | 2617 | 9.49698 | 25439 | 9.47801 | | |
| 13574 | 9.49698 | 14602 | 9.49698 | 10305 | 9.48064 | | |
| 14602 | 9.49698 | 23663 | 9.49698 | 28474 | 9.48763 | | |
| 19736 | 9.50289 | 28508 | 9.49698 | 28508 | 9.48961 | | |
| 32078 | 9.50916 | 29412 | 9.49833 | 20579 | 9.49698 | | |
| 5159 | 9.5137 | 24778 | 9.49895 | 23663 | 9.49698 | | |
| 20579 | 9.5137 | 16856 | 9.50289 | 16679 | 9.50486 | | |

For example, based on the sequence with the lowest worst PAPR in the table above, the 320 MHz 4x EHT-LTF sequence is configured as follows.

Figure 21:
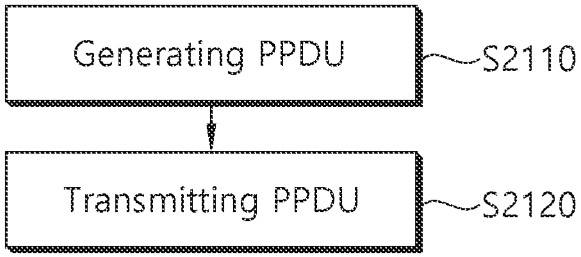
FIG. 21 is a diagram illustrating an embodiment of a method of operating a transmitting STA.

$EHTLTF_{320\ MHz\_4x}=\{LTF_{80\ MHz\_lower1\_4x}$, 23 zeros, $LTF_{80\ MHz\_upper\_4x}$, 23 zeros, $LTF_{80\ MHz\_lower2\_4x}$, 23 zeros, $LTF_{80\ MHz\_upper2\_4x}\}$ $LTF_{80\ MHz\_lower1\_4x}=\{LTF_{80\ MHz\_part1\_4x}, LTF_{Add\_1}, LTF_{80\ MHz\_part4\_4x}, LTF_{Add\_2}, LTF_{Add\_3}, -LTF_{80\ MHz\_part2\_4x}, LTF_{Add\_4}, LTF_{80\ MHz\_part5\_4x}\}$ $LTF_{80\ MHz\_upper1\_4x}=\{-LTF_{80\ MHz\_part1\_4x}, LTF_{Add\_1}, LTF_{80\ MHz\_part4\_4x}, LTF_{Add\_2}, LTF_{Add\_3}, -LTF_{80\ MHz\_part2\_4x}, LTF_{Add\_4}, -LTF_{80\ MHz\_part5\_4x}\}$ $LTF_{80\ MHz\_lower2\_4x}=\{LTF_{80\ MHz\_part1\_4x}, LTF_{Add\_1}, -LTF_{80\ MHz\_part4\_4x}, LTF_{Add\_2}, LTF_{Add\_3}, -LTF_{80\ MHz\_part2\_4x}, LTF_{Add\_4}, -LTF_{80\ MHz\_part5\_4x}\}$ $LTF_{80\ MHz\_upper2\_4x}=\{LTF_{80\ MHz\_part1\_4x}, -LTF_{Add\_1}, LTF_{80\ MHz\_part4\_4x}, -LTF_{Add\_2}, -LTF_{Add\_3}, LTF_{80\ MHz\_part2\_4x}, -LTF_{Add\_4}, -LTF_{80\ MHz\_part5\_4x}\}$ $LTF_{Add\_1}=LTF_{80\ MHz\_part3\_4x}(1:5)$, $LTF_{Add\_2}=LTF_{80\ MHz\_part3\_4x}(6:16)$, $LTF_{Add\_3}=LTF_{80\ MHz\_part3\_4x}(17:28)$, $LTF_{Add\_4}=LTF_{80\ MHz\_part3\_4x}(29:33)$ FIG. 21 is a diagram illustrating an embodiment of a method of operating a transmitting STA.

Referring to FIG. 21, the transmitting STA may generate a PPDU (S2110).

The transmitting STA may transmit the PPDU (S2120). For example, the PPDU may include a Long Training Field (LTF) signal.

For example, the LTF signal is generated based on the LTF sequence for the 320 MHz band, and the LTF sequence may be defined as follows.

{1st sequence, zero-sequence, 2nd sequence, zero-sequence, 3rd sequence, zero-sequence, 4th sequence}, $1^{st}$ sequence={$5^{th}$ sequence, $9^{th}$ sequence, $-7^{th}$ sequence, $10^{th}$ sequence, $6^{th}$ sequence, $11^{th}$ sequence, $8^{th}$ sequence}, $2^{nd}$ sequence={$5^{th}$ sequence, $-9^{th}$ sequence, $7^{th}$ sequence, $-10^{th}$ sequence, $6^{th}$ sequence, $-11^{th}$ sequence, $-8^{th}$ sequence}, $3^{rd}$ sequence={$-5^{th}$ sequence, $9^{th}$ sequence, $-7^{th}$ sequence, $10^{th}$ sequence, $6^{th}$ sequence, $11^{th}$ sequence, $-8^{th}$ sequence}, $4^{th}$ sequence={$-5^{th}$ sequence, $-9^{th}$ sequence, $7^{th}$ sequence, $-10^{th}$ sequence, $6^{th}$ sequence, $-11^{th}$ sequence, $8^{th}$ sequence}, $5^{th}$ sequence={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0}

$6^{th}$ sequence={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}

$7^{th}$ sequence={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}

$8^{th}$ sequence={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}

$9^{th}$ sequence={+1, 0, −1, 0, −1}

$10^{th}$ sequence={0, −1, 0, +1, 0, +1, 0, +1, 0, 0, 0, 0, 0, 0, 0, +1, 0, −1, 0, −1, 0, +1, 0}

$11^{th}$ sequence=={+1, 0, −1, 0, +1}

For example, the zero sequence may mean 23 contiguous zeros.

For example, the PPDU may further include a legacy-signal (L-SIG) field and a repeated L-SIG (RL-SIG) field that is a repetition of the L-SIG field.

For example, the LTF sequence may be mapped from the lowest tone having a tone index of −2036 to the highest tone having a tone index of 2036.

For example, the LTF sequence may be a 2x LTF sequence.

For example, the LTF sequences are $EHTLTF_{-2036,\ 2036}$, the $1^{st}$ sequence is $LTF_{80\ MHz\_1st\_2x}$, the $2^{nd}$ sequence is $LTF_{80\ MHz\_2nd\_2x}$, the $3^{rd}$ sequence is $LTF_{80\ MHz\_3rd\_2x}$, the $4^{th}$ sequence is $LTF_{80\ MHz\_4th\_2x}$, the $5^{th}$ sequence is $LTF_{80\ MHz\_part1\_2x}$, the $6^{th}$ sequence is $LTF_{80\ MHz\_part2\_2x}$, the $7^{th}$ sequence is $LTF_{80\ MHz_part4_2x}$, the $8^{th}$ sequence is $LTF_{80\ MHz\_part5\_2x}$, the $9^{th}$ sequence is $LTF_{80\ MHz\_part3\_2x}(1:5)$, the $10^{th}$ sequence is $LTF_{80\ MHz\_part3\_2x}(6:28)$, and the $11^{th}$ sequence is $LFT_{80\ MHz\_part3\_2x}(29:33)$.

$EHTLTF_{-2036,\ 2036}$={$LTF_{80\ MHz\_1st\_2x}$, 23 zeros, $LTF_{80\ MHz\_2nd\_2x}$, 23 zeros, $LTF_{80\ MHz\_3rd\_2x}$, 23 zeros, $LTF_{80\ MHz\_4th\_2x}$}

$LTF_{80\ MHz\_1st\_2x}$={$LTF_{80\ MHz\_part1\_2x}$, $M_1$, $-LTF_{80\ MHz\_part4\_2x}$, $M_2$, $LTF_{80\ MHz\_part2\_2x}$, $M_3$, $LTF_{80\ MHz\_part5\_2x}$}

$LTF_{80\ MHz\_2nd\_2x}$={$LTF_{80\ MHz\_part1\_2x}$, $-M_1$, $LTF_{80\ MHz_part4_2x}$, $-M_2$, $LTF_{80\ MHz\_part2\_2x}$, $-M_3$, $-LTF_{80\ MHz\_part5\_2x}$}

$LTF_{80\ MHz\_3rd\_2x}$={$-LTF_{80\ MHz\_part1\_2x}$, $M_1$, $-LTF_{80\ MHz\_part4\_2x}$, $M_2$, $LTF_{80\ MHz\_part2\_2x}$, $M_3$, $-LTF_{80\ MHz\_part5\_2x}$}

$LTF_{80\ MHz\_4th\_2x}$={$-LTF_{80\ MHz\_part1\_2x}$, $-M_1$, $LTF_{80\ MHz_part4_2x}$, $-M_2$, $LTF_{80\ MHz\_part2\_2x}$, $-M_3$, $LTF_{80\ MHz\_part5\_2x}$}

$M_1=LFT_{80\ MHz\_part3\_2x}(1:5)$, $M_2=LTF_{80\ MHz\_part3\_2x}(6:28)$, $M_3=LTF_{80\ MHz\_part3\_2x}(29:33)$, $LTF_{80\ MHz\_part1\_2x}$~$LTF_{80\ MHz\_part5\_2x}$ are the same as those defined in 11ax.

$LTF_{80\ MHz\_part1\_2x}$={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0}

$LTF_{80\ MHz\_part2\_2x}$={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}

$LTF_{80\ MHz\_part3\_2x}$={+1, 0, −1, 0, −1, 0, −1, 0, +1, 0, +1, 0, +1, 0, 0, 0, 0, 0, 0, 0, +1, 0, −1, 0, −1, 0, +1, 0, +1, 0, −1, 0, +1}

$LFT_{80\ MHz\_part4\_2x}$={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}

$LTF_{80\ MHz\_part5\_2x}$={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1 ,0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}

Figure 22:
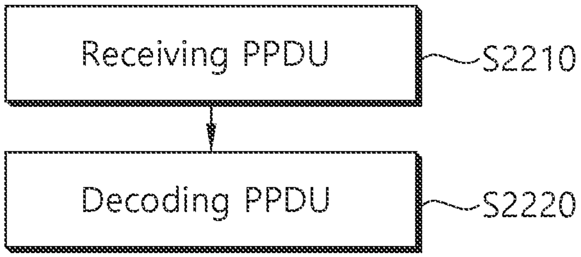
FIG. 22 is a diagram illustrating an embodiment of a method of operating a receiving STA.

FIG. 22 is a diagram illustrating an embodiment of a method of operating a receiving STA.

Referring to FIG. 22, the receiving STA may receive the PPDU (S2210).

The receiving STA may decode the PPDU (S2220). For example, the PPDU may include a Long Training Field (LTF) signal.

For example, the LTF signal is generated based on the LTF sequence for the 320 MHz band, and the LTF sequence may be defined as follows.

{$1^{st}$ sequence, zero-sequence, $2^{nd}$ sequence, zero-sequence, $3^{rd}$ sequence, zero-sequence, $4^{th}$ sequence}, $1^{st}$ sequence={$5^{th}$ sequence, $9^{th}$ sequence, $-7^{th}$ sequence, $10^{th}$ sequence, $6^{th}$ sequence, $11^{th}$ sequence, $8^{th}$ sequence}, $2^{nd}$ sequence={$5^{th}$ sequence, $-9^{th}$ sequence, $7^{th}$ sequence, $-10^{th}$ sequence, $6^{th}$ sequence, $-11^{th}$ sequence, $-8^{th}$ sequence}, $3^{rd}$ sequence={$-5^{th}$ sequence, $9^{th}$ sequence, $7^{th}$ sequence, $10^{th}$ sequence, $6^{th}$ sequence, $11^{th}$ sequence, $-8^{th}$ sequence}, $4^{th}$ sequence={$-5^{th}$ sequence, $-9^{th}$ sequence, $7^{th}$ sequence, −10th sequence, $6^{th}$ sequence, $-11^{th}$ sequence, $8^{th}$ sequence}, $5^{th}$ sequence={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, −1, 0, +1, 0, −1, 0, −1, 0, −1, 0, −1, 0, +1, 0, −1, 0, −1, 0, −1, 0, +1, 0, −1, 0, +1, 0, −1, 0, +1, 0, +1, 0, −1, 0, +1, 0}

$6^{th}$ sequence={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, − 1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}

$7^{th}$ sequence={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}

$8^{th}$ sequence={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}

$9^{th}$ sequence={+1, 0, −1, 0, −1}

10th sequence={0, −1, 0, +1, 0, +1, 0, +1, 0, 0, 0, 0, 0, 0, 0, +1, 0, −1, 0, −1, 0, +1, 0}

$11^{th}$ sequence=={+1, 0, −1, 0, +1}

For example, the zero sequence may mean 23 contiguous zeros.

For example, the PPDU may further include a legacy-signal (L-SIG) field and a repeated L-SIG (RL-SIG) field that is a repetition of the L-SIG field.

For example, the LTF sequence may be mapped from the lowest tone having a tone index of −2036 to the highest tone having a tone index of 2036.

For example, the LTF sequence may be a 2x LTF sequence.

For example, the LTF sequences are $EHTLTF_{-2036,\ 2036}$, the $1^{st}$ sequence is $LTF_{80\ MHz\_1st\_2x}$, the $2^{nd}$ sequence is $LTF_{80\ MHz\_2nd\_2x}$, the $3^{rd}$ sequence is $LTF_{80\ MHz\_3rd\_2x}$, the $4^{th}$ sequence is $LTF_{80\ MHz\_4th\_2x}$, the $5^{th}$ sequence is $LTF_{80\ MHz\_part1\_2x}$, the $6^{th}$ sequence is $LTF_{80\ MHz\_part2\_2x}$, the $7^{th}$ sequence is $LTF_{80\ MHz_part4_2x}$, the $8^{th}$ sequence is $LTF_{80\ MHz\_part5\_2x}$, the $9^{th}$ sequence is $LTF_{80\ MHz\_part3\_2x}(1:5)$, the $10^{th}$ sequence is $LTF_{80\ MHz\_part3\_2x}(6:28)$, and the $11^{th}$ sequence is $LTF_{80\ MHz\_part3\_2x}(29:33)$.

$EHTLTF_{-2036,\ 2036}$={$LTF_{80\ MHz\_1st\_2x}$, 23 zeros, $LTF_{80\ MHz\_2nd\_2x}$, 23 zeros, $LTF_{80\ MHz\_3rd\_2x}$, 23 zeros, $LTF_{80\ MHz\_4th\_2x}$}

$LTF_{80\ MHz\_1st\_2x}$={$LTF_{80\ MHz\_part1\_2x}$, $M_1$, $-LTF_{80\ MHz\_part4\_2x}$, $M_2$, $LTF_{80\ MHz\_part2\_2x}$, $M_3$, $LTF_{80\ MHz\_part5\_2x}$}

$LTF_{80\ MHz\_2nd\_2x}$={$LTF_{80\ MHz\_part1\_2x}$, $-M_1$, $LTF_{80\ MHz_part4_2x}$, $-M_2$, $LTF_{80\ MHz\_part2\_2x}$, $-M_3$, $-LTF_{80\ MHz\_part5\_2x}$}

LTF 80$_{MHz\_3rd\_2x}$={$-LTF_{80\ MHz\_part1\_2x}$, $M_1$, $-LTF_{80\ MHz\_part4\_2x}$, $M_2$, $LTF_{80\ MHz\_part2\_2x}$, $M_3$, $-LTF_{80\ MHz\_part5\_2x}$}

$LTF_{80\ MHz\_4th\_2x}$={$-LTF_{80\ MHz\_part1\_2x}$, $-M_1$, $LTF_{80\ MHz_part4_2x}$, $-M_2$, $LTF_{80\ MHz\_part2\_2x}$,$--M_3$, $LTF_{80\ MHz\_part5\_2x}$}

$M_1=LTF_{80\ MHz\_part3\_2x}(1:5)$, $M_2=LTF_{80\ MHz\_part3\_2x}(6:28)$, $M_3=LTF_{80\ MHz\_part3\_2x}(29:33)$, $LTF_{80\ MHz\_part1\_2x}$~$LTF_{80\ MHz\_part5\_2x}$ are the same as those defined in 11ax.

$LTF_{80\ MHz\_part1\_2x}$={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0}

$LTF_{80\ MHz\_part2\_2x}$={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}

$LTF_{80\ MHz\_part3\_2x}$={+1, 0, −1, 0, −1, 0, −1, 0, +1, 0, +1, 0, +1, 0, 0, 0, 0, 0, 0, 0, +1, 0, −1, 0, −1, 0, +1, 0, +1, 0, −1, 0, +1}

$LTF_{80\ MHz_part4_2x}$={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}

$LTF_{80\ MHz\_part5\_2x}$={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}.

Some of the detailed steps shown in the examples of FIGS. 21 and 22 may not be essential steps and may be omitted. In addition to the steps shown in FIGS. 21 and 22, other steps may be added, and the order of the steps may be changed. Some of the above steps may have their own technical meaning.

The technical features of the present specification described above may be applied to various devices and methods. For example, the technical features of the present specification described above may be performed/supported through the device of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, may be implemented based on the processor 610 and the memory 620 of FIG. 19. The present specification proposes an apparatus of a wireless local area network (WLAN) system, the apparatus comprising: a memory; and a processor operatively coupled to the memory, wherein the processor is adapted to: generate a physical protocol data unit (PPDU); and transmit the PPDU through a 320 MHz band, wherein the PPDU includes a long training field (LTF) signal, wherein the LTF signal is generated based on an LTF sequence for the 320 MHz band, wherein the LTF sequence is defined as:

{$1^{st}$ sequence, zero-sequence, $2^{nd}$ sequence, zero-sequence, $3^{rd}$ sequence, zero-sequence, $4^{th}$ sequence}, $1^{st}$ sequence={$5^{th}$ sequence, $9^{th}$ sequence, $-7^{th}$ sequence, $10^{th}$ sequence, $6^{th}$ sequence, $11^{th}$ sequence, $8^{th}$ sequence}, $2^{nd}$ sequence={$5^{th}$ sequence, $-9^{th}$ sequence, $7^{th}$ sequence, $-10^{th}$ sequence, $6^{th}$ sequence, $-11^{th}$ sequence, $-8^{th}$ sequence}, $3^{rd}$ sequence={$-5^{th}$ sequence, $9^{th}$ sequence, $-7^{th}$ sequence, $10^{th}$ sequence, $6^{th}$ sequence, $11^{th}$ sequence, $-8^{th}$ sequence}, $4^{th}$ sequence={$-5^{th}$ sequence, $-9^{th}$ sequence, $7^{th}$ sequence, $-10^{th}$ sequence, $6^{th}$ sequence, $-11^{th}$ sequence, $8^{th}$ sequence}, $5^{th}$ sequence={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1,

0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0}, $6^{th}$ sequence={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}, $7^{th}$ sequence={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1 , 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}, $8^{th}$ sequence={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}, $9^{th}$ sequence={+1, 0, −1, 0, −1}, $10^{th}$ sequence={0, −1, 0, +1, 0, +1, 0, +1, 0, 0, 0, 0, 0, 0, 0, +1, 0, −1, 0, −1, 0, +1, 0}, $11^{th}$ sequence={+1, 0, −1, 0, +1}.

The technical features of the present specification may be implemented based on a computer readable medium (CRM). The present specification proposes at least one computer readable medium (CRM) storing instructions that, based on being executed by at least one processor of a Wireless Local Area Network (WLAN) system, perform operations comprising: generating a physical protocol data unit (PPDU); and transmitting the PPDU through a 320 MHz band, wherein the PPDU includes a long training field (LTF) signal, wherein the LTF signal is generated based on an LTF sequence for the 320 MHz band, wherein the LTF sequence is defined as:

{$1^{st}$ sequence, zero-sequence, $2^{nd}$ sequence, zero-sequence, $3^{rd}$ sequence, zero-sequence, $4^{th}$ sequence}, $1^{st}$ sequence={$5^{th}$ sequence, $9^{th}$ sequence, $-7^{th}$ sequence, $10^{th}$ sequence, $6^{th}$ sequence, $11^{th}$ sequence, $8^{th}$ sequence}, $2^{nd}$ sequence={$5^{th}$ sequence, $-9^{th}$ sequence, $7^{th}$ sequence, $-10^{th}$ sequence, $6^{th}$ sequence, $-11^{th}$ sequence, $-8^{th}$ sequence}, $3^{rd}$ sequence={$-5^{th}$ sequence, $9^{th}$ sequence, $-7^{th}$ sequence, $10^{th}$ sequence, $6^{th}$ sequence, $11^{th}$ sequence, $-8^{th}$ sequence}, $4^{th}$ sequence={$-5^{th}$ sequence, $-9^{th}$ sequence, $7^{th}$ sequence, $-10^{th}$ sequence, $6^{th}$ sequence, −11th sequence, $8^{th}$ sequence}, $5^{th}$ sequence={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0}, $6^{th}$ sequence={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}, $7^{th}$ sequence={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}, $8^{th}$ sequence={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1 , 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}, $9^{th}$ sequence={+1, 0, −1, 0, −1}, $10^{th}$ sequence={0, −1, 0, +1, 0, +1, 0, +1, 0, 0, 0, 0, 0, 0, 0, +1, 0, −1, 0, −1, 0, +1, 0}, $11^{th}$ sequence={+1, 0, −1, 0, +1}.

Instructions stored in a CRM of the present specification may be executed by at least one processor. The at least one processor related to the CRM of the present specification may be the processors 111 and 121 or processing chips 114 and 124 of FIG. 1 or the processor 610 of FIG. 19. Meanwhile, the CRM of the present specification may be the memories 112 and 122 of FIG. 1 or the memory 620 of FIG. 19 or a separate external memory/storage medium/disk or the like.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method for a wireless local area network (WLAN) system, the method comprising:

generating a physical protocol data unit (PPDU); and transmitting the PPDU, wherein the PPDU includes a legacy-signal (L-SIG) field, a repeated L-SIG (RL-SIG) field which is a repeat of the L-SIG field, a universal signal (U-SIG) field, and a long training field (LTF) signal, wherein the L-SIG field includes a length field which has a value satisfying a condition that a remainder is zero when L-SIG field is divided by three, and the remainder is used to differentiate the PPDU from a high efficiency (HE) PPDU, wherein the U-SIG field includes version independent fields followed by version dependent fields, wherein the version independent fields include a three-bit physical (PHY) version identifier, wherein the LTF signal is generated based on an LTF sequence for 320 MHz communication, wherein the LTF sequence is defined as:

{1$^{st}$ sequence, zero-sequence, 2$^{nd}$ sequence, zero-sequence, 3$^{rd}$ sequence, zero-sequence, 4$^{th}$ sequence}, 1$^{st}$ sequence={5$^{th}$ sequence, 9$^{th}$ sequence, −7$^{th}$ sequence, 10$^{th}$ sequence, 6$^{th}$ sequence, 11$^{th}$ sequence, 8$^{th}$ sequence}, 2$^{nd}$ sequence={5$^{th}$ sequence, −9$^{th}$ sequence, 7$^{th}$ sequence, −10$^{th}$ sequence, 6$^{th}$ sequence, −11$^{th}$ sequence, −8$^{th}$ sequence}, 3$^{rd}$ sequence={−5$^{th}$ sequence, 9$^{th}$ sequence, −7$^{th}$ sequence, 10$^{th}$ sequence, 6$^{th}$ sequence, 11$^{th}$ sequence, −8$^{th}$ sequence}, 4$^{th}$ sequence={−5$^{th}$ sequence, −9$^{th}$ sequence, 7$^{th}$ sequence, −10$^{th}$ sequence, 6$^{th}$ sequence, −11$^{th}$ sequence, 8$^{th}$ sequence}, 5$^{th}$ sequence={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0,+1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0},

6$^{th}$ sequence={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}, 7$^{th}$ sequence={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}, 8$^{th}$ sequence={0, +1, 0, −1, 0, +1, 0, +1, 0, −1, 0, +1, 0, −1, 0, −1, 0, −1, 0, +1, 0, −1, 0, −1, −0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, 1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}, 9$^{th}$ sequence={+1, 0, −1, 0, −1}, 10$^{th}$ sequence={0, −1, 0, +1, 0, +1, 0, +1, 0, 0, 0, 0, 0, 0, 0, +1, 0, −1, 0, −1, 0, +1, 0}, 11$^{th}$ sequence={+1, 0, −1, 0, +1}.

2. The method of claim 1, wherein the zero-sequence means 23 consecutive zeros.

3. The method of claim 1, wherein the PPDU further includes a legacy-signal (L-SIG) field and a repeated L-SIG (RL-SIG) field which is repetition of the L-SIG field.

4. The method of claim 1, wherein the LTF sequence is mapped from a lowest tone having a tone index of −2036 to a highest tone having a tone index of 2036.

5. The method of claim 1, wherein the LTF sequence is a 2x LTF sequence.

6. A transmitting station (STA) of a wireless local area network (WLAN) system, the transmitting STA comprising:

a transceiver transmitting and/or receiving a wireless signal; and a processor coupled to the transceiver, wherein the processor is adapted to:

generate a physical protocol data unit (PPDU); and transmit the PPDU, wherein the PPDU includes a legacy-signal (L-SIG) field, a repeated L-SIG (RL-SIG) field which is a repeat of the L-SIG field, a universal signal (U-SIG) field, and a long training field (LTF) signal, wherein the L-SIG field includes a length field which has a value satisfying a condition that a remainder is zero when L-SIG field is divided by three, and the remainder is used to differentiate the PPDU from a high efficiency (HE) PPDU, wherein the U-SIG field includes version independent fields followed by version dependent fields, wherein the version independent fields include a three-bit physical (PHY) version identifier, wherein the LTF signal is generated based on an LTF sequence for 320 MHz communication, wherein the LTF sequence is defined as:

{1$^{st}$ sequence, zero-sequence, 2$^{nd}$ sequence, zero-sequence, 3$^{rd}$ sequence, zero-sequence, 4$^{th}$ sequence}, 1$^{st}$ sequence={5$^{th}$ sequence, 9$^{th}$ sequence, −7$^{th}$ sequence, 10$^{th}$ sequence, 6$^{th}$ sequence, 11$^{th}$ sequence, 8$^{th}$ sequence}, 2$^{nd}$ sequence={5$^{th}$ sequence, −9$^{th}$ sequence, 7$^{th}$ sequence, −10$^{th}$ sequence, 6$^{th}$ sequence, −11$^{th}$ sequence, −8$^{th}$ sequence}, 3$^{rd}$ sequence={−5$^{th}$ sequence, 9$^{th}$ sequence, −7$^{th}$ sequence, 10$^{th}$ sequence, 6$^{th}$ sequence, 11$^{th}$ sequence, −8$^{th}$ sequence}, 4$^{th}$ sequence={−5$^{th}$ sequence, −9$^{th}$ sequence, 7$^{th}$ sequence, −10$^{th}$ sequence, 6$^{th}$ sequence, −11$^{th}$ sequence, 8$^{th}$ sequence}, 5$^{th}$ sequence={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0}, $6^{th}$ sequence={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0}, $7^{th}$ sequence={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0,+1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}, $8^{th}$ sequence={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}, $9^{th}$ sequence={+1, 0, −1, 0, −1}, $10^{th}$ sequence={0, −1, 0, +1, 0, +1, 0, +1, 0, 0, 0, 0, 0, 0, 0, +1, 0, −1, 0, −1, 0, +1, 0}, $11^{th}$ sequence={+1, 0, −1, 0, +1}.

7. The transmitting STA of claim 6, wherein the zero-sequence means 23 consecutive zeros.

8. The transmitting STA of claim 6, wherein the PPDU further includes a legacy-signal (L-SIG) field and a repeated L-SIG (RL-SIG) field which is repetition of the L-SIG field.

9. The transmitting STA of claim 6, wherein the LTF sequence is mapped from a lowest tone having a tone index of −2036 to a highest tone having a tone index of 2036.

10. The transmitting STA of claim 6, wherein the LTF sequence is a 2x LTF sequence.

11. A receiving station (STA) of a wireless local area network (WLAN) system, the transmitting STA comprising:

a transceiver transmitting and/or receiving a wireless signal; and a processor coupled to the transceiver, wherein the processor is adapted to:

receive a physical protocol data unit (PPDU); and decode the PPDU, wherein the PPDU includes a legacy-signal (L-SIG) field, a repeated L-SIG (RL-SIG) field which is a repeat of the L-SIG field, a universal signal (U-SIG) field, and a long training field (LTF) signal, wherein the L-SIG field includes a length field which has a value satisfying a condition that a remainder is zero when L-SIG field is divided by three, and the remainder is used to differentiate the PPDU from a high efficiency (HE) PPDU, wherein the U-SIG field includes version independent fields followed by version dependent fields, wherein the version independent fields include a three-bit physical (PHY) version identifier, wherein the LTF signal is generated based on an LTF sequence for 320 MHz communication, wherein the LTF sequence is defined as:

{$1^{st}$ sequence, zero-sequence, $2^{nd}$ sequence, zero-sequence, $3^{rd}$ sequence, zero-sequence, $4^{th}$ sequence}, $1^{st}$ sequence={$5^{th}$ sequence, $9^{th}$ sequence, $-7^{th}$ sequence, $10^{th}$ sequence, $6^{th}$ sequence, $11^{th}$ sequence, $8^{th}$ sequence}, $2^{nd}$ sequence={$5^{th}$ sequence, $-9^{th}$ sequence, $7^{th}$ sequence, $-10^{th}$ sequence, $6^{th}$ sequence, $-11^{th}$ sequence, $-8^{th}$ sequence}, $3^{rd}$ sequence={$-5^{th}$ sequence, $9^{th}$ sequence, $-7^{th}$ sequence, $10^{th}$ sequence, $6^{th}$ sequence, $11^{th}$ sequence, $-8^{th}$ sequence}, $4^{th}$ sequence={$-5^{th}$ sequence, $-9^{th}$ sequence, $7^{th}$ sequence, $-10^{th}$ sequence, $6^{th}$ sequence, $-11^{th}$ sequence, $8^{th}$ sequence}, $5^{th}$ sequence={+1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0}, $6^{th}$ sequence={+1, 0, −1, 0, −1, 0, −1, 0, +1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, +1, 0, −1, 0, −1, 0, +1, 0, +1, 0, +1, 0, −1, 0, +1, 0, +1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, +1, 0, −1, 0, −1, 0,

+1, 0, −1, 0, −1, 0, −1, 0, +1, 0, +1, 0, +1, 0, +1, 0, −1, 0, +1, 0, −1, 0, −1, 0, −1, 0, +1, 0, −1, 0, −1, 0, −1, 0, −1, 0, +1, 0, +1, 0, +1, 0},

7$^{th}$ sequence={0, −1, 0, −1, 0, −1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, +1, 0, −1, 0, −1, 0, +1, 0, −1, 0, +1, 0, +1, 0, +1, 0, −1, 0, +1, 0, +1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, +1, 0, +1, 0, +1, 0, −1, 0, +1, 0, +1, 0, +1, 0, +1, 0, −1, 0, −1, 0, −1, 0, +1, 0, +1, 0, +1, 0, +1, 0, −1, 0, −1, 0, −1, 0, +1, 0, −1, 0, −1, 0, +1, 0, +1, 0, −1, 0, +1, 0, +1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, −1, 0, −1, 0, +1, 0, −1, 0, −1, 0, −1, 0, +1, 0, +1, 0, −1, 0, −1, 0, −1, 0, +1, 0, −1, 0, −1, 0, +1, 0, −1, 0, +1, 0, +1, 0, +1, 0, −1, 0, +1, 0, +1, 0, +1, 0, −1}, 8$^{th}$ sequence={0, +1, 0, −1, 0, +1, 0, +1, 0, −1, 0, +1, 0, −1, 0, −1, 0, −1, 0, +1, 0, −1, 0, −1, 0, −1, 0, −1, 0, +1, 0, −1, 0, +1, 0, +1, 0, −1, 0, +1, 0, +1, 0, +1, 0, −1, 0, −1, 0, +1, 0, +1, 0, +1, 0, −1, 0, −1, 0, −1, 0, +1, 0, +1, 0, +1, 0, +1, 0, +1, 0, −1, 0, +1, 0, +1, 0, +1, 0, −1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, −1, 0, +1, 0, −1, 0, −1, 0, −1, 0, +1, 0, −1, 0, +1, 0, +1, 0, −1, 0, +1, 0, +1, 0, −1, 0, +1, 0, −1, 0, −1, 0, +1, 0, −1, 0, −1,0, −1, 0, +1, 0, +1, 0, −1, 0, −1, 0, −1, 0, +1, 0, −1, 0, −1, 0, +1, 0, −1,0, +1, 0, +1, 0, +1, 0, −1, 0, +1, 0, +1, 0, +1, 0, +1, 0, −1, 0, −1, 0, −1, 0, −1, 0, +1, 0, +1, 0, +1, 0, −1, 0, +1, 0, +1, 0, −1, 0, −1, 0, +1, 0, −1, 0, −1, 0, −1, 0, +1, 0, +1, 0, +1, 0, +1, 0, −1, 0, +1, 0, +1, 0, +1, 0, −1, 0, +1, 0, +1}, 9$^{th}$ sequence={+1, 0, −1, 0, −1}, 10$^{th}$ sequence={0, −1, 0, +1, 0, +1, 0, +1, 0, 0, 0, 0, 0, 0, 0, +1, 0, −1, 0, −1, 0, +1, 0}, 11$^{th}$ sequence={+1, 0, −1, 0, +1}.

* * * * *